United States Patent
Fiedler et al.

(10) Patent No.: US 12,188,507 B2
(45) Date of Patent: Jan. 7, 2025

(54) CLOSURE DEVICE WITH CLOSURE PARTS WHICH CAN BE PLACED AGAINST EACH OTHER

(71) Applicant: Fidlock GmbH, Hannover (DE)

(72) Inventors: Joachim Fiedler, Hannover (DE); Breido Botkus, Hannover (DE); Lasse Hiller, Ronnenberg (DE)

(73) Assignee: Fidlock GmbH, Hannover (DE)

( * ) Notice: Subject to any disclaimer, the term of this patent is extended or adjusted under 35 U.S.C. 154(b) by 0 days.

(21) Appl. No.: 18/232,867

(22) Filed: Aug. 11, 2023

(65) Prior Publication Data
US 2023/0383781 A1     Nov. 30, 2023

Related U.S. Application Data

(63) Continuation of application No. 17/425,391, filed as application No. PCT/EP2020/052455 on Jan. 31, 2020.

(30) Foreign Application Priority Data

Jan. 31, 2019   (DE) .......................... 102019201259.0

(51) Int. Cl.
 *F16B 21/16*   (2006.01)
 *F16B 21/18*   (2006.01)
(52) U.S. Cl.
 CPC .......... *F16B 21/165* (2013.01); *F16B 21/186* (2013.01); *F16B 2200/83* (2023.08)

(58) Field of Classification Search
 CPC ........ Y10T 24/32; H01F 7/0263; A41F 1/002; A44D 2203/00; F16B 21/165; F16B 21/186; F16B 2200/83
 See application file for complete search history.

(56) References Cited

U.S. PATENT DOCUMENTS

| 5,199,138 | A | | 4/1993 | Morita |
| 5,367,891 | A | * | 11/1994 | Furuyama ............ A44C 5/2057 63/3 |
| 6,000,306 | A | | 12/1999 | Erickson |

(Continued)

FOREIGN PATENT DOCUMENTS

| CN | 108431484 A | 8/2018 |
| DE | 2656511 A1 | 6/1978 |

(Continued)

*Primary Examiner* — Robert Sandy
*Assistant Examiner* — Michael S Lee
(74) *Attorney, Agent, or Firm* — The Webb Law Firm

(57) ABSTRACT

A closure device has a first closure part including a body and a second closure part. Closure parts for closing the closure device are placeable against one another along a closing direction and in a closing position being connected to one another. The closure device also includes at least one locking element which is disposed so as to be adjustable on the body of the first closure part, and at least one engagement portion which is molded on the second closure part. The at least one locking element and the at least one engagement portion in a closing position are mutually engaged in such a manner that the first closure part and the second closure part are locked to one another. The first closure part has a first magnetic installation and the second closure part has a second magnetic installation.

20 Claims, 83 Drawing Sheets

(56) References Cited

U.S. PATENT DOCUMENTS

| | | |
|---|---|---|
| 6,131,247 A | 10/2000 | Morita |
| 6,182,336 B1 | 2/2001 | Bauer |
| 6,295,702 B1 | 10/2001 | Bauer |
| 2003/0024079 A1 | 2/2003 | Morita |
| 2006/0174455 A1 | 8/2006 | Saitoh et al. |
| 2007/0251062 A1 | 11/2007 | Saitoh et al. |
| 2007/0283729 A1 | 12/2007 | Saitoh et al. |
| 2009/0021333 A1 | 1/2009 | Fiedler |
| 2010/0283269 A1 | 11/2010 | Fiedler |
| 2010/0308605 A1 | 12/2010 | Fiedler |
| 2011/0131770 A1* | 6/2011 | Fiedler ............... E05B 47/004 24/303 |
| 2011/0214260 A1 | 9/2011 | Wang |
| 2013/0149029 A1 | 6/2013 | Changsrivong et al. |
| 2015/0078814 A1 | 3/2015 | Brun |
| 2018/0363689 A1 | 12/2018 | Richter et al. |
| 2019/0164675 A1* | 5/2019 | Srinivasan ............ E05C 19/16 |
| 2022/0031027 A1* | 2/2022 | Fiedler ............... A44B 11/2588 |
| 2022/0330664 A1 | 10/2022 | Li |

FOREIGN PATENT DOCUMENTS

| | | |
|---|---|---|
| DE | 233321 A1 | 2/1986 |
| DE | 8902944 U1 | 6/1989 |
| DE | 202016006477 U1 | 12/2016 |
| EP | 0388662 B1 | 9/1990 |
| EP | 0970628 A2 | 1/2000 |
| EP | 2713061 A1 | 4/2014 |
| JP | 2009542380 A | 12/2009 |
| JP | 2013122319 A | 6/2013 |
| KR | 1020140136998 A | 12/2014 |
| KR | 1020160083711 A | 7/2016 |
| KR | 101693141 B1 | 1/2017 |
| WO | 2009092368 A2 | 7/2009 |
| WO | 2013000061 A1 | 1/2013 |
| WO | 2019011821 A1 | 1/2019 |

* cited by examiner

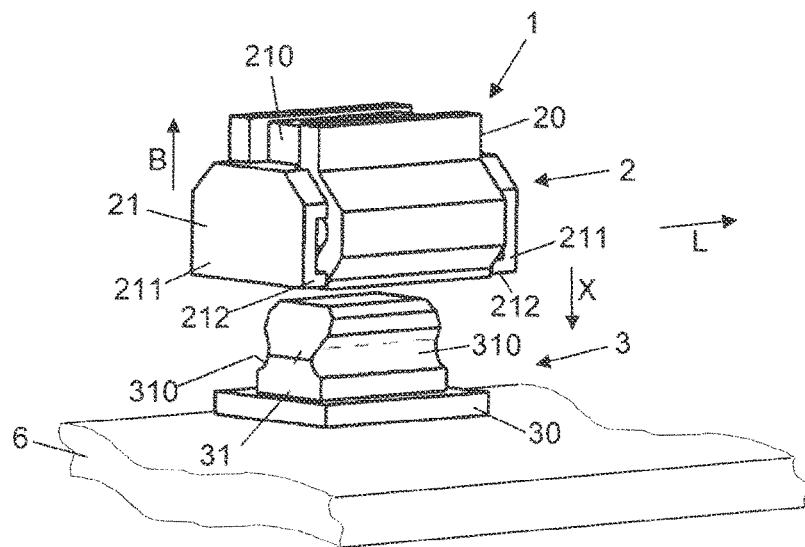
FIG 1A
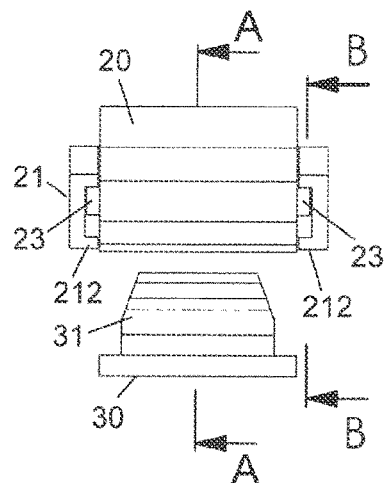
FIG 1B
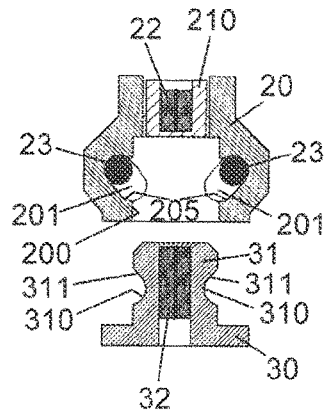
FIG 1C
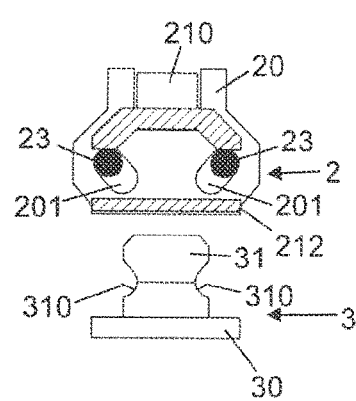
FIG 1D
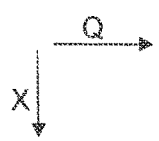

FIG 2A
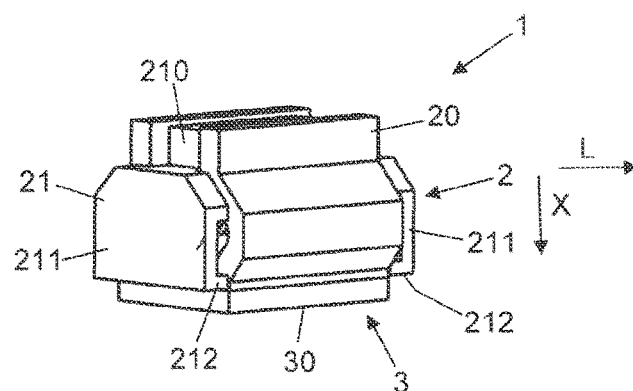
FIG 2B
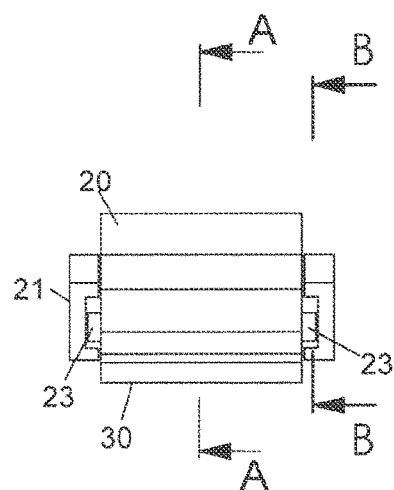
FIG 2C
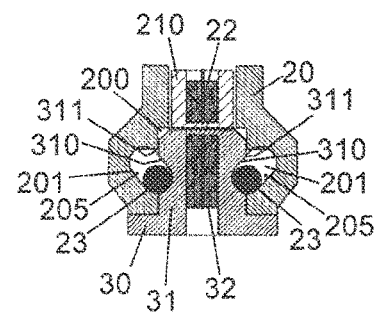
FIG 2D
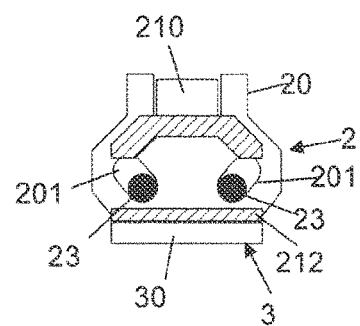
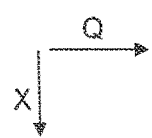

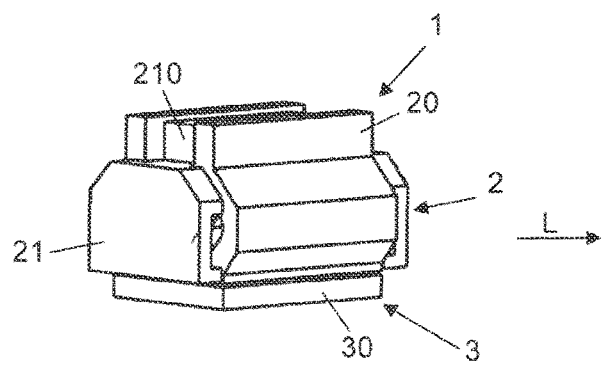
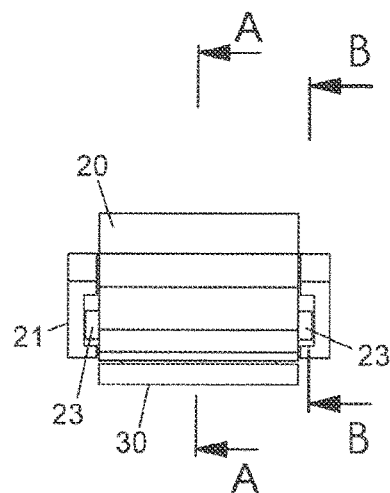
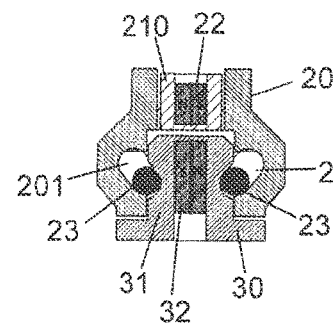
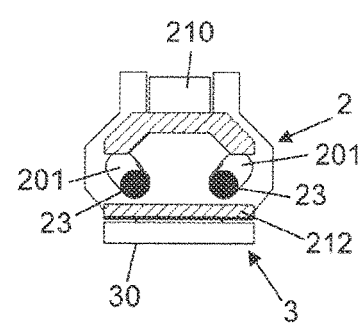
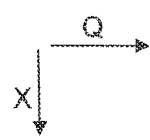

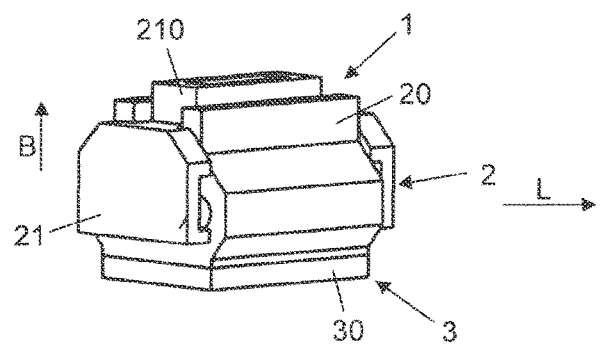
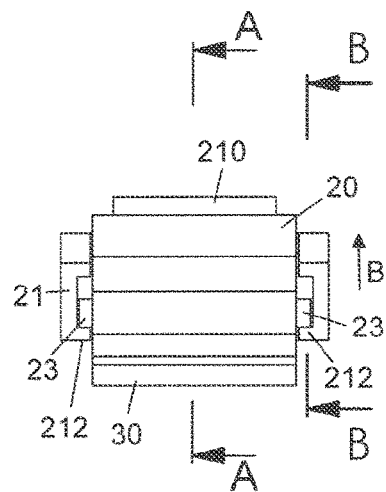
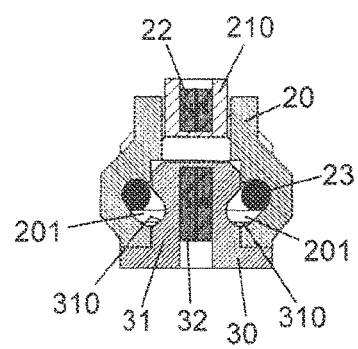
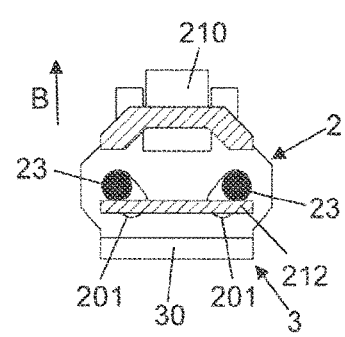
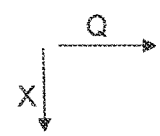

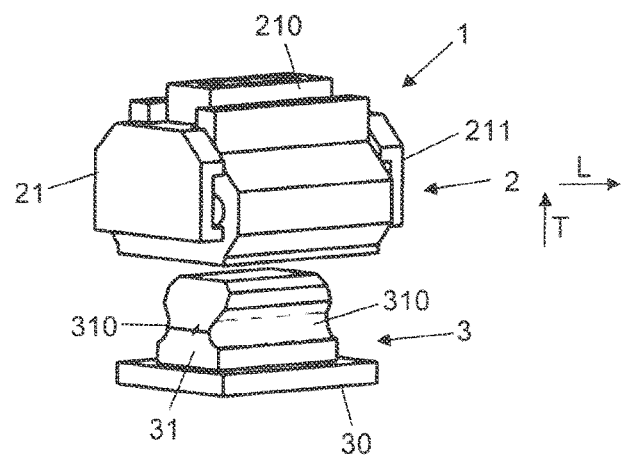
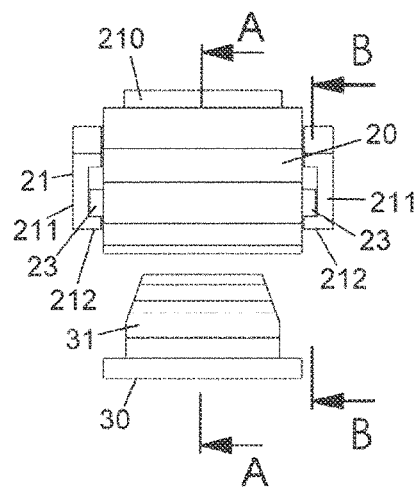
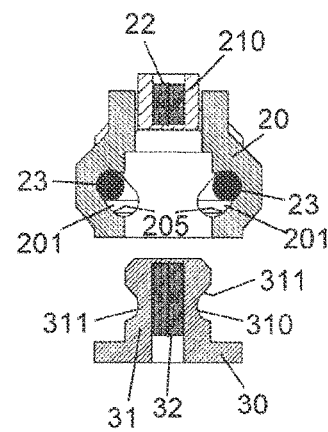
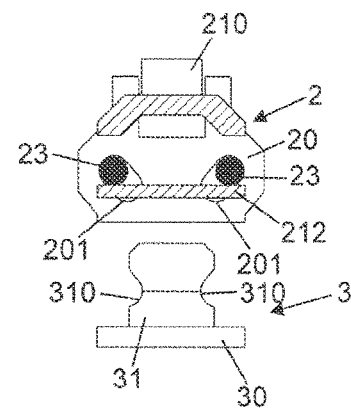
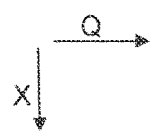

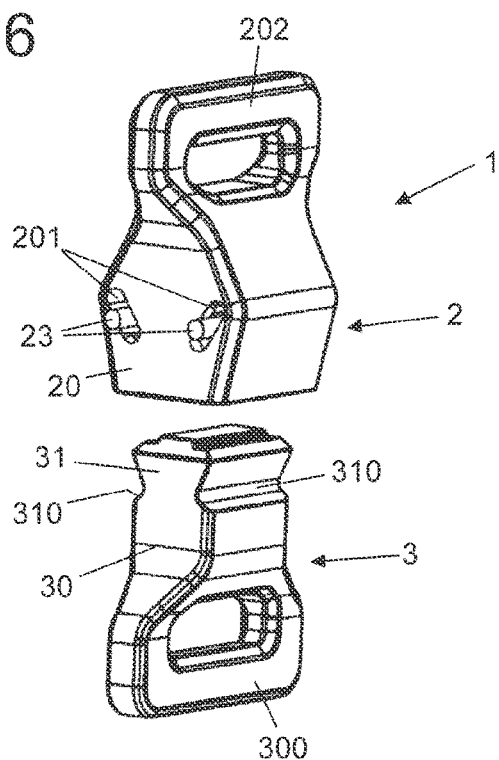
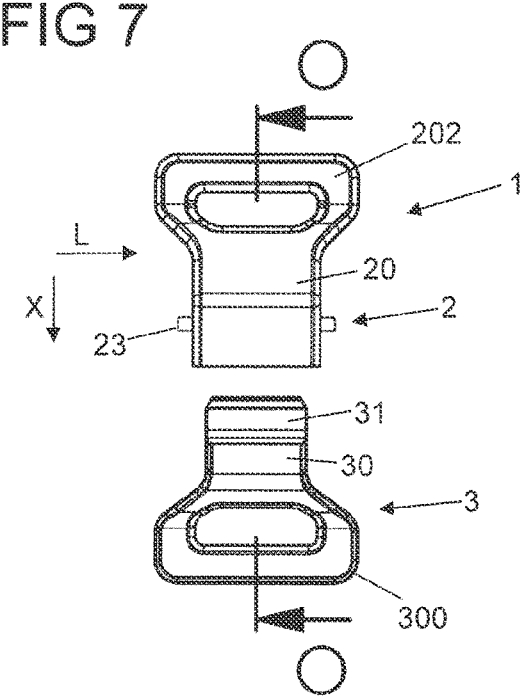

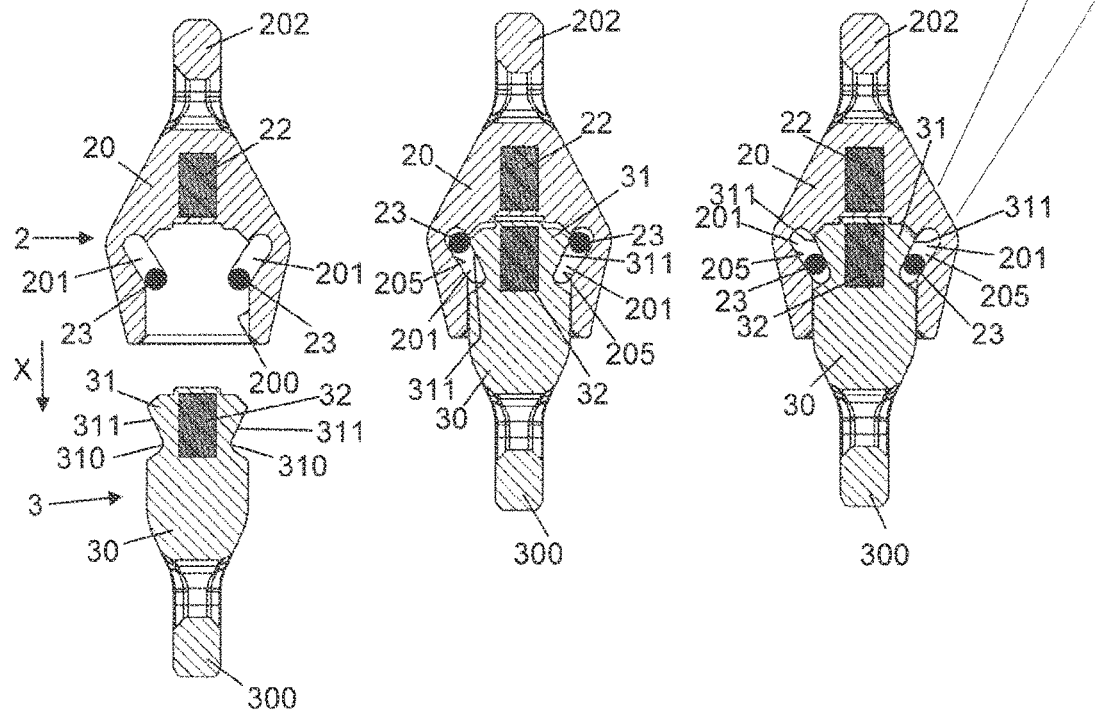
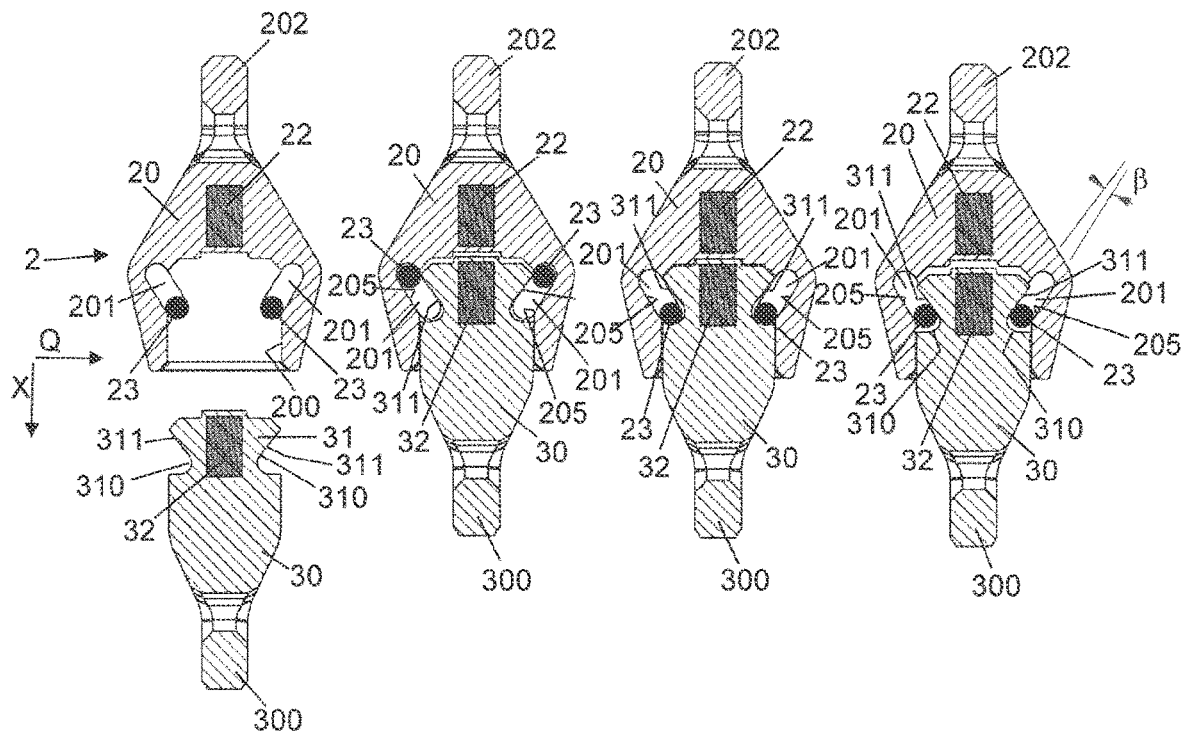

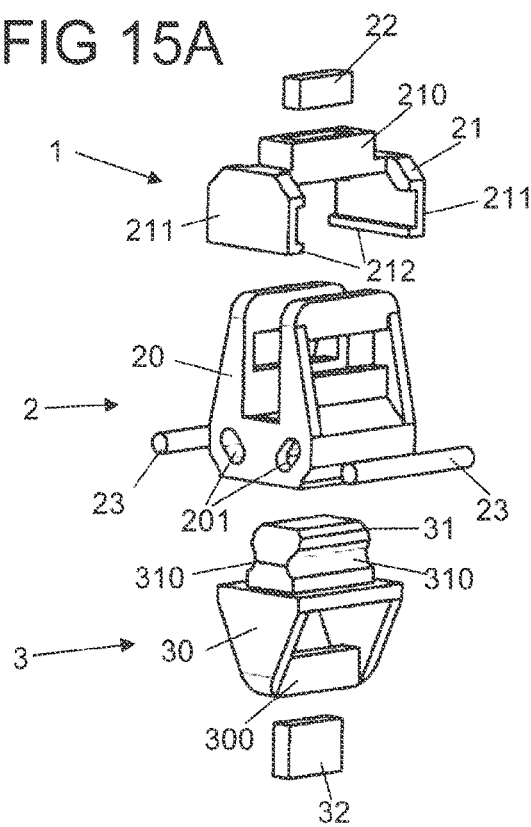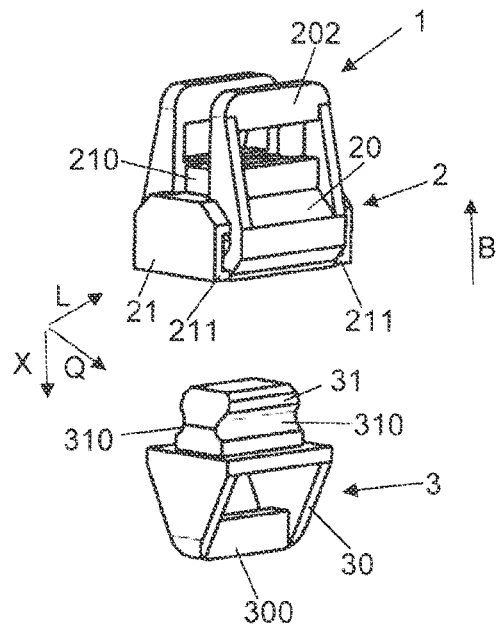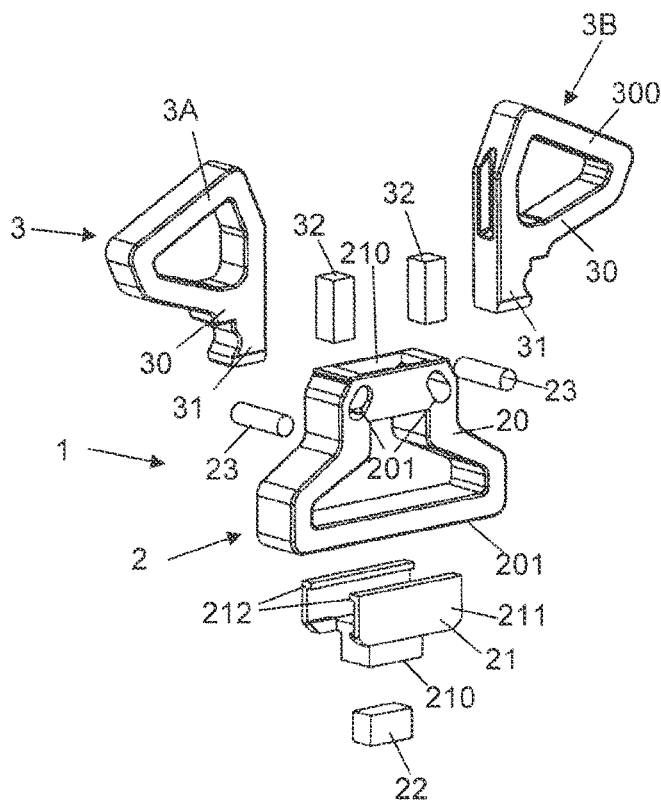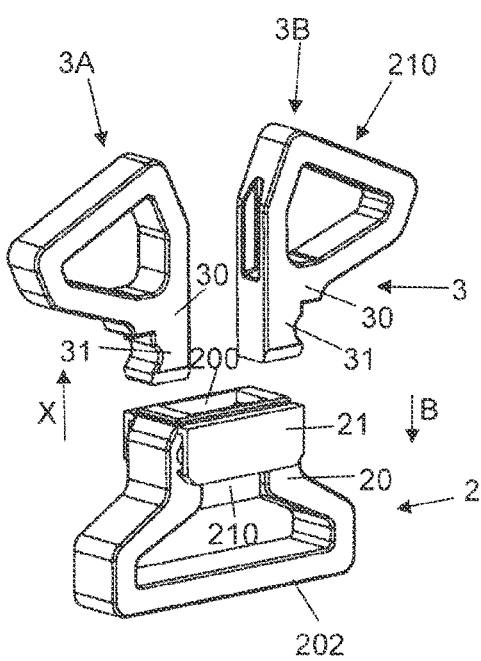

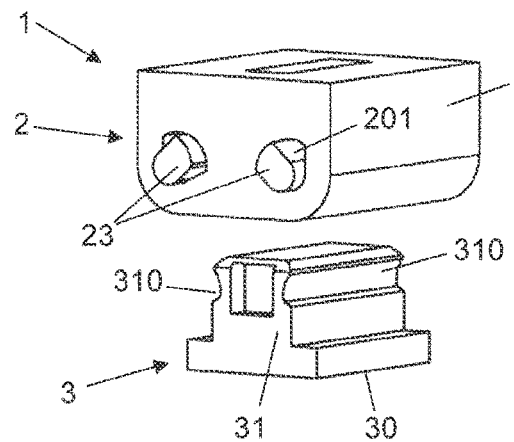
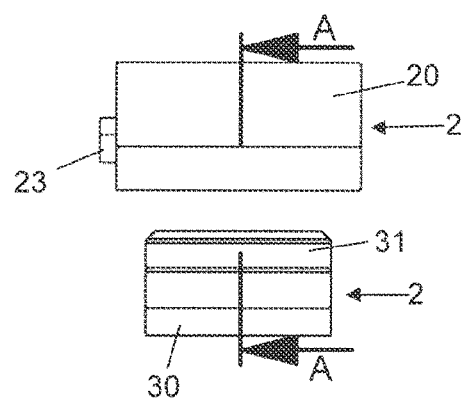
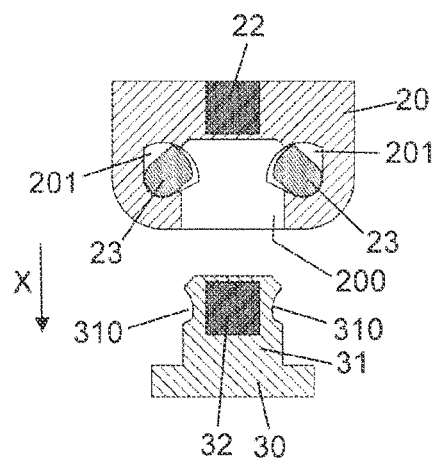
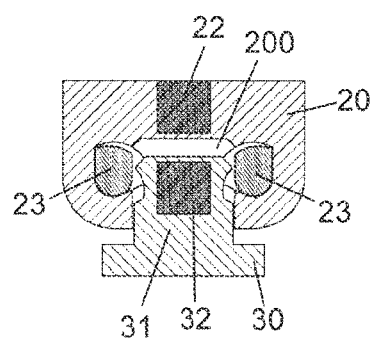
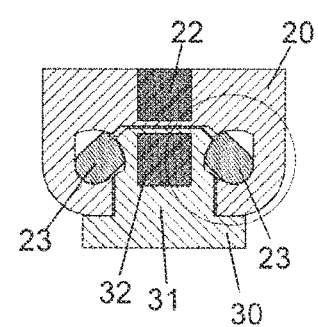
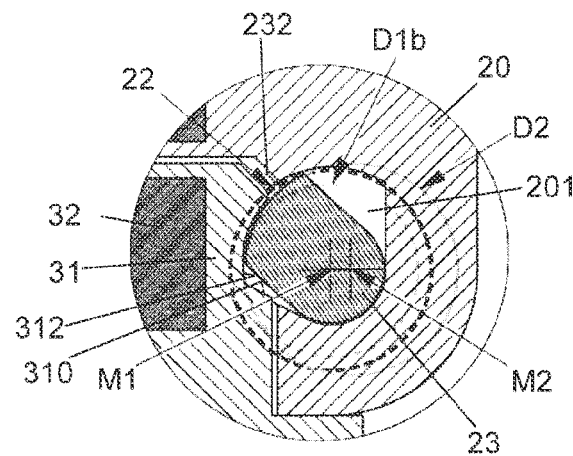

C-C

D-D

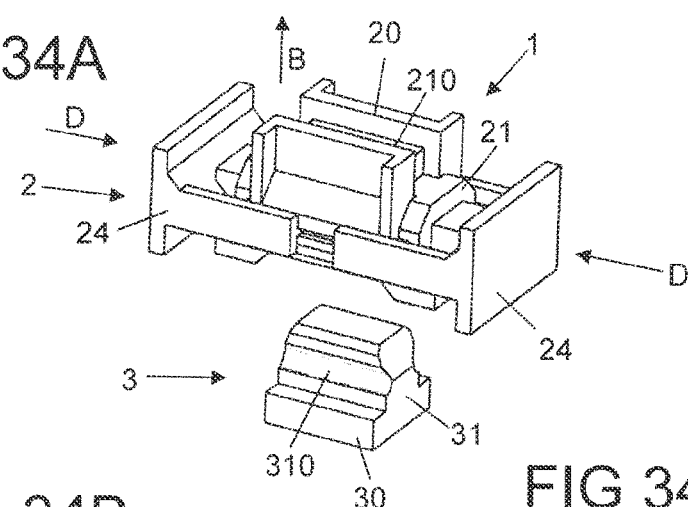
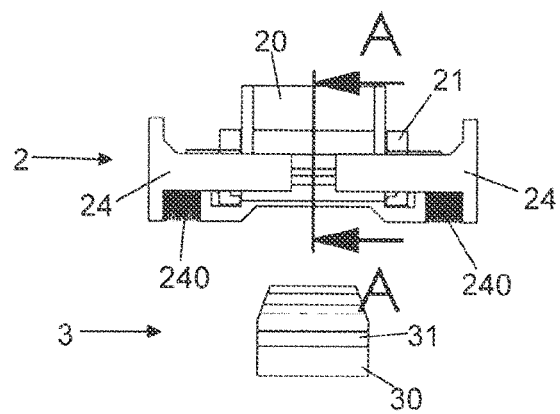
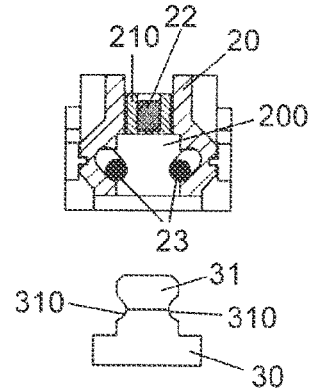
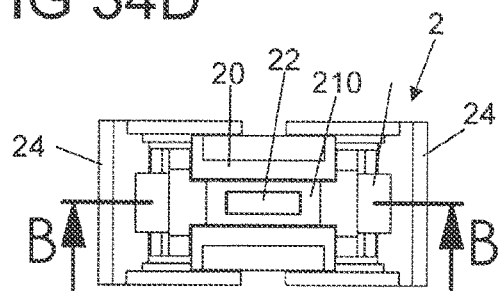
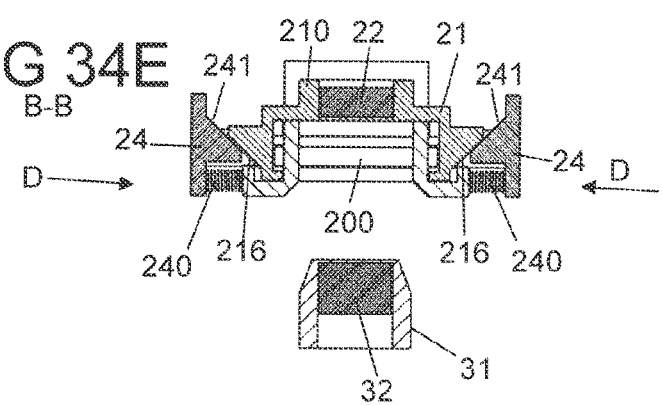

A-A

B-B

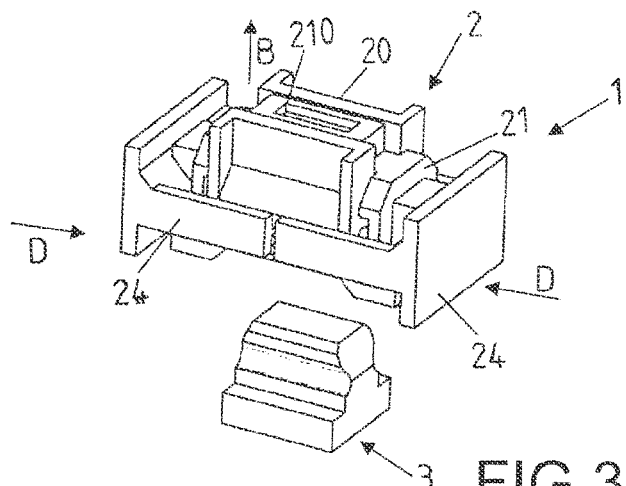
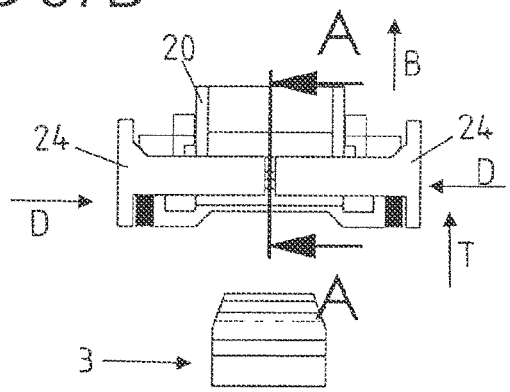
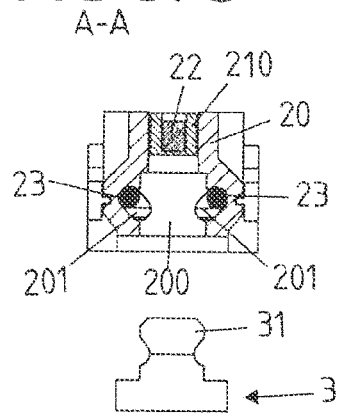
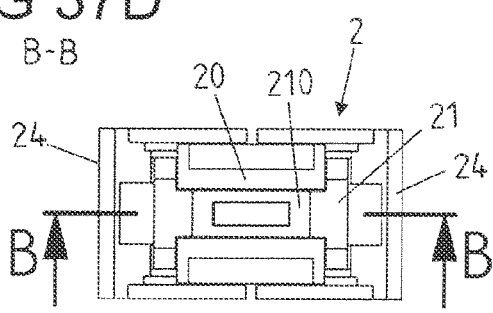
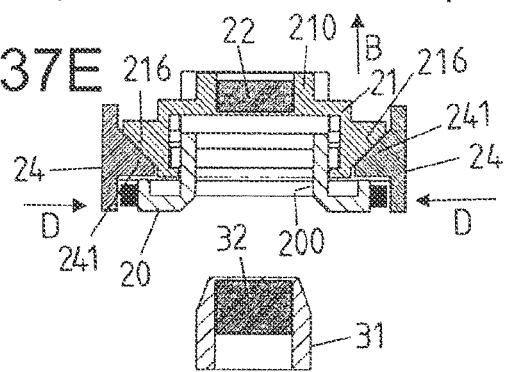

A-A

B-B

A-A

B B

A-A

B-B

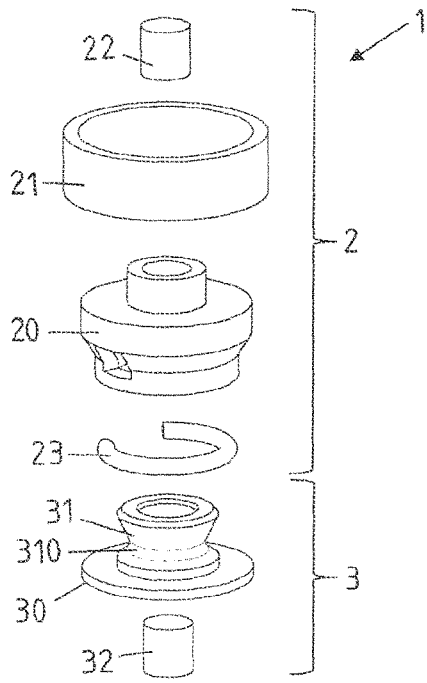
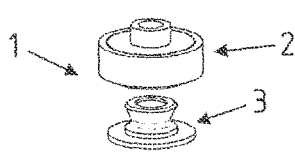 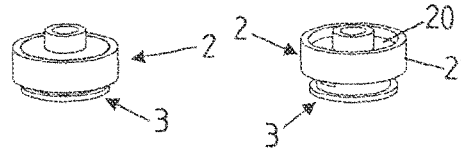 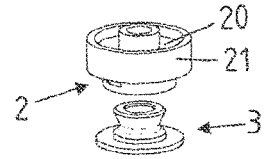
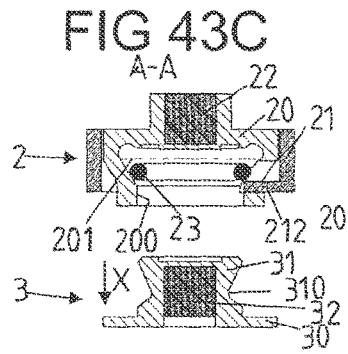 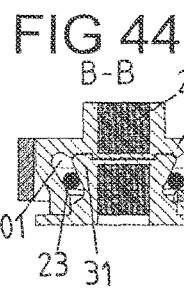 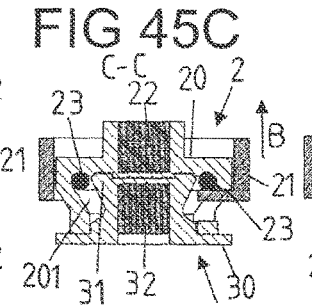 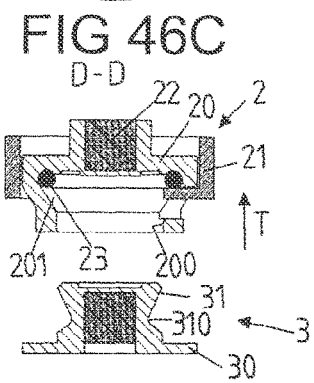
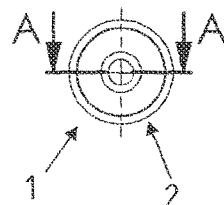 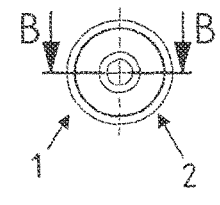 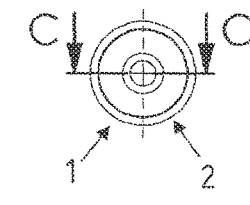 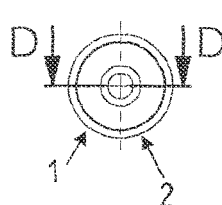

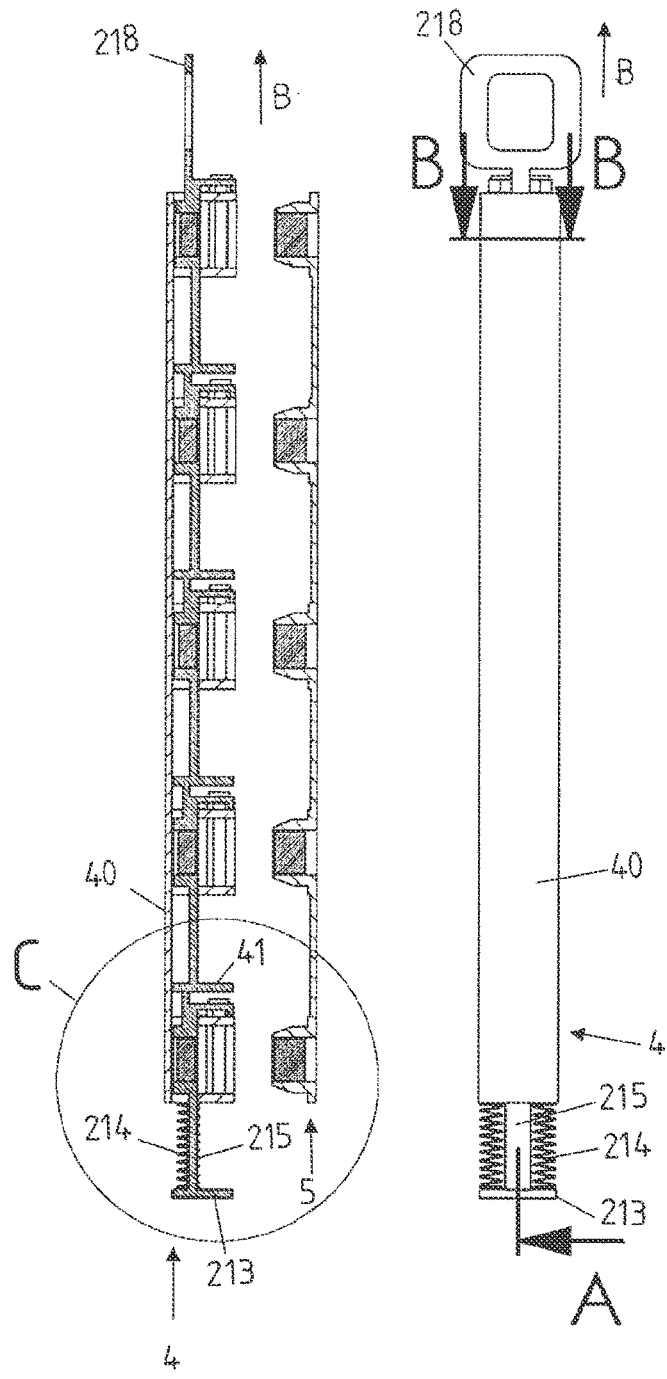

A-A

B-B

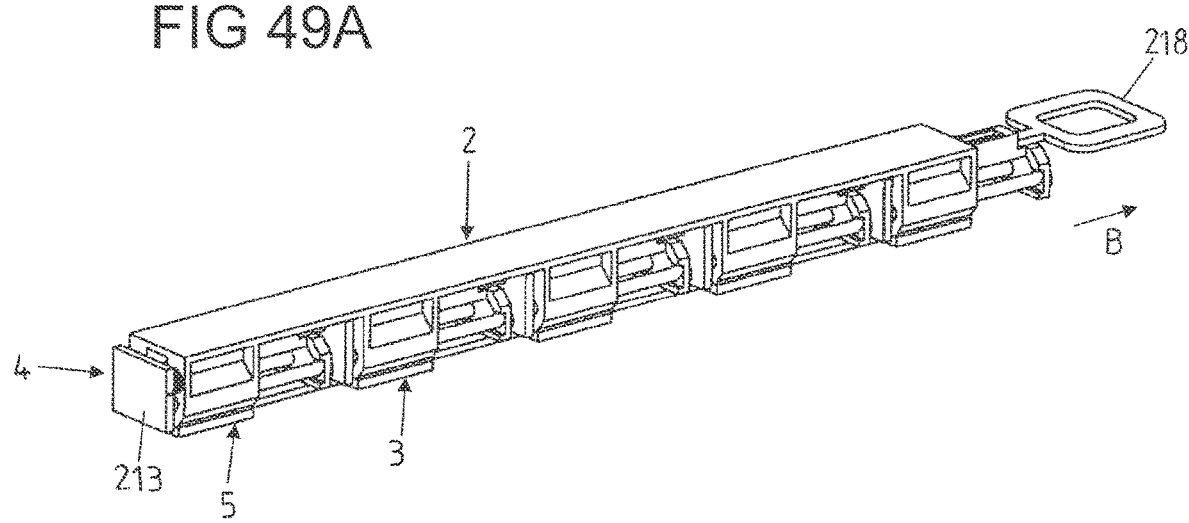
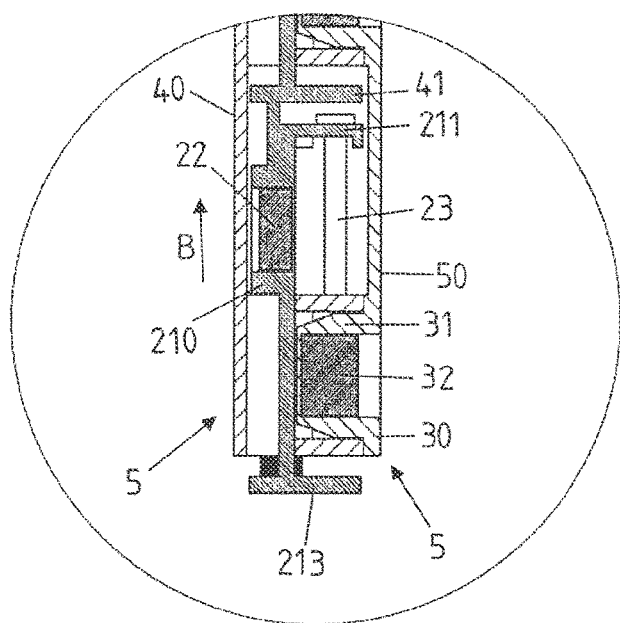

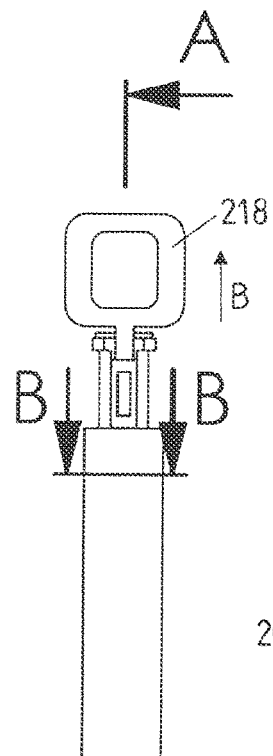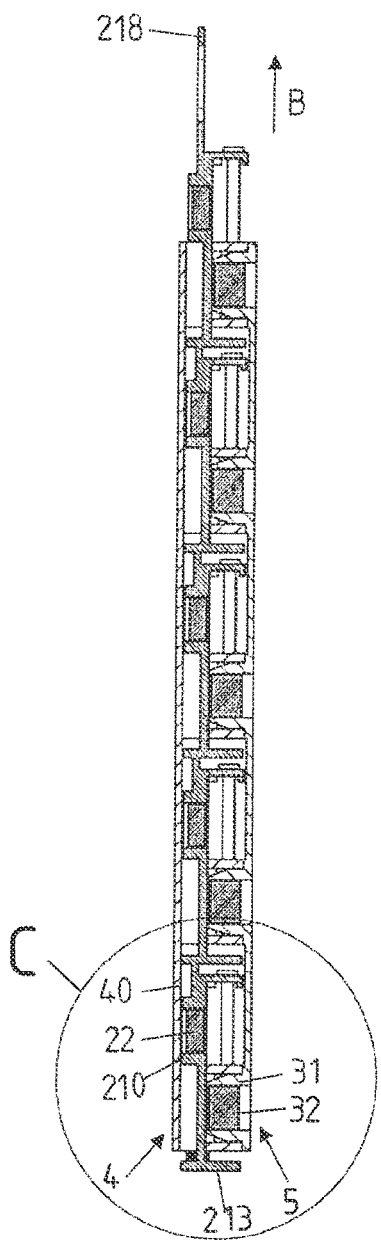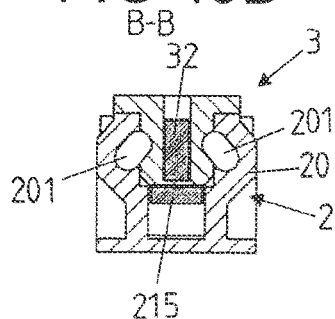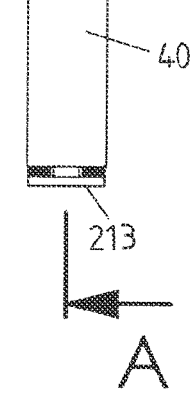

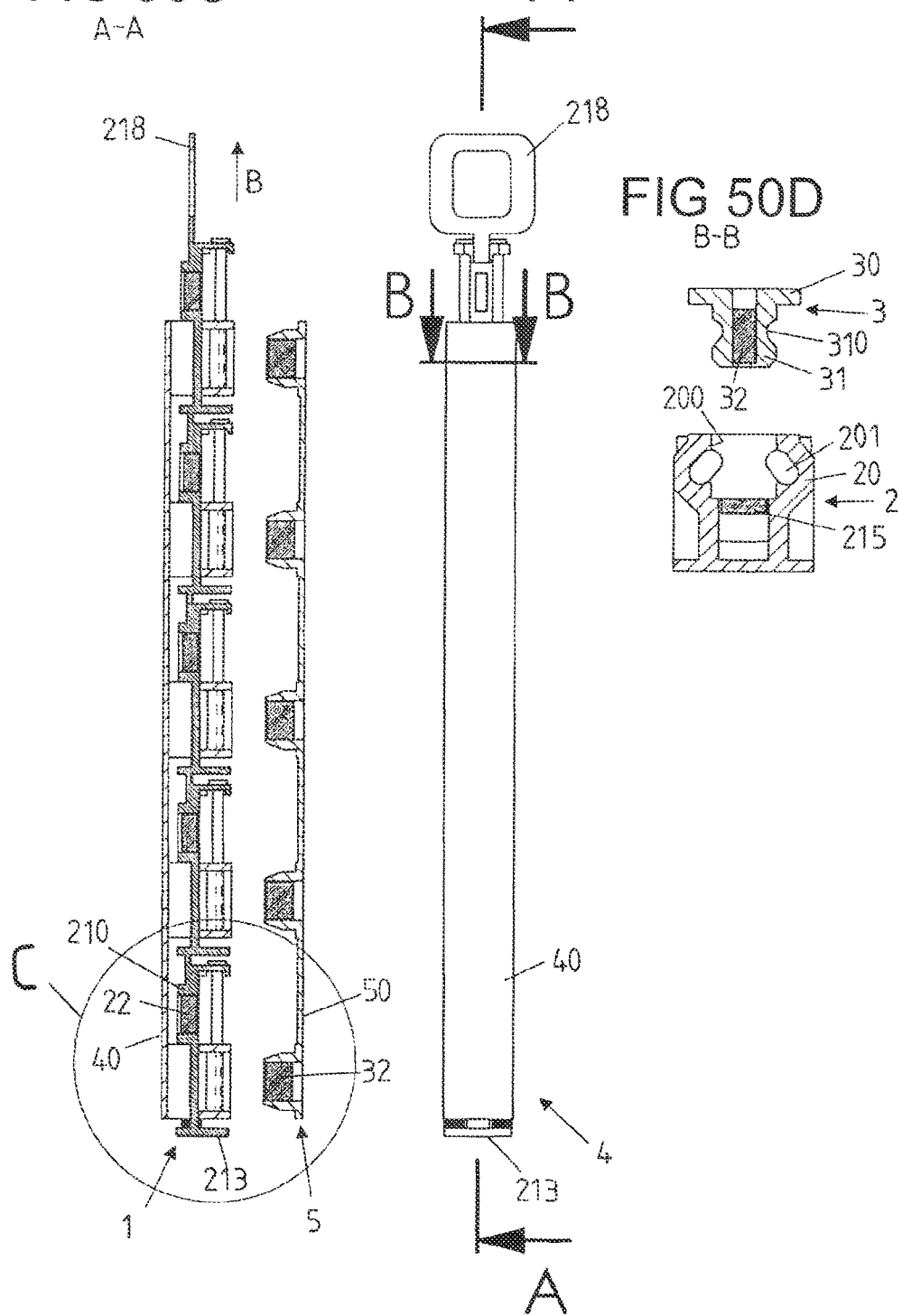

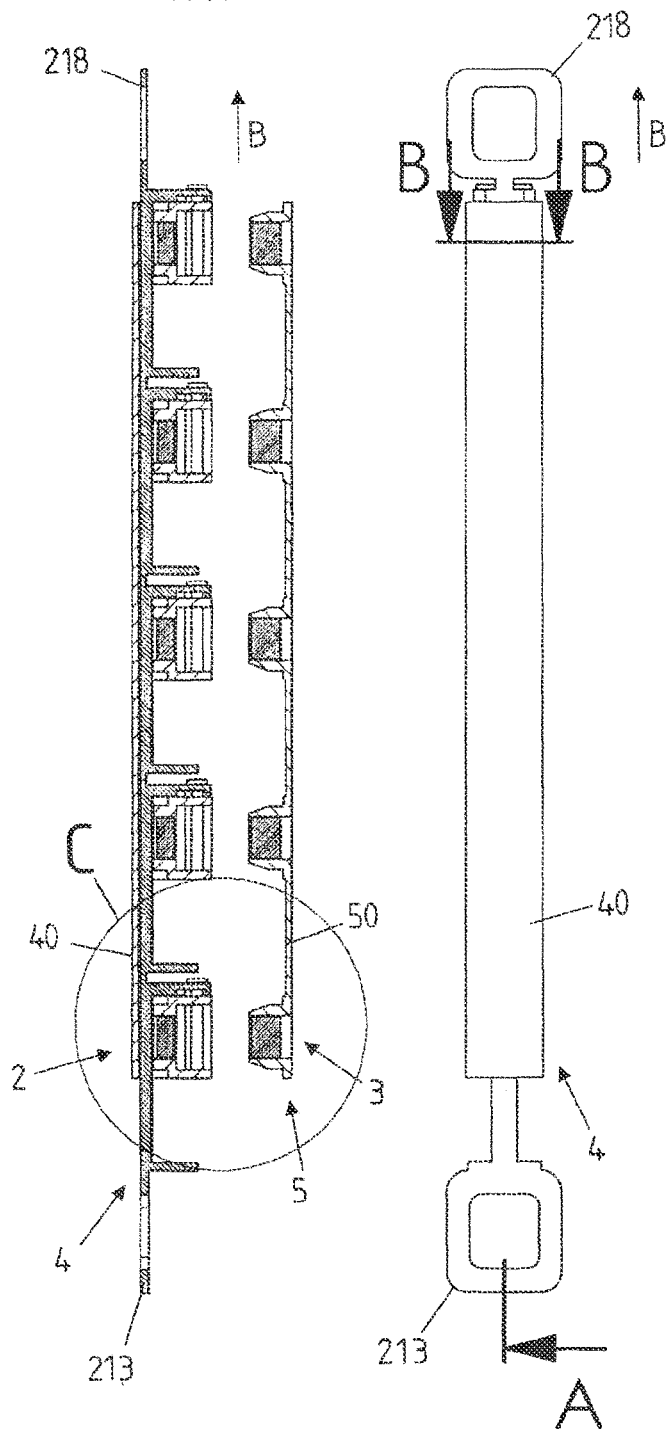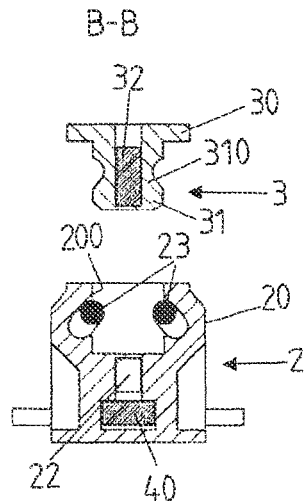

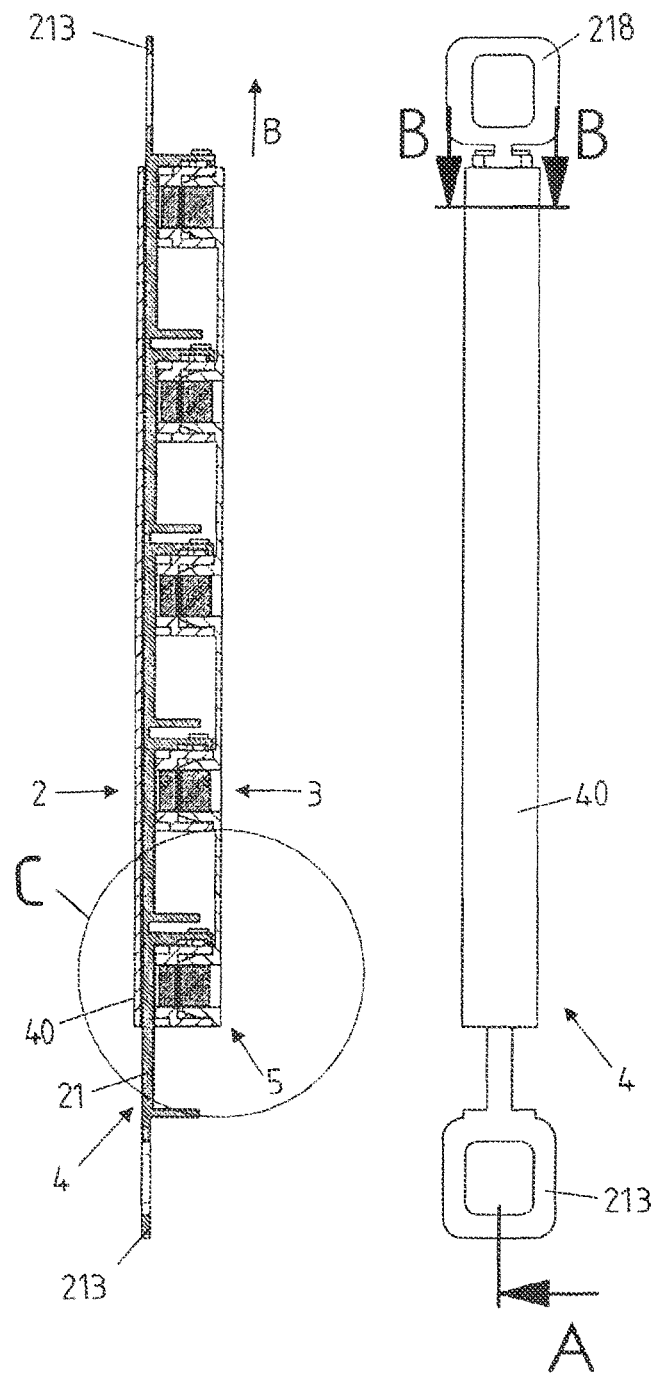
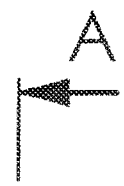
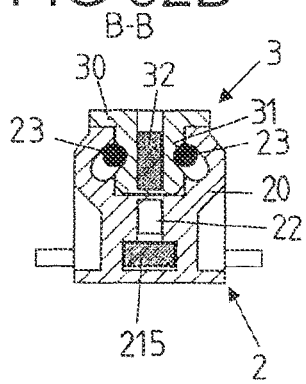

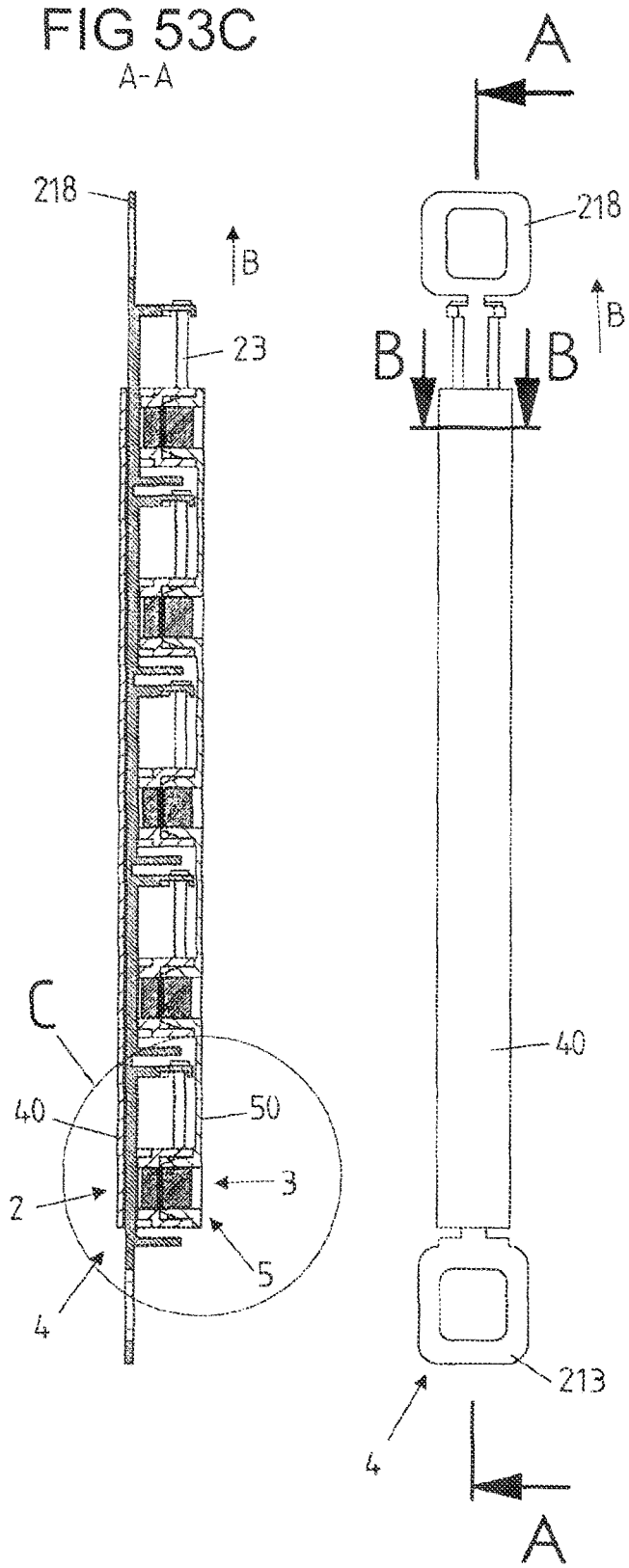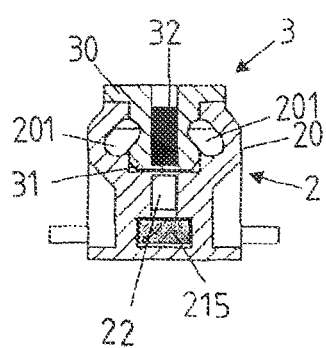

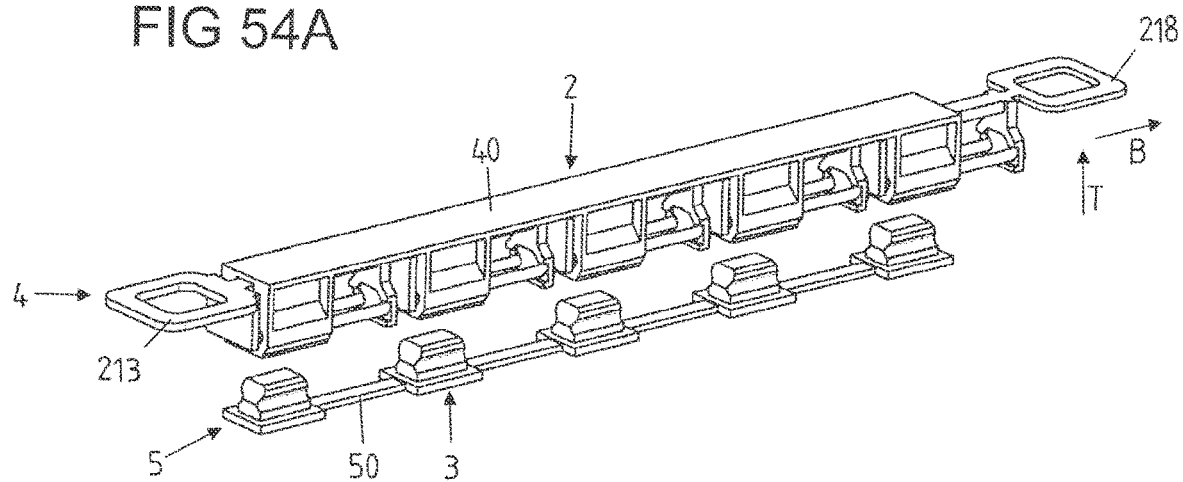
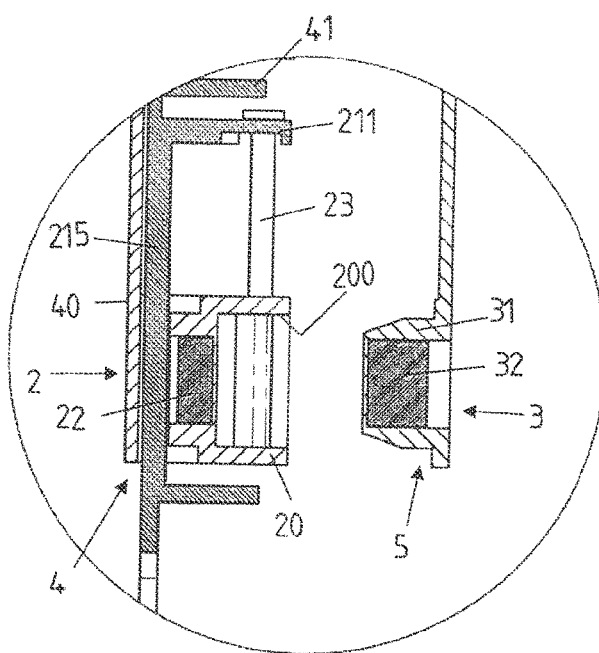

FIG 54B
FIG 54C
A-A
FIG 54D
B-B
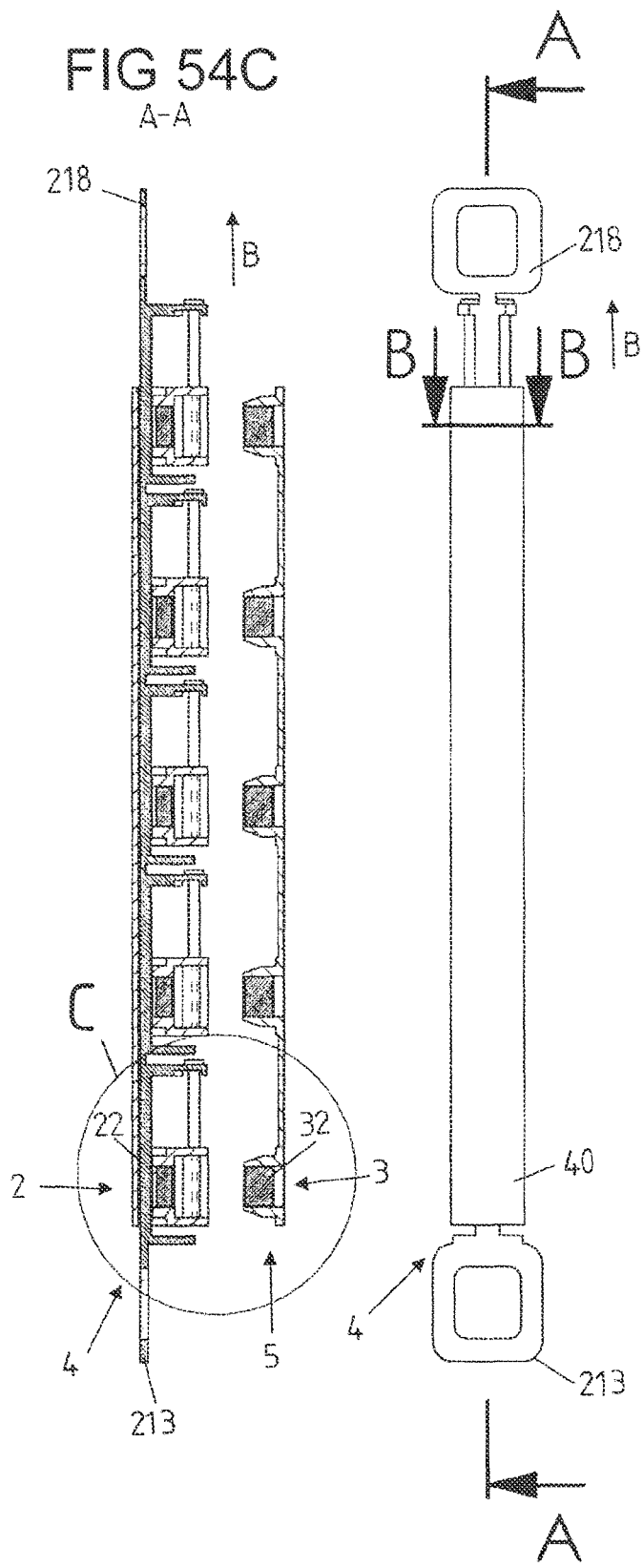
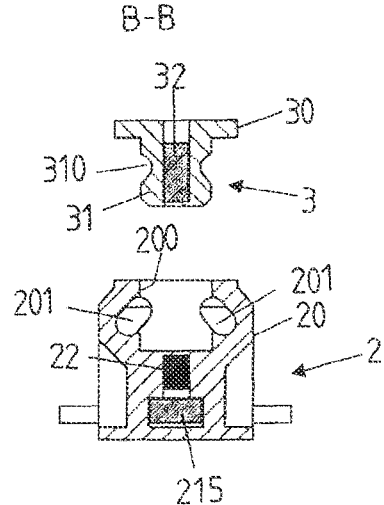

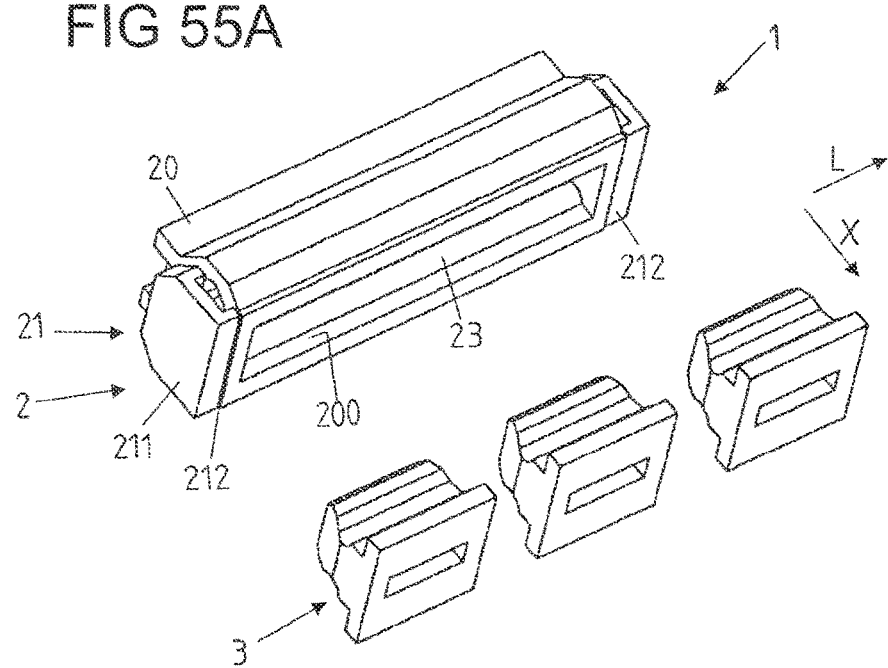
FIG 55A
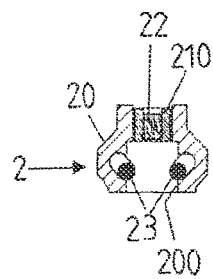
FIG 55B
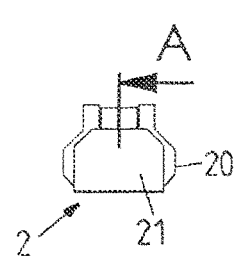
FIG 55C
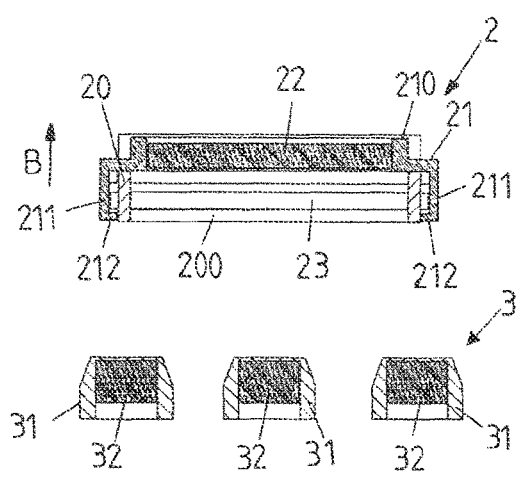
FIG 55D
A-A
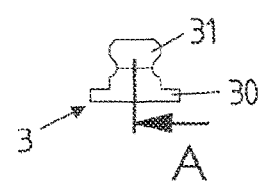

A-A

A-A

FIG 58A
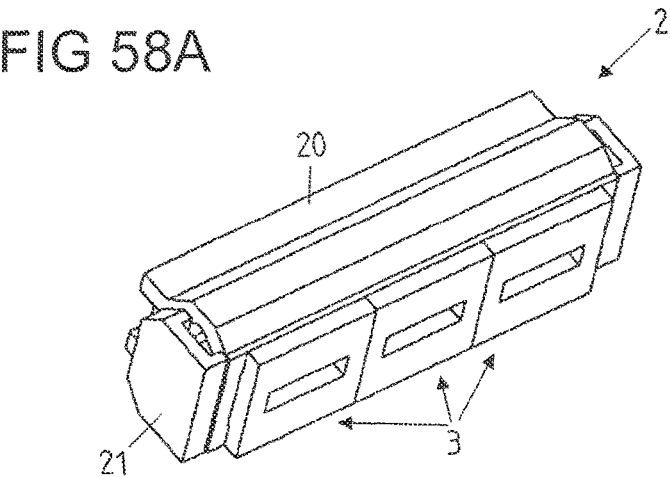
FIG 58B
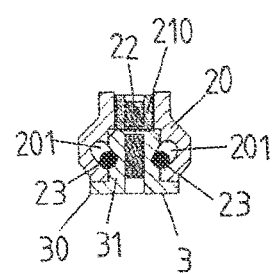
FIG 58C
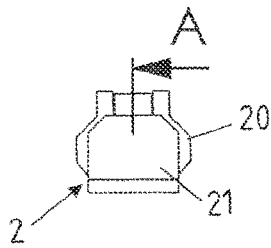
FIG 58D
A-A
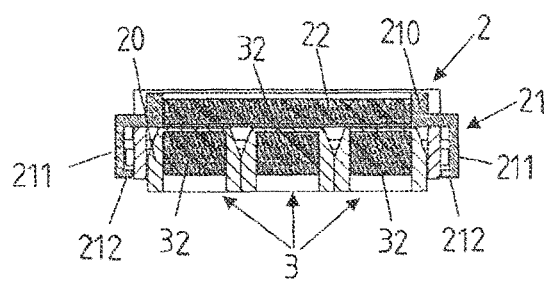

A-A

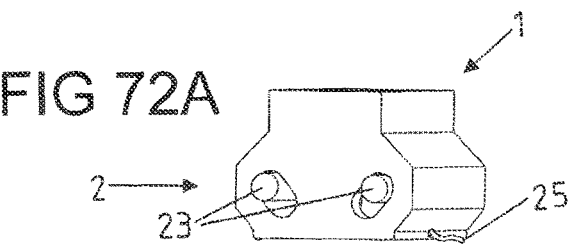
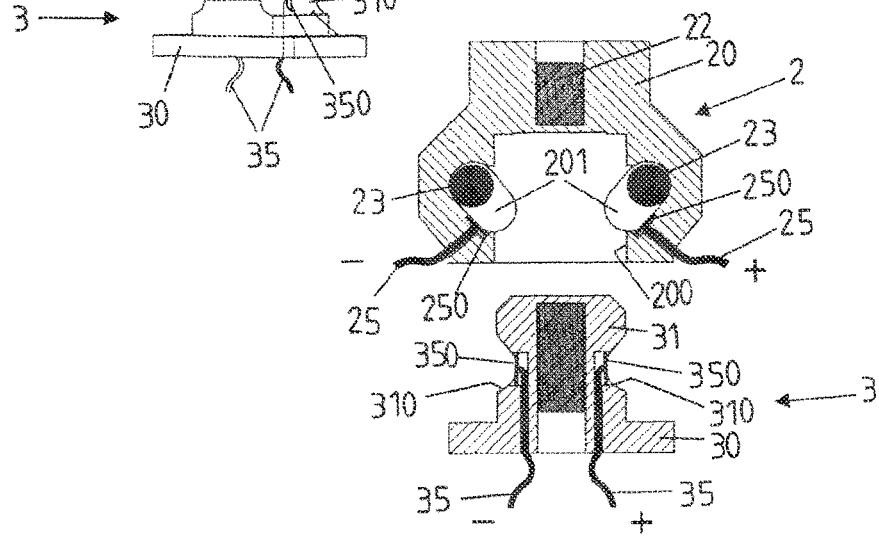
FIG 72A
FIG 72B
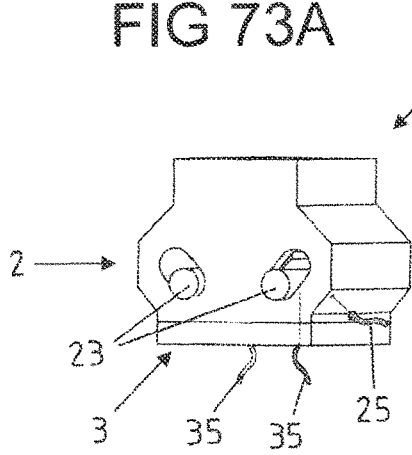
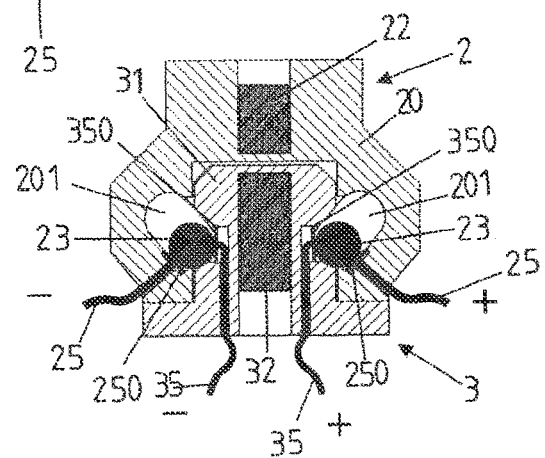
FIG 73A
FIG 73B

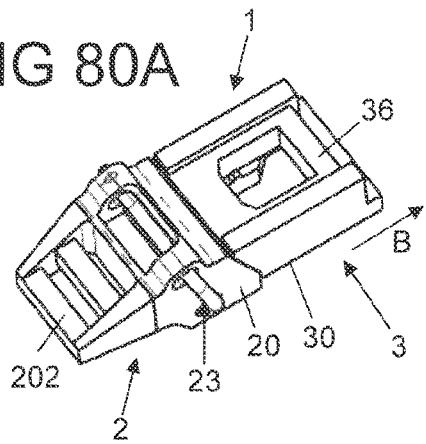
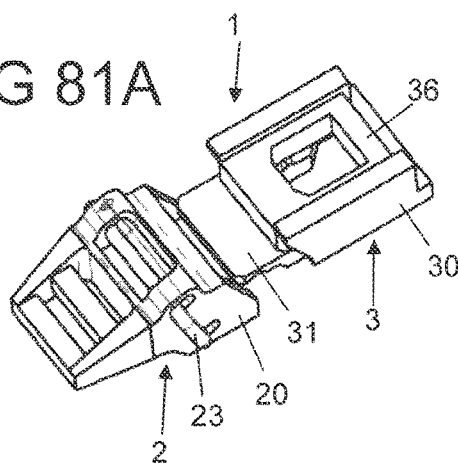
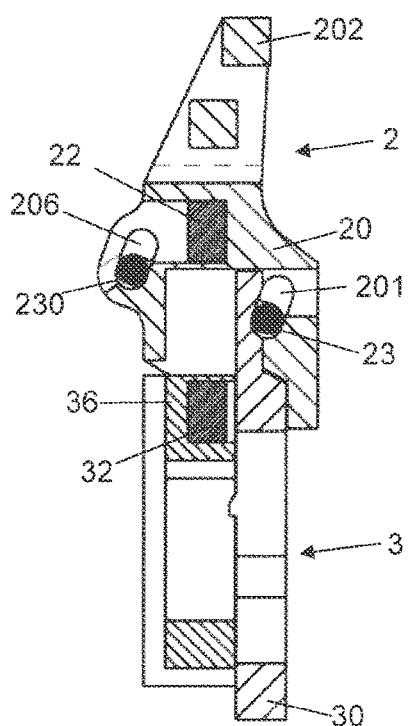
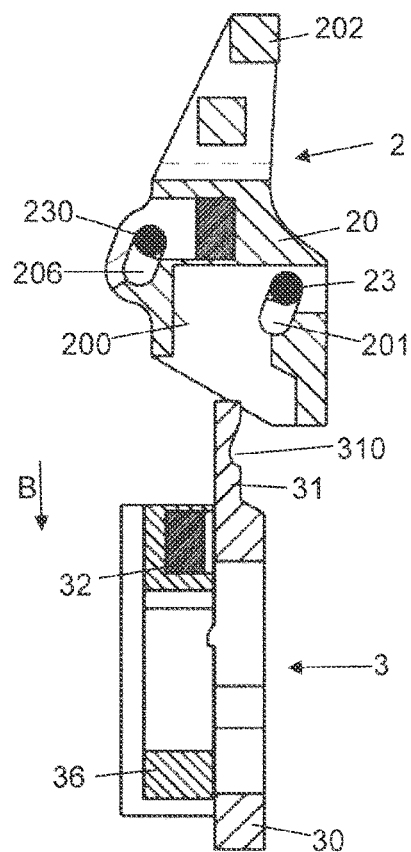

FIG 87
FIG 88
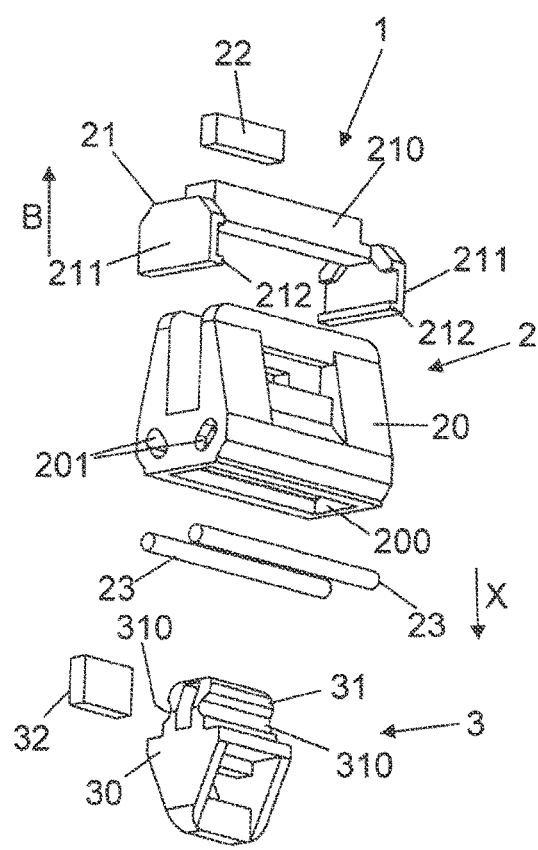
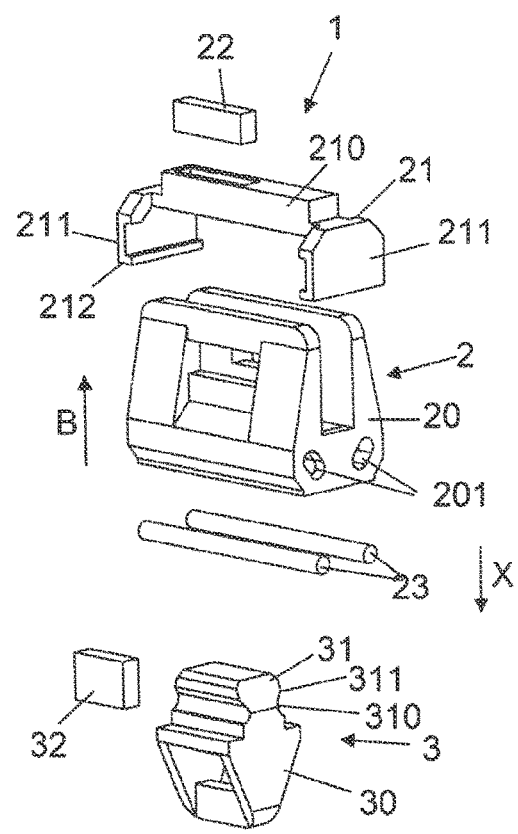

(A-A)

(C-C)

(B-B)

(A-A)

(C-C)

(B-B)

(A-A)

(C-C)

(B-B)

(A-A)

(C-C)

(B-B)

(A-A)

(C-C)

(B-B)

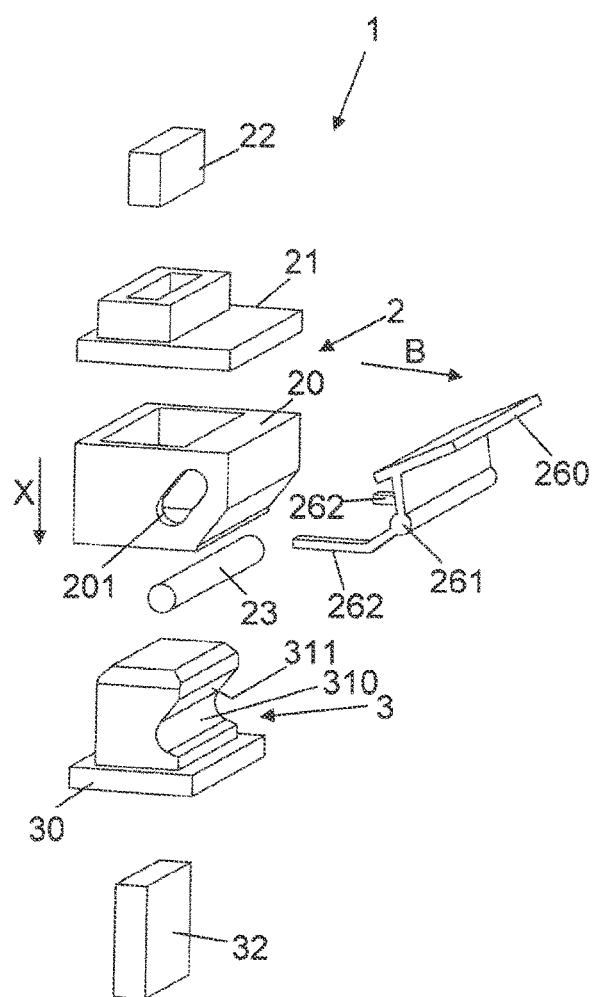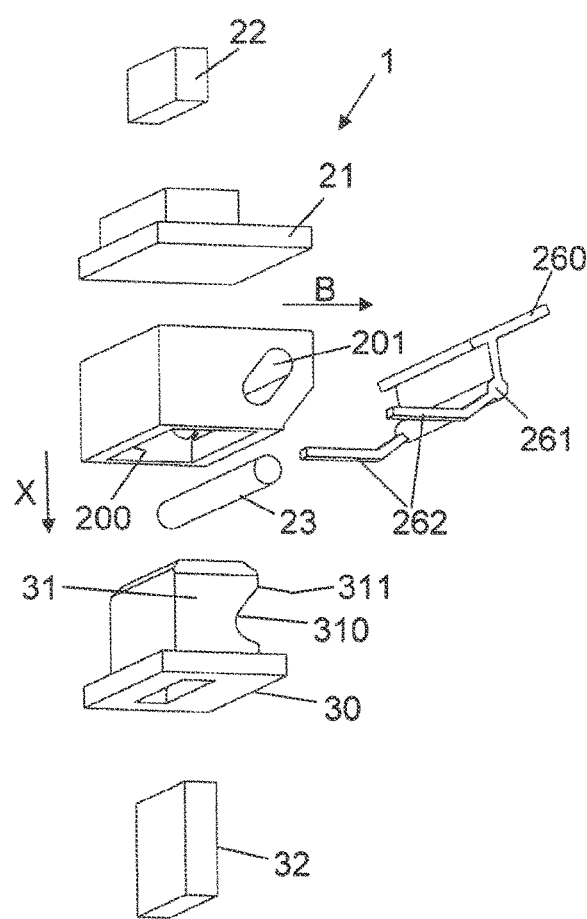

FIG 95A
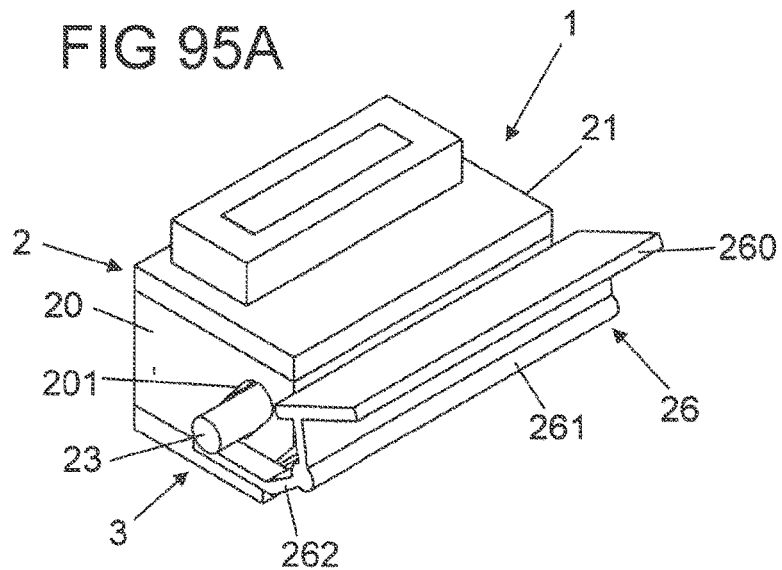
FIG 95B
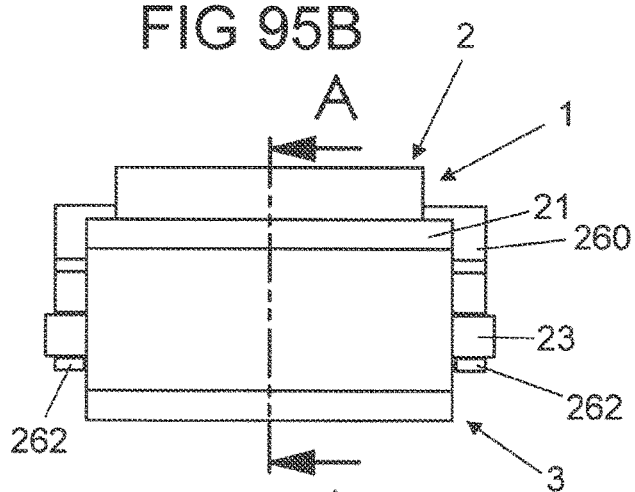
FIG 95C
(A-A)
FIG 95D
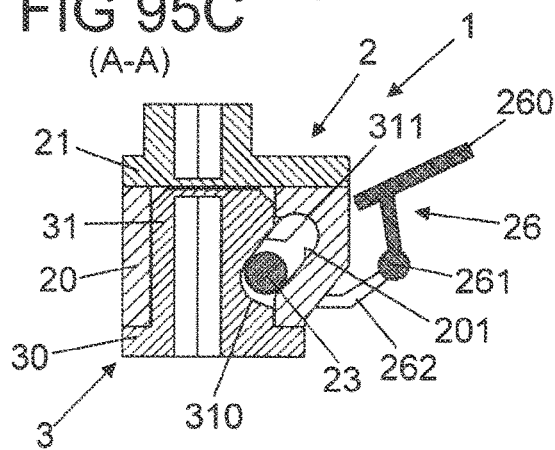

(A-A)

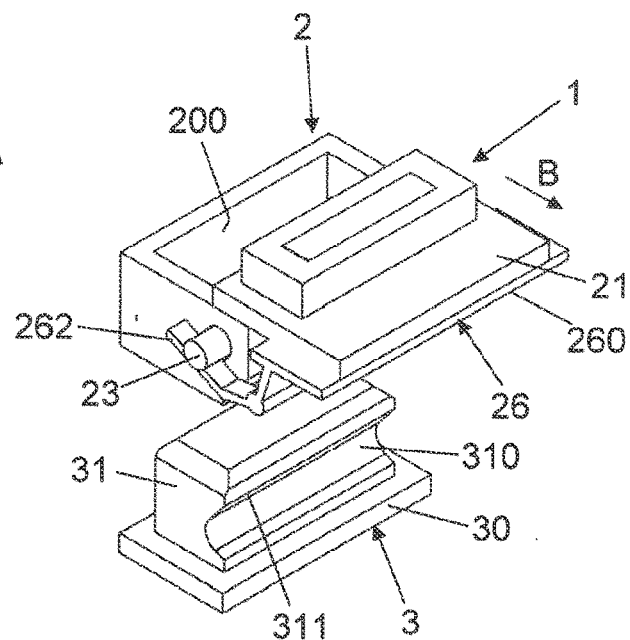
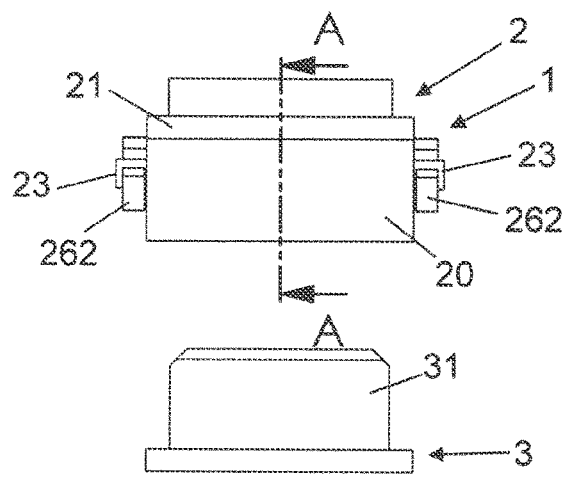
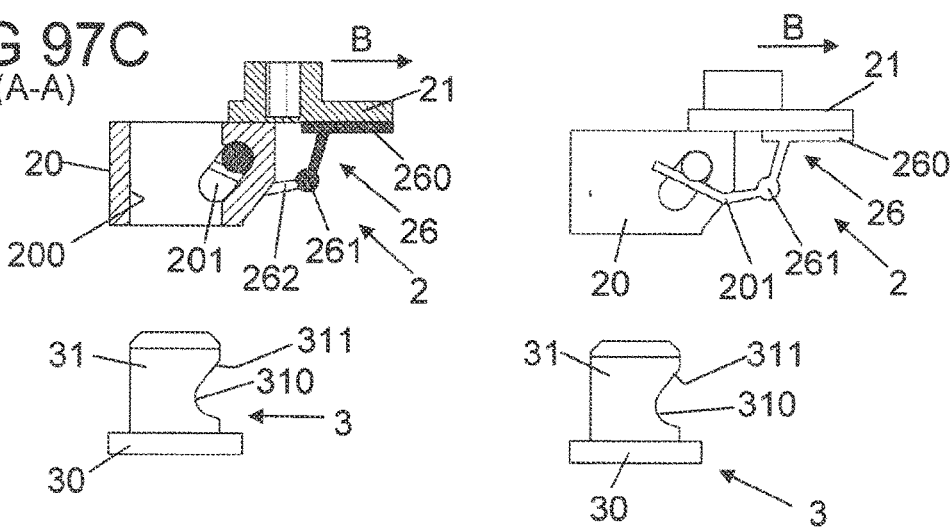

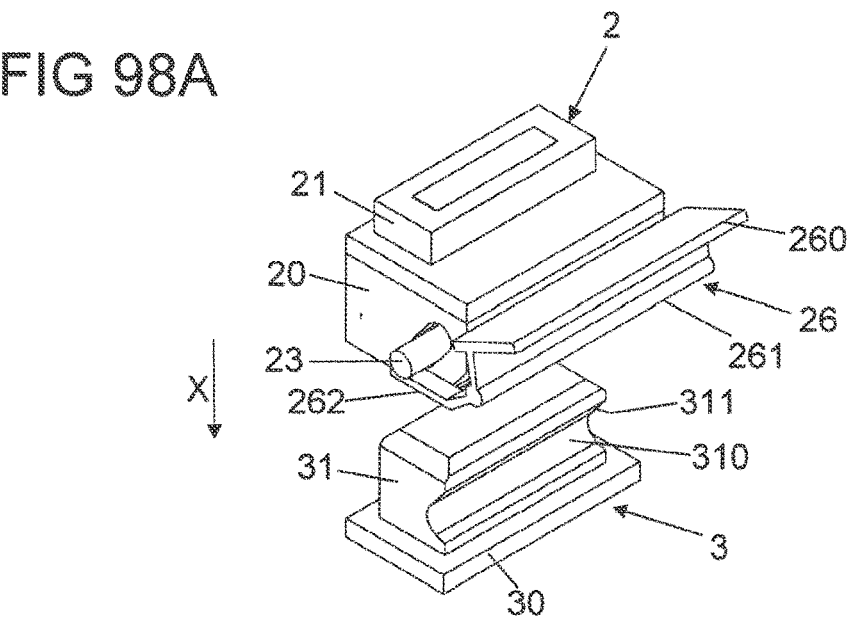
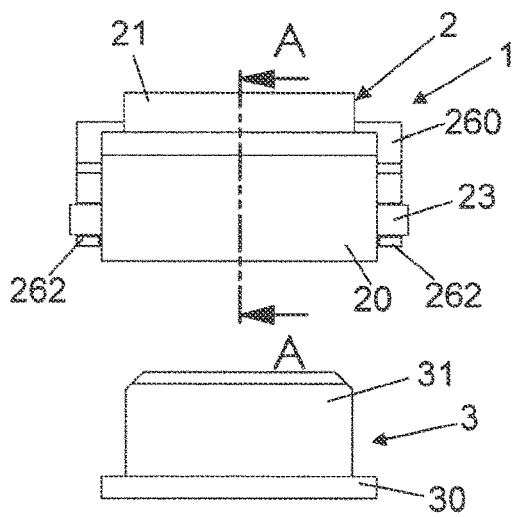
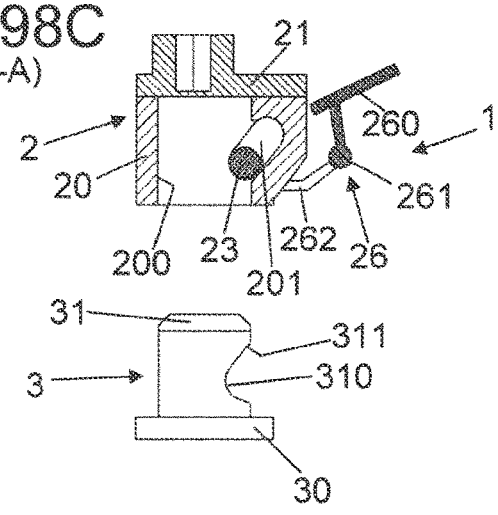
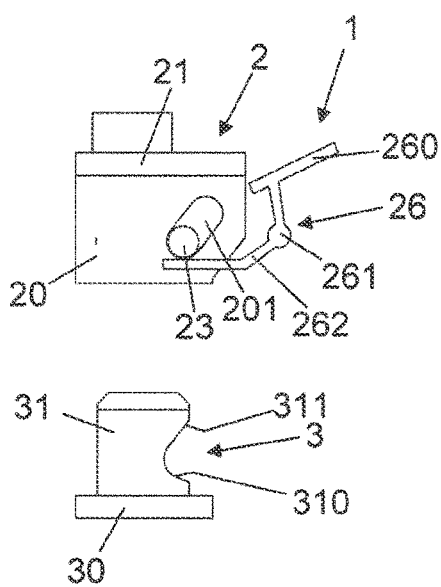

(A-A)

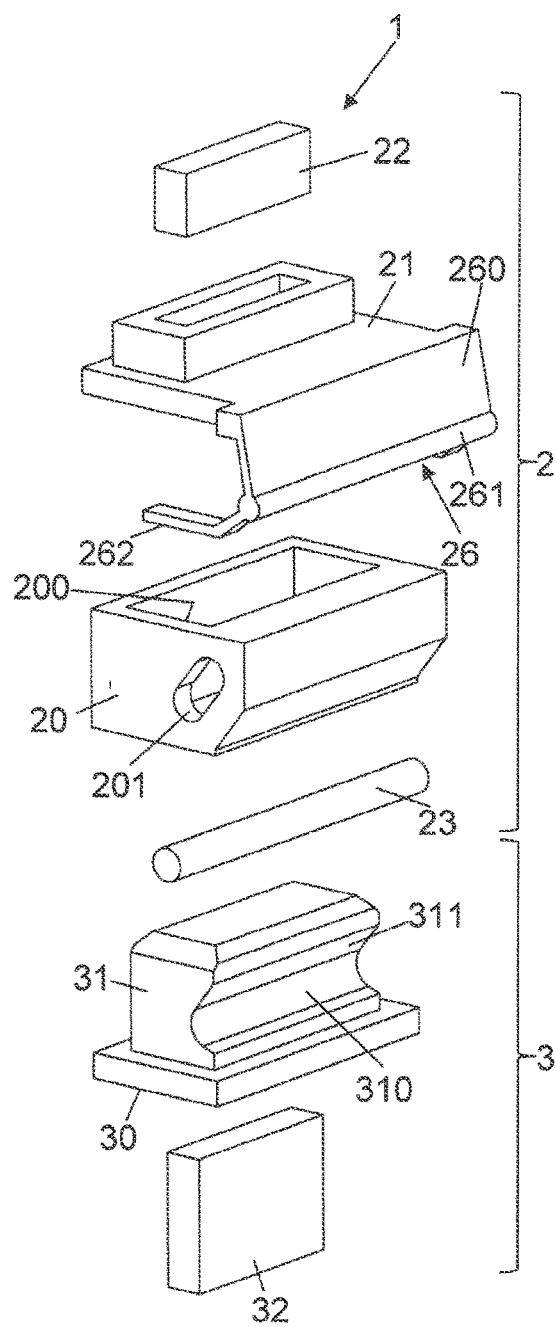
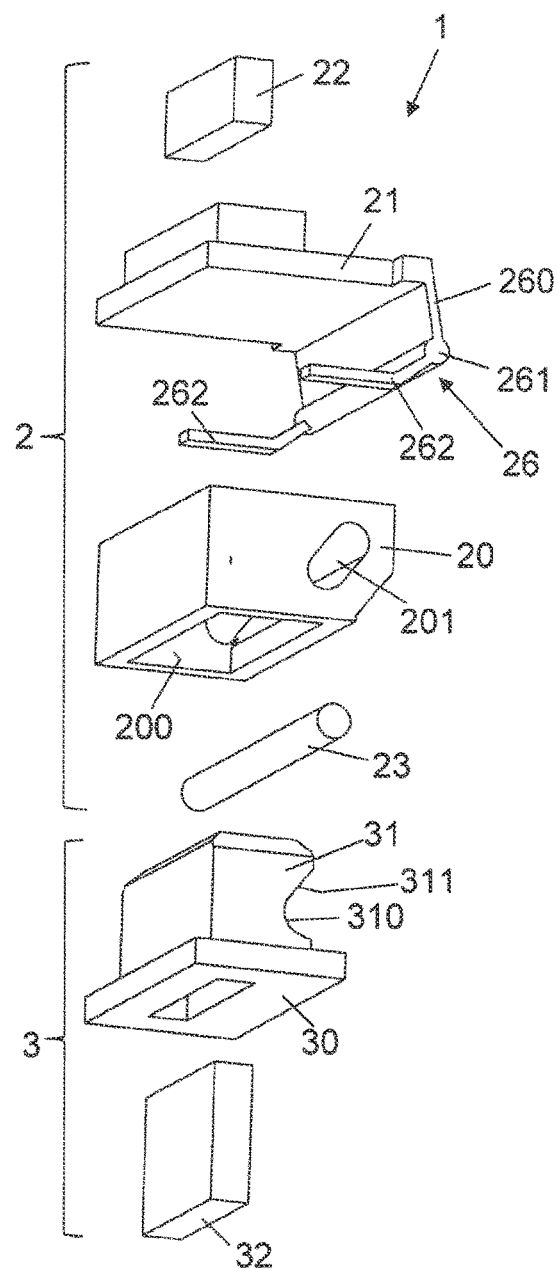

(A-A)

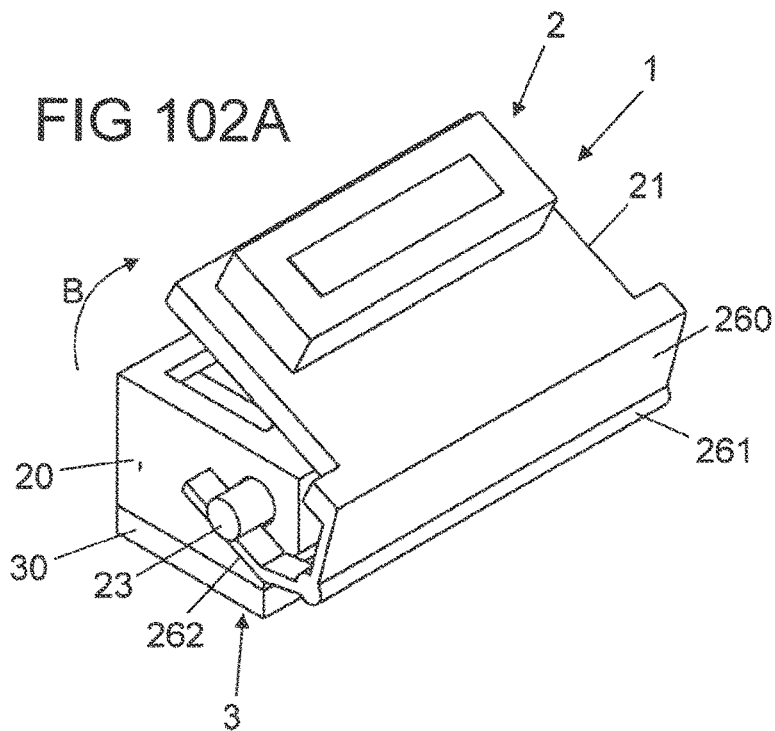
FIG 102A
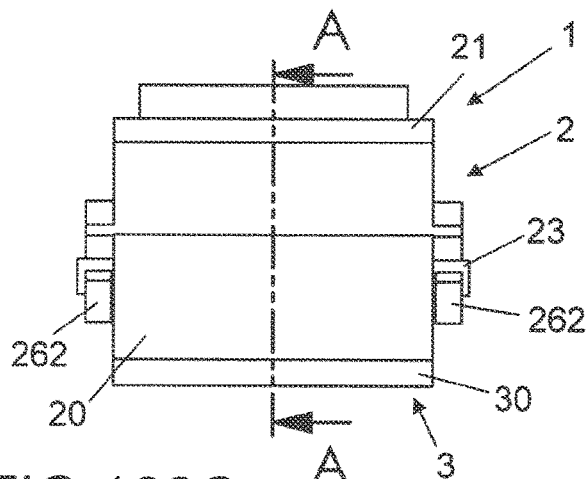
FIG 102B
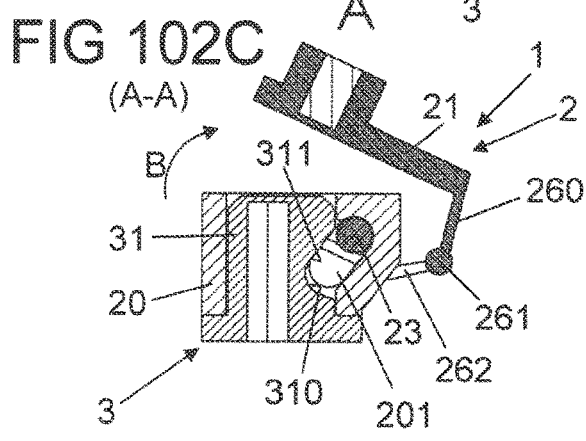
FIG 102C (A-A)
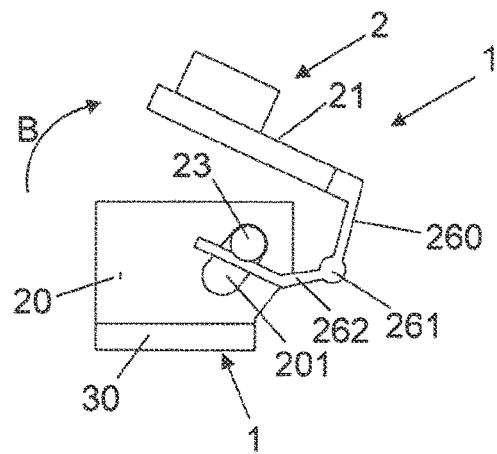
FIG 102D

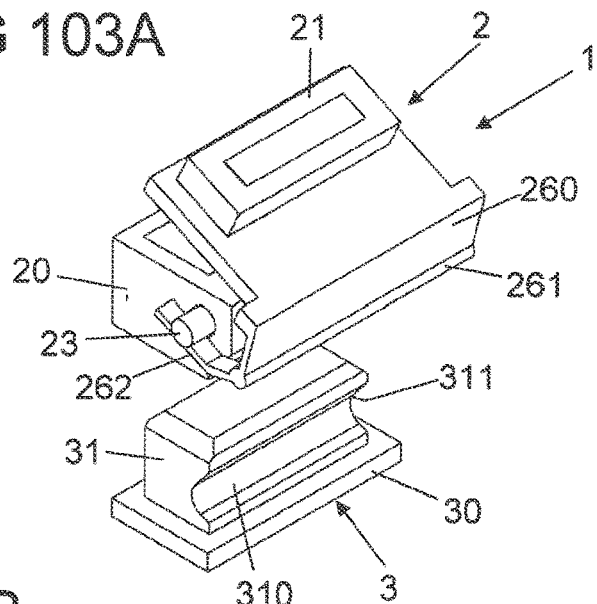
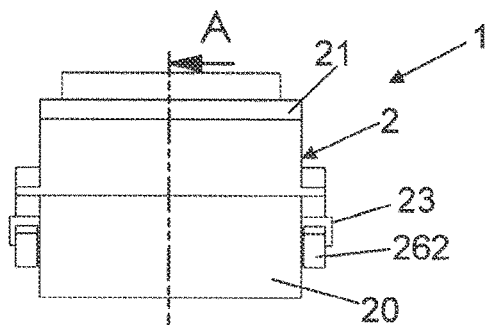
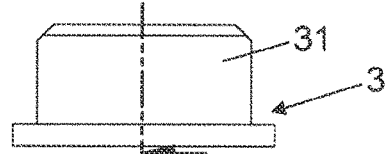
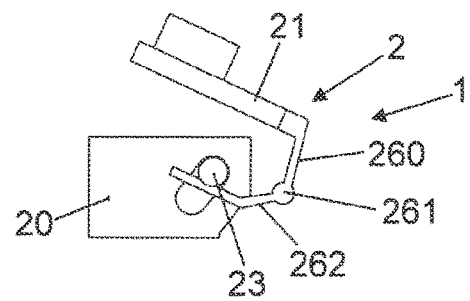
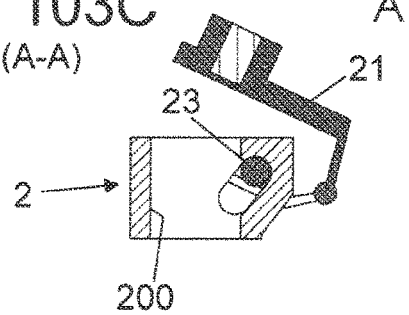
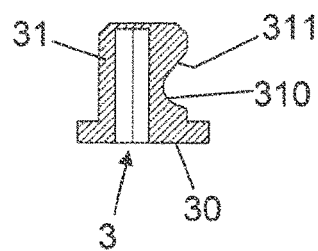
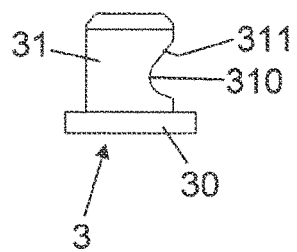

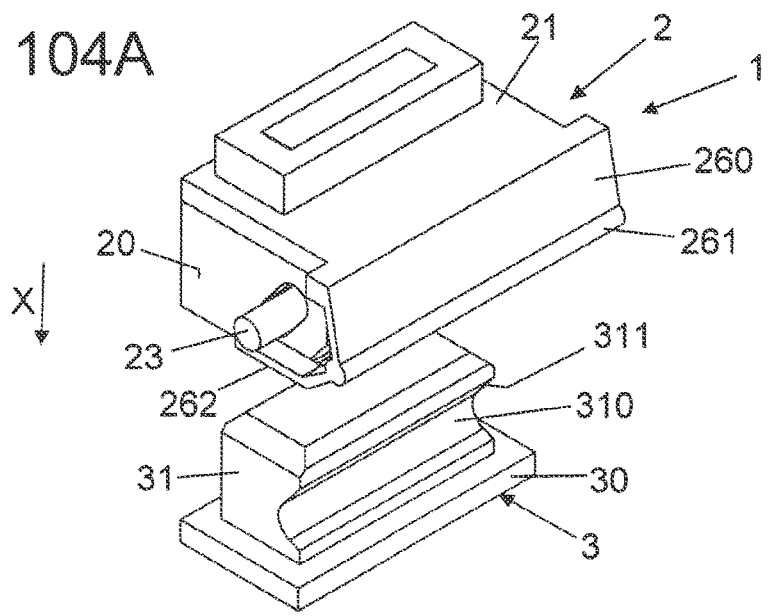
FIG 104A
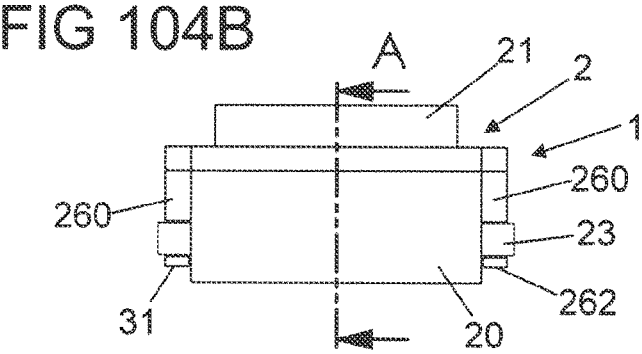
FIG 104B
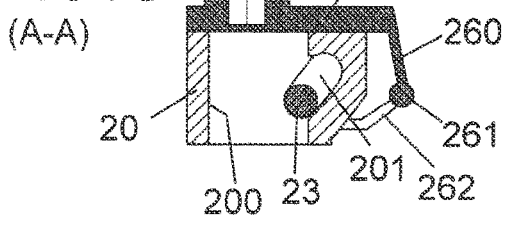
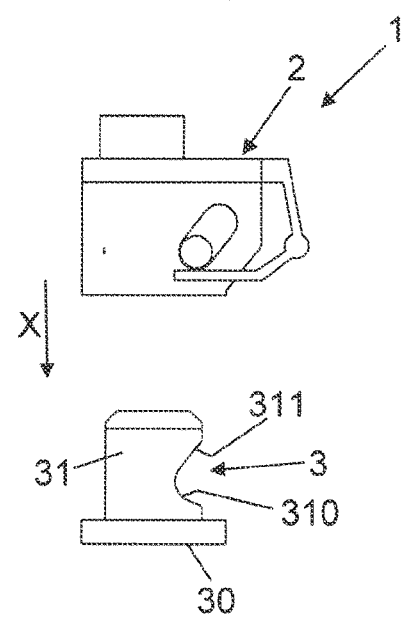
FIG 104D
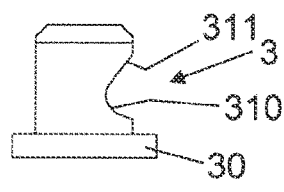
FIG 104C
(A-A)
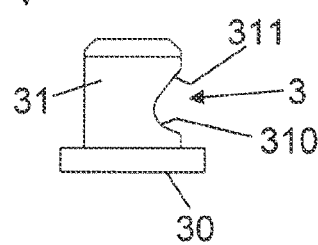

(A-A)

CLOSURE DEVICE WITH CLOSURE PARTS WHICH CAN BE PLACED AGAINST EACH OTHER

CROSS-REFERENCE TO RELATED APPLICATIONS

This application is a continuation of U.S. patent application Ser. No. 17/425,391, filed Jan. 31, 2020, which is the United States national phase of International Application No. PCT/EP2020/052455 filed Jan. 31, 2020, and claims priority to German Patent Application No. 10 2019 201 259.0 filed Jan. 31, 2019, the disclosures of which are hereby incorporated by reference in their entireties.

BACKGROUND OF THE INVENTION

Field of the Invention

The disclosure relates to a closure device.

Description of Related Art

A closure device of this type comprises a first closure part which has a body, and a second closure part, said closure parts for closing the closure device being able to be placed against one another along a closing direction and in a closing position being connected to one another. The closure device furthermore has at least one locking element which is disposed so as to be adjustable on the body of the first closure part. At least one engagement portion is molded on the second closure part. The at least one locking element and the at least one engagement portion in the closing position are mutually engaged in such a manner that the first closure part and the second closure part are locked to one another.

Such a closure device generally serves for connecting two functional groups to one another. Such a closure device can be used, for example, on an electronic apparatus, for example a mobile phone or a tablet computer, so as to (releasably) fix the electronic apparatus to a superordinate functional group, for example to a dashboard of a vehicle or the like. Such a closure device can however also be used on a bicycle, for example, for fastening an object, for example a drinking bottle, to a bicycle frame.

Such a closure device in the closing position is to establish a strong, load-bearing connection between the closure parts. The connection herein is to be releasable in a simple, comfortable manner so as to enable a user to separate the assigned functional groups from one another.

In a closure device known from U.S. Pat. No. 6,182,336, a so-called male part is to be placed against a so-called female part. A magnet which when plug-connected interacts with a disk-shaped locking element on the female part so as to lock the male part and the female part to one another in a closing position, is disposed on the male part.

SUMMARY OF THE INVENTION

It is an object underlying the proposed solution to provide a closure device which in a closing position establishes a strong, load-bearing connection between the closure parts, but at the same time is releasable in a simple and comfortable manner.

This object is achieved by a closure device with features as described herein.

Accordingly, the first closure part has a first magnetic installation and the second closure part has a second magnetic installation. The first magnetic installation and the second magnetic installation when placing the first closure part and the second closure part against one another mutually interact in a magnetically attracting manner. The at least one locking element herein is magnetically configured in such a manner that the at least one locking element in the closing position by way of the first magnetic installation and/or the second magnetic installation is loaded in the direction of engaging with the at least one engagement portion.

The closure device is thus configured as a magnetic closure device. A magnetic installation, for example configured in each case by a permanent magnet, or by a permanent magnet on one closure part and by a magnetic armature from a ferromagnetic material on the other closure part, is in each case disposed on the first closure part and on the second closure part. The magnetic installations magnetically interact in such a manner that, when placing the closure part against one another, the closure parts are pulled toward one another and so as to engage with one another, the closing of the closure device thus being magnetically assisted.

The magnetic installations herein also serve for establishing the locking mechanism between the first closure part and the second closure part in the closing position.

Additionally to the first magnetic installation on the first closure part and to the second magnetic installation on the second closure part, the at least one locking element is thus magnetically configured, for example in that the at least one locking element is entirely or partially made from a ferromagnetic material or is configured so as to be permanently magnetic, such that the at least one locking element magnetically interacts with the first magnetic installation of the first closure part and/or the second magnetic installation of the second closure part.

The at least one locking element can in particular be configured as a passive armature, for example from a ferromagnetic material, which in a magnetically attracting manner interacts with the magnetic installation of the first closure part and/or of the second closure part that is configured as a permanent magnet. Alternatively, the at least one locking element can also be configured as a permanent magnet and thus so as to be actively magnetic.

Irrespective of whether the at least one locking element is configured so as to be magnetically active or passive, the at least one locking element magnetically interacts with the magnetic installation of the first closure part and/or the magnetic installation of the second closure part in such a manner that the at least one locking element in the closing position is loaded with a magnetic attraction force in the direction of engaging with the at least one engagement portion.

The magnetic interaction herein is in particular of such a type that the at least one locking element in the closing position by virtue of the magnetic interaction is pulled so as to engage with the assigned engagement portion. The at least one locking element of the first closure part in the closing position thus engages in the assigned engagement portion on the second closure part such that a locking mechanism between the first closure part and the second closure part is established on account thereof. The locking mechanism is maintained by virtue of the magnetic interaction such that the closure parts in the closing position are fixedly connected to one another in a load-bearing manner.

The locking mechanism can be canceled, counter to the magnetic effect, by acting on the at least one locking element, for example directly or indirectly by way of an assigned adjustment part, such that the closure parts can be separated from one another. On account of the at least one locking element being disengaged from the assigned engagement portion, the closure parts can thus be released from one another and the closure device can be opened.

For example, the at least one locking element of the first closure part in the closing position is magnetically attracted by the second magnetic installation of the second closure part and is brought to engage with the engagement portion of the second closure part. By virtue of the magnetic interaction between the magnetic locking element and the second closure part, the locking mechanism is established in a self-acting manner when the closure device is closed, such that the closure parts in the closing position are fixedly held against one another in a load-bearing manner.

In one embodiment, the first closure part or the second closure part has an engagement opening into which a, for example peg-shaped, engagement element of the respective other closure part can be introduced in order for the closure device to be closed. One of the closure parts is thus configured as a female part (having an engagement opening), while the respective other closure part is designed as a male part (having an engagement element). The at least one locking element can be disposed on the female part, and the at least one engagement portion can be correspondingly disposed on the male part. Conversely however, it is also conceivable for the at least one locking element to be disposed on the male part, while the at least one engagement portion is molded on the female part.

In one embodiment, the at least one locking element is adjustable in a linear manner in a plane defined by the closing direction and a transverse direction extending transversely to the closing direction (and transversely to a longitudinal direction along which the at least one locking element extends in longitudinal terms). Alternatively, the at least one locking element can also be pivoted in the plane defined by the closing direction and the transverse direction. The at least one locking element is in each case adjustable on the first closure part so as to in a first position engage in the at least one engagement portion of the second closure part and in the closing position to thus lock the closure parts to one another. The at least one locking element is adjustable from this first position so as to cancel the locking mechanism and to be able to thus release the closure parts from one another in a simple manner.

The at least one locking element is preferably received in a receptacle opening in the body of the first closure part and is adjustable in this receptacle opening. The receptacle opening can provide guiding for the at least one locking element so as to define a linear adjustment movement or a pivoting movement of the at least one locking element on the body of the first closure part.

In one embodiment, the receptacle opening in relation to the closing direction and in relation to the transverse direction extends obliquely in such a manner that the at least one locking element in the receptacle opening is adjustable along an adjustment direction which extends obliquely in relation to the closing direction and obliquely in relation to the transverse direction. In this case, the at least one locking element is adjustable in a linear manner on the body of the first closure part. The adjustment direction herein extends obliquely in relation to the closing direction such that the at least one locking element can be brought to engage with or disengage from the at least one engagement portion obliquely in relation to the closing direction.

The oblique alignment of the receptacle opening can be such that the at least one locking element can yield in a self-acting manner in the receptacle opening when the closure parts are placed against one another. When the engagement element of the second closure part acts on the at least one locking element, the at least one locking element in the receptacle opening that is inclined so as to be oblique in relation to the closing direction can thus be displaced such that the engagement element is moved along the at least one locking element and the at least one locking element can be brought to engage with the at least one engagement portion on the engagement element.

If the at least one locking element is pivotable on the body of the first closure part, the pivoting direction is thus preferably directed along the transverse direction. The at least one locking element is pivotable about the pivot axle so as to bring the locking element to engage with or disengage from the at least one engagement portion.

In one embodiment, the engagement portion has a first ramp which extends obliquely in relation to the closing direction, extends in a rectilinear manner, or is curved, and the first closure part in the region of the receptacle opening has a second ramp which extends obliquely in relation to the closing direction, extends in a rectilinear manner, or is curved. The at least one locking element in the closing position is disposed between the first ramp and the second ramp such that a locking mechanism between the first closure part and the second closure part is established herewith.

The locking mechanism between the first closure part and the second closure part, in particular along the closing direction, acts in such a manner that the first closure part and the second closure part are held against one another along the closing direction and are thus not readily releasable from one another along the closing direction, at least not without releasing the locking mechanism. If the closure parts are mutually loaded along the closing direction, forces are introduced into the at least one locking element by way of the ramps, wherein the mutual angular position of the ramps determines the strength and robustness of the locking mechanism.

In a first embodiment, the first ramp and the second ramp in the plane defined by the closing direction and the transverse direction extend so as to be mutually parallel. This has the effect that, when the closure parts are mutually loaded in the closing position, the at least one locking element is jammed between planes that are directed so as to be mutually parallel and thus establishes a locking mechanism between the closure parts. The closure parts under load can move relative to one another with a certain degree of play. It is conceivable that the locking mechanism releases in a self-acting manner when a limit force is exceeded, and the closure parts can thus be separated from one another (for example, when the engagement element on account of play between the engagement element and the engagement opening tilts under load, and the ramps are no longer aligned so as to be exactly mutually parallel).

In an alternative embodiment, the angle between the ramps can be greater than zero. The ramps in the plane defined by the closing direction and the transverse direction thus form a mutual angle which is greater than zero, wherein in the case of a curved ramp the angle in relation to a tangent to the ramp is to be measured. This is to be understood such that the available width between the ramps widens toward the outside, thus away from the engagement portion, the ramps thus assuming a wedge shape which widens toward the outside. Such an angular mutual disposal of the ramps has the effect that the closure parts in the closing position are mutually held in a manner that is at least almost free of play. For example, if vibration forces act between the closure parts, this has the effect that the at least one locking element is pulled so as to engage more deeply in the at least one engagement portion, so that the closure parts are pressed so as to mutually engage without play. The closure parts herein can release from one another in a self-acting manner when a specific limit force is exceeded, while canceling the locking mechanism in a self-acting manner.

In yet another alternative embodiment, the angle between the ramps is smaller than zero, wherein in the case of a curved ramp the angle in relation to a tangent to the ramp is to be measured. The ramps in the plane defined by the closing direction and the transverse direction thus form such a mutual angle that the available width between the ramps decreases toward the outside, thus away from the at least one engagement portion. The ramps thus assume a wedge shape which tapers toward the outside. An angular mutual disposal of the ramps of this type has the effect that the connection between the closure parts in the closing position is self-securing. Under load between the closure parts, the at least one locking element is wedged between the ramps in such a manner that the at least one locking element is loaded so as to engage more deeply in the at least one engagement portion, the connection between the at least one locking element and the engagement portion thus being stabilized. A certain degree of play can arise between the closure parts under load.

In one embodiment one of the ramps has a first portion which at an angle of greater than zero in relation to the respective other ramp is disposed in the plane defined by the closing direction and the transverse direction, and moreover a second portion which at an angle of smaller than zero in relation to the respective other ramp is disposed in the plane defined by the closing direction and the transverse direction. For example, the ramp of the first closure part can have such different portions. It is however also conceivable for the ramp to have such different portions on the engagement portion of the second closure part.

It can be achieved on account of the different portions of the ramp that the closure device in the closing position is substantially without play and the first closure part and the second closure part can thus be held against one another substantially without play, on the one hand. In particular, the first closure part and the second closure part in the state without load or a little load can be mutually disposed such that the locking element is disposed between the first portion of the one ramp and the other ramp, the locking element thus being situated in a region between the ramps in which the ramps are mutually disposed in the manner of a wedge that widens towards the outside.

If a load which exceeds a limit force, for example, acts between the closure parts, the locking element can thus make its way out of the region between the first portion of the one ramp and the other ramp and thus be displaced between the ramps such that the locking element is henceforth held between the second portion of the one ramp and the other ramp, for example. By virtue of the disposal of the second portion of the one ramp and the other ramp at a negative angle, thus in the manner of a wedge that tapers toward the outside, it is achieved that the locking mechanism between the closure parts is self-reinforcing under further load. Under heavy load between the closure parts, the locking element is loaded in the direction of engaging with the engagement portion of the second closure part such that that a self-acting release of the locking mechanism cannot arise.

On account of such different portions being provided on the assigned ramp, a mutual disposal of the closure parts without play can be achieved, on the one hand, as well as a reliable, self-reinforcing connection which is not releasable in a self-acting manner even under heavy load, on the other hand.

The first ramp and/or the second ramp in the preceding embodiments can extend in a curved or rectilinear manner in the plane defined by the closing direction and the transverse direction. If the ramp is configured so as to be curved, the tangent at least at one point of the ramp is directed obliquely at an angle in relation to the closing direction.

The first ramp and/or the second ramp can in particular be curved by way of a uniform, constant curvature radius or by way of a variable curvature radius.

If the first ramp and/or the second ramp have/has different portions, the portions may extend so as to be curved or rectilinear. For example, the first portion and the second portion of a ramp can in each case be curved, wherein a tangent on the first portion is oriented obliquely in such a manner that said tangent is disposed at an angle of greater than zero in relation to the other ramp, while a tangent on the second portion is oriented obliquely in such a manner that said tangent extends at an angle of smaller than zero in relation to the other ramp.

The different portions can also be mutually adjoining portions of a curved face, in particular of a circular path.

A ramp can have portions which extend in a curved and rectilinear manner, said portions adjoining one another and optionally being differently directed.

In one embodiment, the at least one locking element in longitudinal terms extends perpendicularly to the plane defined by the closing direction and the transverse direction.

For example, the locking element can be configured so as to be pin-shaped (having a cylindrical shape along a longitudinal direction perpendicular to the closing direction and to the transverse direction). The at least one locking element in the closing position engages with the assigned engagement portion. In order for the closure parts to be released from one another, the at least one locking element in the assigned receptacle opening can be moved obliquely to the closing direction on the body of the first closure part, so as to bring the at least one locking element to disengage from the assigned engagement portion.

Alternatively, the at least one locking element can be configured so as to be annular, wherein the at least one locking element in this case extends circumferentially about the closing direction and herein is circumferentially closed or in circumferential terms opened in one place (i.e. configured as an opened ring). The at least one locking element in the closing position engages with an engagement portion which is molded in an encircling manner about the closing direction on an engagement element of the second closure part, for example. In order for the mutual connection of the closure parts to be released, the at least one locking element can be adjusted, for example in that the radius of the annular locking element is widened and the locking element is thus brought to disengage from the assigned engagement portion of the second closure part. The locking element in this case is thus advantageously configured so as to be elastic at least in portions.

The adjustment of the at least one locking element for canceling the locking mechanism can take place manually by acting directly on the at least one locking element. The at least one locking element can thus be manually moved, counter to the magnetic force of the second magnetic installation of the second closure part, for example in the assigned receptacle opening of the first closure part, so as to in this way bring the at least one locking element to disengage from the engagement portion of the second closure part.

In contrast, the closure device in one embodiment has an adjustment part which serves for acting on and adjusting the at least one locking element. The adjustment part is activatable in an activation direction so as to bring the at least one locking element to disengage from the at least one engagement portion in order to release the first closure part and the second closure part from one another. A user can thus act on the adjustment part so as to act on the at least one locking element by activating the adjustment part and disengage said locking element from the at least one engagement portion so as to in this way be able to separate the closure parts from one another in a simple and comfortable manner.

For example, the adjustment part can be disposed so as to be adjustable on the first closure part. However, the adjustment part can also be configured so as to be adjustable on the second closure part or as an element which is separate from the closure parts. In the latter case, the adjustment part is adjustable in relation to both closure parts but herein not (directly) guided on the closure parts.

The adjustment part in relation to the body of the first closure part can be moved transversely to the closing direction or along the closing direction. Accordingly, the activation direction is directed transversely to the closing direction or along the closing direction. In principle however, other alignments of the activation direction are also conceivable and possible.

If the adjustment part is to be adjusted along the closing direction, the adjustment part can act on ends of the at least one locking element, for example, so as to move the at least one locking element in the receptacle opening of the first closure part that extends obliquely to the closing direction, for example by adjusting the adjustment part along the closing direction, and on account thereof to bring said at least one locking element to disengage from the at least one engagement portion of the second closure part. By adjusting the adjustment part, the at least one locking element in the receptacle opening is thus moved in the plane defined by the closing direction and the transverse direction, and on account thereof is brought to disengage from the at least one engagement portion of the second closure part.

If the adjustment part is to be adjusted transversely to the closing direction, the at least one locking element can be brought to disengage from the at least one engagement portion perpendicularly to the plane defined by the closing direction and the transverse direction by adjusting the adjustment part. In this case, the at least one locking element for canceling the locking mechanism is thus not moved in the plane defined by the closing direction and the transverse direction but perpendicularly to said plane.

In one embodiment, the adjustment part can also be pivotable in relation to the body of the first closure part and thus be moved by pivoting so as to bring the at least one locking element to disengage from the engagement portion of the second closure part.

The adjustment part can mechanically act on the at least one locking element so as to bring the at least one locking element to disengage from the assigned engagement portion when the adjustment part is activated. Alternatively, the adjustment part can also cause an adjustment of the first and/or the second magnetic installation such that the magnetic forces acting on the at least one locking element are varied and the at least one locking element is magnetically pulled so as to disengage from the assigned engagement portion. In this case, the at least one locking element is thus not mechanically adjusted but is brought to disengage from the engagement portion by a magnetic effect when the adjustment part is activated.

Alternatively, the adjustment part can also be brought to disengage by a mechanical or magnetic effect of a body that is independent of the two closure parts but not directly connected thereto. Such a functional group may be characterized as a mechanical transistor in which a third element "switches" the two primary closure parts. For example, the first closure part can be configured conjointly with an end of a guide rod, for example a rod for running elements of a curtain, and the first closure part can be able to be placed against a second closure part that is disposed on a wall or a ceiling. When a curtain which is attached to a plurality of running elements on the rod is now displaced, and the running element that is closest to the first closure part mechanically acts on the locking element and brings the latter to disengage, the curtain rod can be removed. A running element which contains a magnet can cause a magnetic adjustment when moving close to the first closure part, as long as the magnetic force, arrangement and polarization are suitably dimensioned in relation to the magnets in the first and second closure part. For example, bringing the locking element to disengage can be caused in that a magnet disposed in a running element is significantly stronger than a magnet disposed in the first closure part.

The magnet disposed in the running element can also have the effect that the running element is magnetically pulled towards the first closure part. Such an arrangement is of course not limited to the arrangement of a curtain but can be scaled up or down so as to be used in a multiplicity of applications.

In one embodiment, the closure part, counter to the activation direction, is spring-preloaded toward a portion of the first closure part. Upon activating the adjustment part in the activation direction, the adjustment part, by virtue of being spring-preloaded, is reset to an initial position in a self-acting manner.

In one embodiment, the first magnetic installation of the first closure part is disposed on the adjustment part and adjustable conjointly with the adjustment part. In consequence, the magnetic attraction forces between the first closure part and the second closure part are also influenced, in particular weakened, by adjusting the adjustment part, such that not only the locking mechanism is released, but also the magnetic adhesion between the closure parts is weakened, and potentially even reversed to a repulsion, on account of the adjustment part being activated. This can further assist in releasing the closure parts from one another.

If the adjustment part is disposed so as to be adjustable along the closing direction on the body of the first closure part, on account of the adjustment part being activated, the first magnetic installation is correspondingly removed in the closing direction away from the second closure part and the second magnetic installation disposed on the latter. If the adjustment part is adjustable transversely to the closing direction and thus perpendicularly to the plane defined by the closing direction and the transverse direction, the first magnetic installation, when adjusting the adjustment part, is removed transversely to the closing direction away from the second closure part and the second magnetic installation disposed on the latter.

In one embodiment, a user acts directly on the adjustment part so as to activate the adjustment part and, on account thereof, to be able to cancel the locking mechanism between the closure parts and to thus be able to release the closure parts from one another.

In another embodiment, the first closure part, additionally to the adjustment part, can have at least one effective element which in relation to the adjustment part is adjustable along an effective direction, different from the activation direction, and is operatively connected to the adjustment element in such a manner that adjusting the effective element in the effective direction causes the adjustment part to be activated in the activation direction.

In this case, a user acts on the effective element in order for the adjustment part to be activated. For example, the effective element can be coupled to the adjustment element in a force-deflecting manner, for example by way of oblique planes which are mounted so as to slide on one another, such that an adjustment of the effective element along the effective direction leads to the adjustment part being adjusted along the activation direction. The effective direction can be directed transversely to the closing direction, for example, while the activation direction along which the adjustment part is to be moved is directed along the closing direction. A user can depress the effective element, for example, so as to hereby activate the adjustment part along the activation direction and to thus cancel the locking mechanism between the closure parts by acting on the at least one locking element.

In one embodiment, the effective element, counter to the effective direction, is spring-preloaded toward a portion of the first closure part. When a user no longer acts on the effective element, the effective element by virtue of the spring-preloading acting between the effective element and the portion of the first closure part is thus reset to an initial position in a self-acting manner.

Additionally or alternatively to the adjustment part on the first closure part, an adjustment part can also be disposed on the second closure part. The second magnetic installation can be disposed on the adjustment part of the second closure part, for example, such that the second magnetic installation is adjusted by adjusting the adjustment part and a magnetic force acting on the at least one locking element can be varied on account thereof.

In one embodiment, the first closure part has a rocker element which in relation to the body of the first closure part is pivotable about a pivot axle, and is able to be moved by the adjustment part so as to adjust the at least one locking element. For example, the adjustment part herein can be moved in a linear manner on the body of the first closure part, for example by displacing the adjustment part transversely to the closing direction and relative to the body of the first closure part. The rocker element is pivoted by activating the adjustment part and thus acts on the at least one locking element so as to unlock the locking element and thus to bring the latter to disengage from the engagement portion of the second closure part.

However, the adjustment part can also be pivotable conjointly with the rocker element, and in this case can be configured so as to be integral to the rocker element and in one piece with the latter, for example.

The pivot axle of the rocker element can be directed so as to be parallel to the axis of longitudinal extent of the locking element, for example. If the locking element is configured as a elongate bar, for example, the rocker element in relation to the body of the first closure part is adjustable about a pivot axle which is directed so as to be parallel to the bar of the locking element, for example.

In one embodiment, the rocker element has an activation portion for acting on the at least one locking element. The rocker element herein is pivotable in relation to the body of the first closure part so as to bring the at least one locking element to disengage from the at least one engagement portion in order to release the first closure part and the second closure part from one another. The rocker element by way of the activation portion acts on the at least one locking element so as to move the locking element relative to the engagement portion of the second closure part and thus to unlock the connection between the closure parts when activating the rocker element.

The adjustment part can be manually moved. A user can thus act on the adjustment part so as to activate the adjustment part and, on account thereof, unlock the at least one locking element, for example.

In one embodiment however, it is also conceivable for the adjustment part to be activated in a self-acting manner, for example by a movement of the closure parts relative to one another. For example, the second closure part can thus be displaceable in a linear manner on the first closure part, for example in an engagement opening into which the second closure part by way of the engagement portion is able to be plugged in in order to connect to the first closure part. The displacement movement of the second closure part relative to the first closure part can be directed transversely to the closing direction, wherein the magnetic attraction force between the second closure part and the adjustment part may be reversed on account of the second closure part being displaced relative to the first closure part, such that the adjustment part is activated for releasing the locking mechanism.

Such a reversal of the magnetic effect in an arrangement of a plurality of magnetic poles on the adjustment part can be effected in that the second closure part and the adjustment part are moved close to one another by way of identical poles. A reversal of the magnetic effect can however also be effected when a (single) magnetic element which by way of only one magnetic pole points toward the second closure part is disposed on the adjustment part. When displacing the second closure part relative to the adjustment part a so-called edge effect can arise in which the magnetic effect is reversed from attraction to repulsion when a magnetic element of the second closure part is moved tangentially to the magnetic element of the adjustment part and thus shears away from the magnetic element of the adjustment part.

Alternatively, the second closure part can also mechanically act on the adjustment part so as to mechanically activate the adjustment part and to thus unlock the element.

In another embodiment, the second closure part may be able to move transversely to the closing direction on the first closure part, wherein the at least one locking element is able to be moved from the closing position by moving the second closure part relative to the first closure part. In this case, an adjustment part is not necessarily required. The second closure part during a displacement movement can act mechanically or magnetically on the at least one locking element, for example, so as to adjust the locking element from the closing position and to thus unlock the closure device. A mechanical interaction can be caused in that, for example, the second closure part when displaced interacts with the at least one locking element by way of an inclined plane. Magnetic interaction can thereby take place in that, for example, a magnetic attraction force acting on the at least one locking element in the direction of an engagement with the engagement portion is reversed to a magnetic repulsion, for example in that portions of dissimilar magnetization, for example a plurality of magnetic poles or else magnetic and non-magnetic portions, are disposed on the at least one locking element.

The first closure part can have only one locking element, for example. In one embodiment however, the first closure part has two (or more) locking elements. If two locking elements are provided on the first closure part, the locking elements are disposed on both sides of an engagement opening which is molded on the first closure part, for example, and can thus interact with the engagement element of the second closure part and engagement portions molded thereon on both sides, so as to establish a locking mechanism on both sides in the closing position.

In one embodiment, the second closure part is designed as a rigid element having a base and a rigid engagement element in the manner of a peg which for engaging in an assigned engagement opening of the first closure part is integrally molded on the base. In one embodiment, the second magnetic installation of the second closure part can be disposed on the engagement element such that the first closure part and the second closure part, upon engagement of the engagement element with the engagement opening, interact in a magnetically attracting manner and are pulled so as to mutually engage in a self-acting manner. One or a plurality of engagement portions herein can be molded on the engagement element of the second closure part such that one or a plurality of locking elements of the first closure part in the closing position of the closure device engage in a locking manner with the second closure part.

In another embodiment, the at least one engagement portion is disposed so as to be able to move on the base. In this case, the engagement portion is not molded so as to be rigid in relation to the base of the second closure part, but is able to be elastically deflected in relation to the base, such that the locking mechanism between the closure parts can be released by deflecting the at least one engagement portion.

The closure part has a blocking piece which is adjustable in relation to the base, for example. The position of the engagement portion in relation to the base in the closing position is blocked by way of the blocking piece such that the locking mechanism between the closure parts is secured. Accordingly, the blocking piece in a blocking position is oriented in relation to the at least one engagement portion such that the at least one engagement portion cannot be brought to disengage from the at least one locking element. The blocking piece is adjustable from the blocking position so as to enable an elastic deflection of the at least one engagement portion such that the locking mechanism between the closure parts can be canceled by deforming the engagement portion.

In one embodiment, the second magnetic installation which is assigned to the second closure part is disposed on the blocking piece and thus able to be moved conjointly with the blocking piece. When the blocking piece is activated, the magnetic interaction between the closure parts is thus also influenced, in particular for weakening the magnetic attraction forces between the closure parts such that the retrieval of the closure parts is further simplified on account thereof.

Additionally or alternatively to adjusting the at least one locking element, the locking mechanism can be canceled by providing an elastic engagement portion and an activatable blocking piece. A further possibility for releasing the locking mechanism between the closure parts and thus for opening the closure device is thus achieved.

In one embodiment, the first closure part has at least one first electrical connector which in the closing position of the closure device is electrically connected to a second electrical connector, wherein the electrical connection can be canceled by separating the closure parts from one another. The second electrical connector herein can be likewise provided on the first closure part or else on the second closure part. Electrical contacting between electrical connectors can thus be established by connecting the closure parts. This can be used, for example, for providing an electrical connector for an electronic apparatus, for example a mobile phone, for example in order for the electronic apparatus to be connected to a charging installation.

In one embodiment, the first electrical connector is electrically connected to the at least one locking element. For example, the second electrical connector herein can be connected to an electrical contact element which is disposed in the region of the engagement portion on the second closure part. The at least one locking element, and on account thereof the first electrical connector, in the closing position is in contact with the electrical contact element on the engagement portion of the second closure part such that an electrical connection between the electrical connectors is established on account thereof. This electrical connection can be canceled by separating the closure parts such that the electrical contact is able to be released. In this embodiment, the electrical connection is established only in the engagement position of the locking element. Should the closure be in a malposition, for example because dirt between the closure parts precludes the latter to completely converge, the electrical connection would not be established and the malposition thus would be able to be electrically detected.

This applies in a similar manner to a embodiment in which both electrical connectors lie in the first closure part and in the closing position are electrically connected via the locking element which at least in portions is composed of a conductive material.

In one embodiment, the closure device has at least two second closure parts which have in each case at least one engagement portion and one second magnetic installation and which can be conjointly placed against the first closure part. The closure device can thus achieve a three-point connection (between a first closure part and two second closure parts) or else a multi-point connection (between a first closure part and more than two second closure parts), for example in order for straps to be connected to one another. Such a closure device can be used, for example, as a strap system on a seat, in particular a vehicle seat, for example a child seat, or else on a pram.

In one advantageous embodiment herein, the magnetic installations in the first closure part and in the plurality of second closure parts and the locking element (in terms of the disposal and freedom of movement thereof) can be mutually adapted such that the locking element when placing a second closure part against the first closure part is imparted a stronger magnetic attraction to the magnetic installation of the first closure part, thus is not yet pulled into the engagement position. However, when the second, or the last (in the case of a multiplicity of second closure parts) of the second closure parts is inserted, the magnetic force of the second closure parts on the locking element is predominant such that the locking element is pulled so as to engage. This is in particular advantageous in pram closures in which national standards in some countries demand that the closure must not latch as long as not all parts of the multi-point closure are locked.

In such a closure device an engagement opening on the first closure part is provided such that a plurality of second closure parts can be conjointly inserted into the engagement opening of the first closure part. The closure device herein can be designed such that the plurality of second closure parts can only be brought to conjointly connect with the first closure part. It is however also conceivable and possible that each second closure part can be individually connected to the first closure part and a connection between the closure parts can thus also be established by selectively choosing among the second closure parts.

A second closure part can also be inserted and magnetically positioned but not yet mechanically latched until a further second closure part is (or all of the second closure parts are) inserted.

In one embodiment, a functional group has an electronic apparatus, for example configured by a mobile phone, a tablet computer or another communications terminal, and a closure device of the type described above. One of the closure parts of the closure device herein is connected to the electronic apparatus, while the other closure part is disposed on a superordinate functional group to which the electronic apparatus is to be fastened. In this way, an electronic apparatus can be fastened in or on a vehicle, for example, a motor vehicle or a bicycle, for example. For example, a mobile phone can be established on a dashboard of a vehicle or on a handlebar or a frame of a bicycle by way of such a closure device.

A closure system has a plurality of closure devices of the type described above. In the context of such a closure system, the first closure parts of the closure device can be connected to one another in a first functional group, while the second closure parts of the closure device are connected to one another in a second functional group. The first functional group and the second functional group can be placed against one another in that the closure devices are in each case closed such that the first functional group and the second functional group are held against one another by way of the plurality of closure devices.

In one embodiment, the first closure parts of the closure devices herein can in each case have an adjustment part for adjusting the at least one locking element of each closure device. The adjustment part of each closure device is activatable so as to bring the at least one locking element of the respectively assigned first closure part to disengage from the at least one engagement portion of the assigned second closure part in order to release the first closure part and an assigned second closure part from one another. The adjustment parts of the first closure parts of the closure devices are preferably operatively connected to one another such that the adjustment parts can be conjointly activated.

In the context of such a closure system, the closure devices can be linearly next to one another in a row, for example. The first closure parts and the second closure parts herein can in each case be rigidly connected to one another by way of connection portions. The adjustment parts of the closure devices can be likewise rigidly connected to one another such that the adjustment parts can be conjointly adjusted for activating the locking elements of the closure devices.

The adjustment parts herein may be simultaneously activated. The operative connection between the closure parts can however also be such of such a type that the adjustment parts in a temporally offset manner are adjusted one after the other, and the closure devices are thus not opened simultaneously but in a temporally offset manner.

It is to be noted in this context that the closure parts do not necessarily have to be connected to one another. It is also conceivable for the adjustment parts to be activated individually and independently of one another such that the closure devices of the closure system can be opened individually and independently of one another.

BRIEF DESCRIPTION OF THE DRAWINGS

The concept on which the proposed solution is based is to be explained in more detail hereunder by the exemplary embodiments illustrated in the figures.

FIG. 1A shows a view of a first exemplary embodiment of a closure device, having a first closure part and a second closure part, in an opened position;

FIG. 1B shows a lateral view of the assembly according to FIG. 1A;

FIG. 1C shows a sectional view along the line A-A according to FIG. 1B;

FIG. 1D shows a sectional view along the line B-B according to FIG. 1B;

FIGS. 2A-D show views of the closure device in a closing position;

FIGS. 3A-D show views of the closure device when the closure parts are loaded toward one another;

FIGS. 4A-D show views of the closure device when unlocking;

FIGS. 5A-D show views of the closure device upon opening;

FIG. 6 shows a view of another exemplary embodiment of a closure device;

FIG. 7 shows a lateral view of the assembly according to FIG. 6;

FIGS. 8A-C show views of the closure device according to FIGS. 6 and 7, sectioned along the line O-O according to FIG. 7, in a first embodiment;

FIGS. 9A-D show views of the closure device in a modified embodiment, again sectioned along the line O-O according to FIG. 7;

FIG. 15A shows an exploded view of another exemplary embodiment of a closure device;

FIG. 15B shows an assembled view of the closure device according to FIG. 15A;

FIG. 16A shows an exploded view of yet another exemplary embodiment of a closure device;

FIG. 16B shows an assembled view of the closure device;

FIG. 21 shows a view of another exemplary embodiment of a closure device;

FIG. 22 shows a lateral view of the closure device according to FIG. 21;

FIGS. 23A-C show a sectional view along the line A-A according to FIG. 22;

FIG. 23D shows an enlarged detail of the sectional view according to FIG. 23C;

FIGS. 34A-E show views of yet another exemplary embodiment of a closure device in an opened position;

FIGS. 37A-E show views of the closure device upon opening;

FIG. 42 shows an exploded view of yet another exemplary embodiment of a closure device;

FIGS. 43A-C show views of the closure device in an opened position;

FIGS. 44A-C show views of the closure device in a closing position;

FIGS. 45A-C show views of the closure device when unlocking;

FIGS. 46A-C show views of the closure device upon opening;

FIGS. 47A-E show views of an exemplary embodiment of the closure system having a plurality of closure devices in an opened position;

FIGS. 49A-E show views of the closure system when unlocking;

FIGS. 50A-E show views of the closure system upon opening;

FIGS. 51A-E show views of another exemplary embodiment of the closure system having a plurality of closure devices in an opened position;

FIGS. 52A-E show views of the closure system in a closing position;

FIGS. 53A-E show views of the closure system when unlocking the closure devices;

FIGS. 54A-E show views of the closure device upon opening the closure devices;

FIGS. 55A-D show views of an exemplary embodiment of a closure device having a first closure part and a plurality of second closure parts in an opened position;

FIGS. 58A-D show views of the closure device in a state in which three second closure parts are placed against the first closure part;

FIGS. 72A, 72B show views of the closure device having electrical connectors in an opened position;

FIGS. 73A, 73B show views of the closure device according to FIGS. 72A, 72B in a closing position;

FIGS. 80A, 80B show views of the closure device when unlocking;

FIGS. 81A, 81B show views of the closure device upon opening;

FIG. 87 shows an exploded view of another exemplary embodiment of a closure device;

FIG. 88 shows another exploded view of the closure device;

FIG. 94A shows an exploded view of another exemplary embodiment of a closure device;

FIG. 94B shows another exploded view of the closure device;

FIG. 95A shows a view of the closure device in a closed position;

FIG. 95B shows a view of the longitudinal side of the closure device in the closed position;

FIG. 95C shows a sectional view along the line A-A according to FIG. 95B;

FIG. 95D shows a lateral view of an end side of the closure device in the closed position;

FIG. 96A shows a view of the closure device in an opening movement of an adjustment part;

FIG. 96B shows a view of the longitudinal side of the closure device;

FIG. 96C shows a sectional view along the line A-A according to FIG. 96B;

FIG. 96D shows a lateral view of an end side of the closure device;

FIG. 97A shows a view of the closure device when opening;

FIG. 97B shows a view of the longitudinal side of the closure device;

Figure 99A:
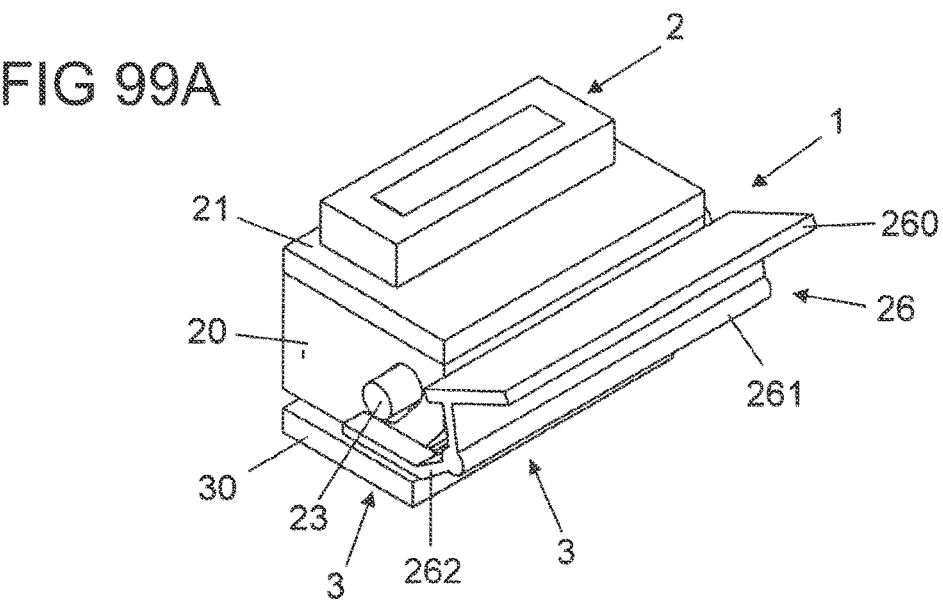
Figure 99B:
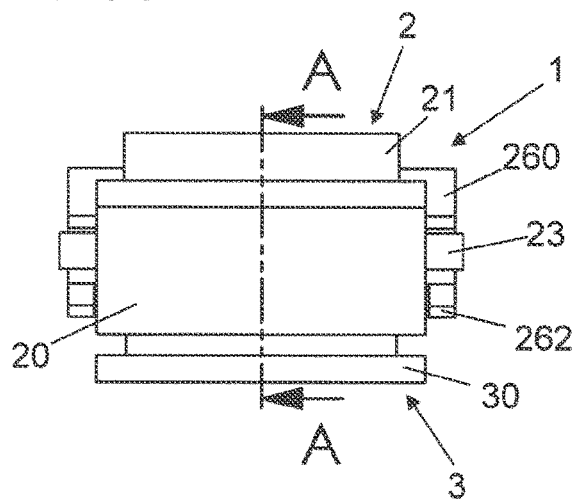
Figure 99C:
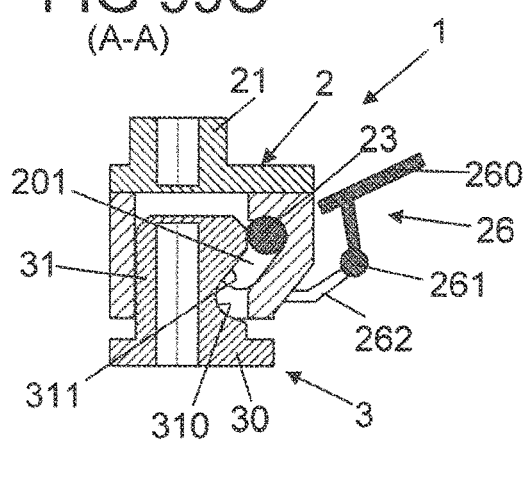
Figure 99D:
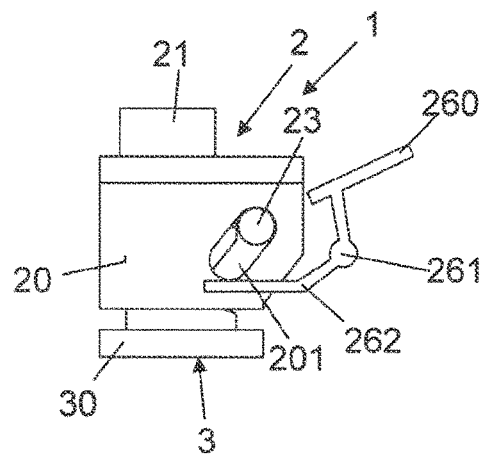
Figure 101A:
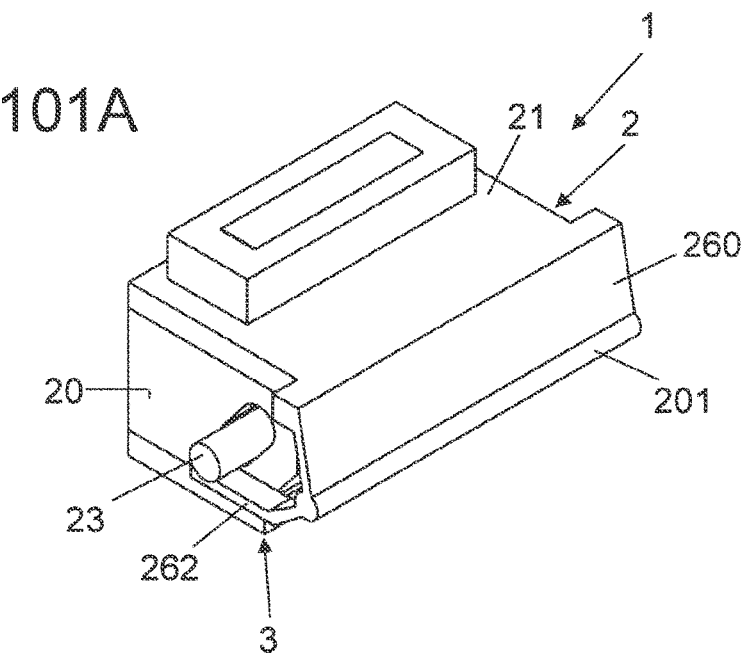
Figure 101B:
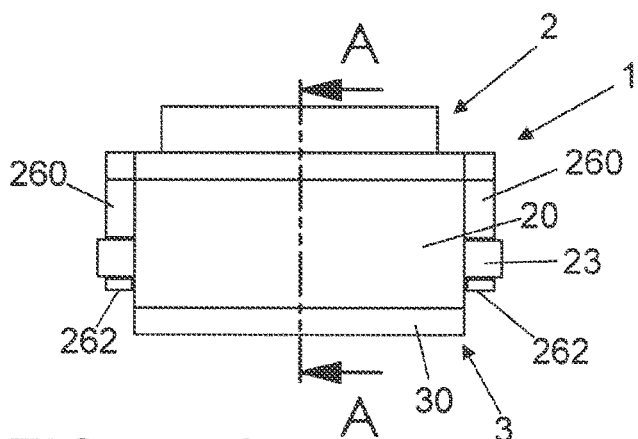
Figure 101C:
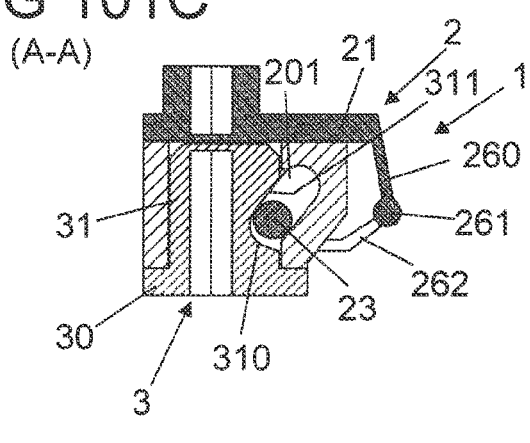
Figure 101D:
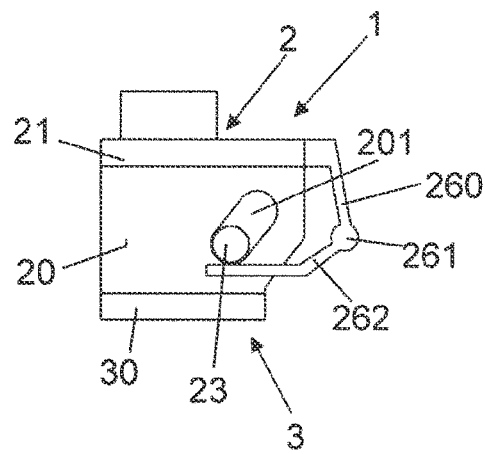
Figure 105A:
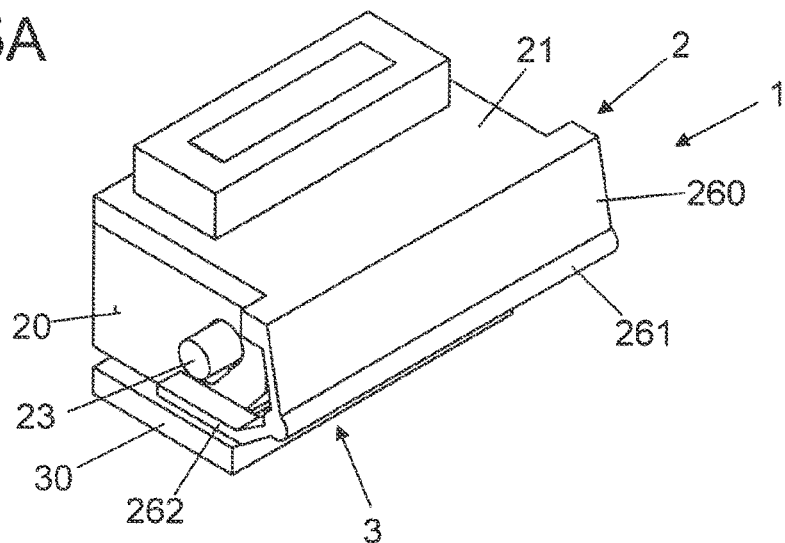
Figure 105B:
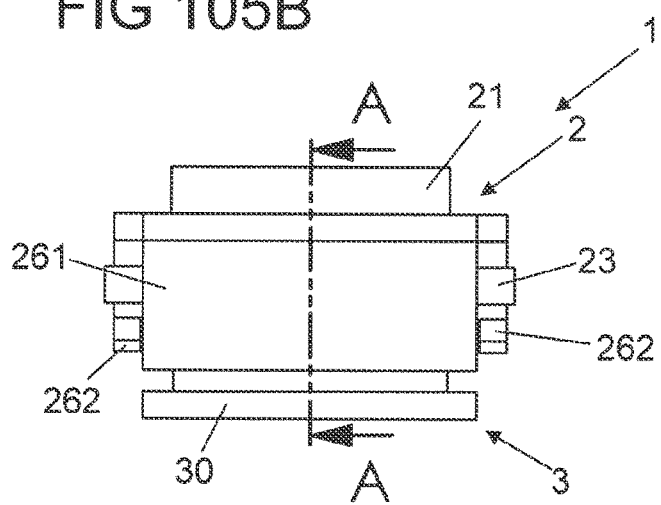
Figure 105C:
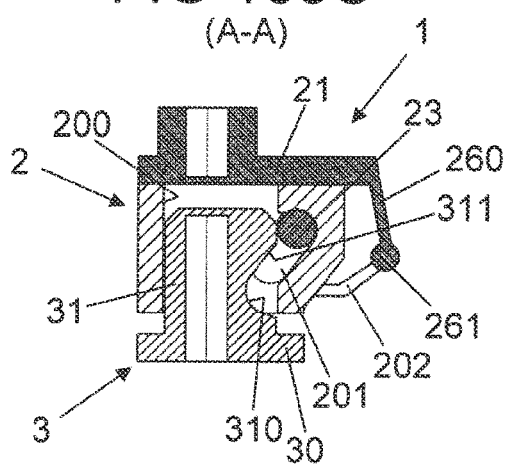
Figure 105D:
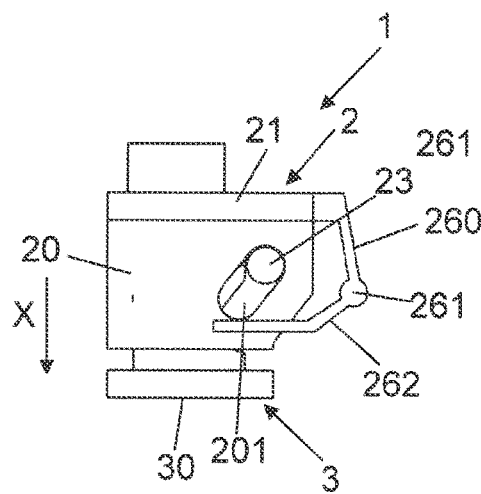
Figure 106:
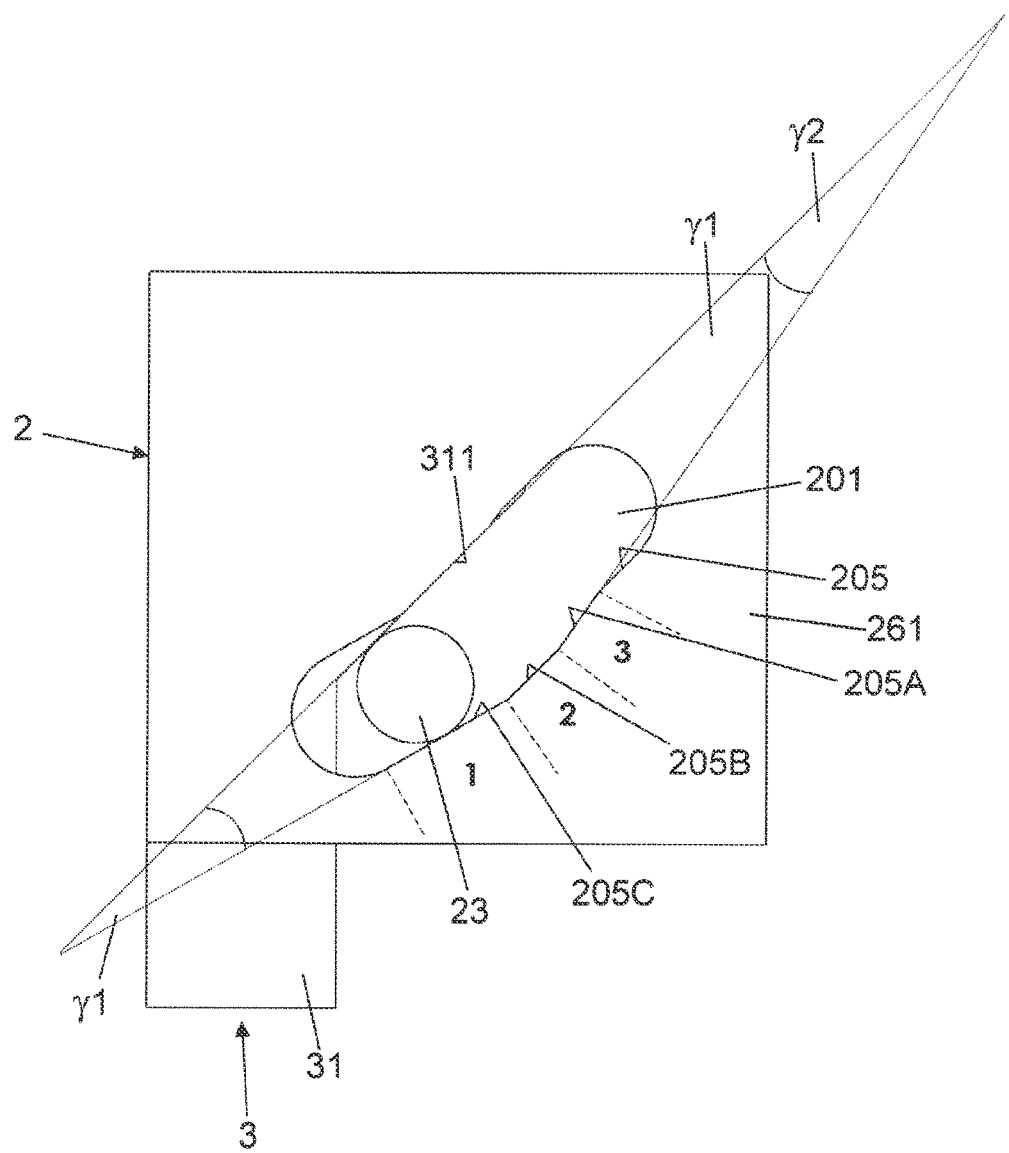
Figure 107A:
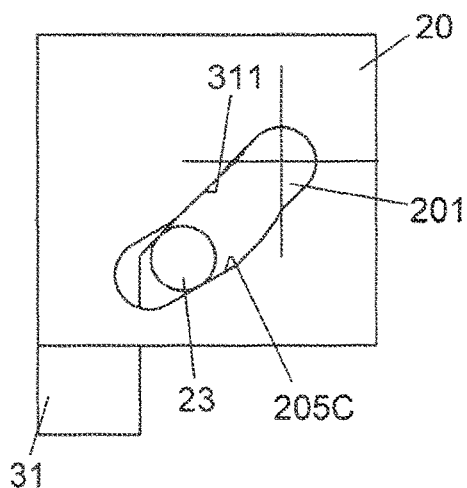
Figure 107B:
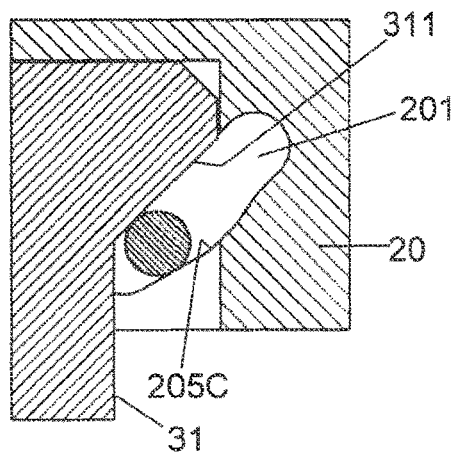
Figure 108A:
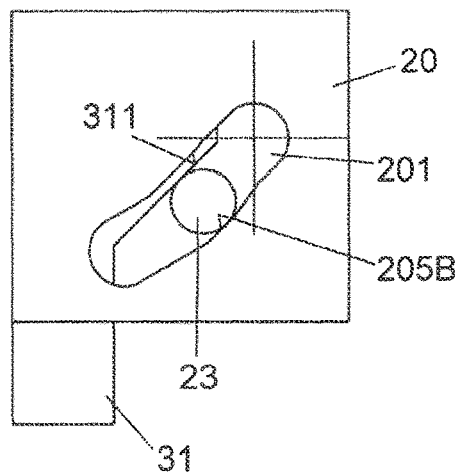
Figure 108B:
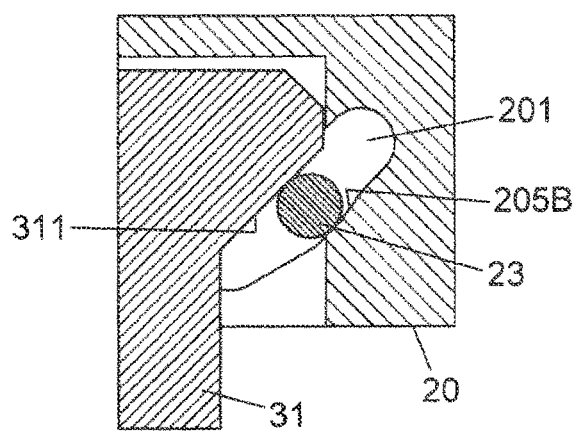
Figure 109A:
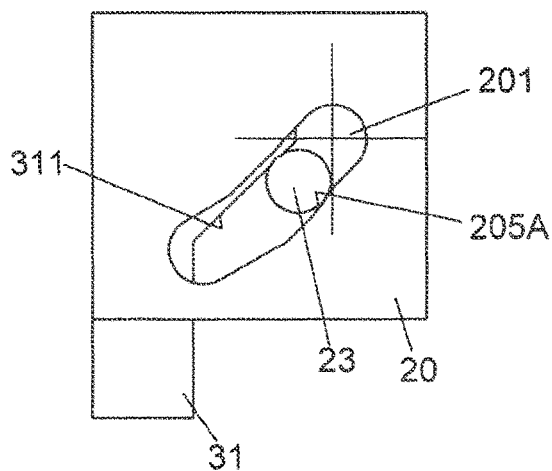

FIG. 97C shows a sectional view along the line A-A according to FIG. 97B;

FIG. 97D shows a lateral view of an end side of the closure device;

FIG. 98A shows a view of the closure device when resetting the adjustment part;

FIG. 98B shows a view of the longitudinal side of the closure device;

FIG. 98C shows a sectional view along the line A-A according to FIG. 98B;

FIG. 98D shows a lateral view of an end side of the closure device;

FIG. 99A shows a view of the closure device when being closed again;

FIG. 99B shows a view of the longitudinal side of the closure device;

FIG. 99C shows a sectional view along the line A-A according to FIG. 99B;

FIG. 99D shows a lateral view of an end side of the closure device;

FIG. 100A shows an exploded view of yet another exemplary embodiment of a closure device;

FIG. 100B shows another exploded view of the closure device;

FIG. 101A shows a view of the closure device in a closed position;

FIG. 101B shows a view of the longitudinal side of the closure device in the closed position;

FIG. 101C shows a sectional view along the line A-A according to FIG. 101B;

FIG. 101D shows a lateral view of an end side of the closure device in the closed position;

FIG. 102A shows a view of the closure device in an opening movement of an adjustment part;

FIG. 102B shows a view of the longitudinal side of the closure device;

FIG. 102C shows a sectional view along the line A-A according to FIG. 102B;

FIG. 102D shows a lateral view of an end side of the closure device;

FIG. 103A shows a view of the closure device when opening;

FIG. 103B shows a view of the longitudinal side of the closure device;

FIG. 103C shows a sectional view along the line A-A according to FIG. 103B;

FIG. 103D shows a lateral view of an end side of the closure device;

FIG. 104A shows a view of the closure device when resetting the adjustment part;

FIG. 104B shows a view of the longitudinal side of the closure device;

FIG. 104C shows a sectional view along the line A-A according to FIG. 104B;

FIG. 104D shows a lateral view of an end side of the closure device;

FIG. 105A shows a view of the closure device when being closed again;

FIG. 105B shows a view of the longitudinal side of the closure device;

FIG. 105C shows a lateral view along the line A-A according to FIG. 105B;

FIG. 105D shows a lateral view of an end side of the closure device;

FIG. 106 shows a schematic view of an exemplary embodiment of the closure device in which a ramp on a first closure part has different portions for interacting with a locking element for locking the first closure part to a second closure part;

FIG. 107A shows a view of end sides of the closure parts;

FIG. 107B shows a sectional view through the closure parts;

FIG. 108A shows a view of end sides of the closure parts;

FIG. 108B shows a sectional view through the closure parts;

FIG. 109A shows a view of end sides of the closure parts; and

Figure 109B:
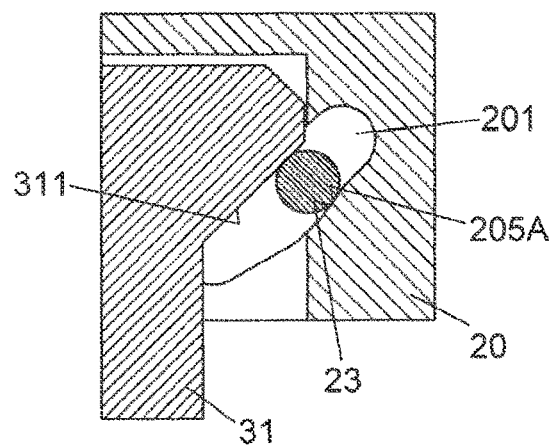

FIG. 109B shows a sectional view through the closure parts.

DESCRIPTION OF THE INVENTION

FIGS. 1A-D to FIGS. 5A-D show a first exemplary embodiment of the closure device 1 which has a first closure part 2 and a second closure part 3. The closure parts 2, 3 can be placed against one another along a closing direction X, and in a closing position (FIGS. 2A-D) are fixedly connected to one another and locked to one another along the closing direction X.

The figure identified by the suffix A in FIGS. 1A-D to FIGS. 5A-D shows in each case a perspective view, the figure identified by the suffix B shows in each case a lateral view, the figure identified by the suffix C shows in each case a sectional view along the line A-A according to the figure identified by the suffix B, and the figure identified by the suffix D shows in each case a sectional view along the line B-B according to the figure identified by the suffix B.

In the exemplary embodiment illustrated, the first closure part 2 has a body 20 and an adjustment part 21 which is disposed so as to be adjustable along an activation direction B on the body 20. An engagement opening 200 into which an engagement element 31 which in the manner of a peg molded on a base 30 of the second closure part 3 can be inserted along the closing direction X so as to connect the closure parts 2, 3 to one another is molded in the body 20.

Two receptacle openings 201 are molded in the body 20 of the first closure part 2, one locking element 23 lying in each case in said two receptacle openings 201. The receptacle openings 201 are molded on mutually opposite sides of the engagement opening 200 such that the locking elements 23 are disposed on both sides of the engagement opening 200, as can be seen from FIG. 1C, for example.

The locking elements 23 are in the shape of bolts in each case configured as cylindrical pins that extend along a longitudinal direction L. The locking elements 23 are configured so as to be magnetic in that said locking elements 23 are made entirely or partially from a ferromagnetic material, or have one or a plurality of permanent magnets.

The locking elements 23 are in each case guided in an assigned receptacle opening 201 of the body 20. The receptacle openings 201 extend along the longitudinal direction L through the body 20 and are in a plane, which is defined by the closing direction X and a transverse direction Q that is directed transversely to the closing direction X and transversely to the longitudinal direction L and in which the engagement portions 310 extend in a curved manner, are configured in the manner of slots and herein extend obliquely to the closing direction X and to the transverse direction Q, as can be seen from FIG. 1C, for example. The bolt-shaped locking elements 23 in the plane defined by the closing direction X and the transverse direction Q can be adjusted on the body 20 in such a manner that the locking elements 23 in a locking position (FIG. 2C) project inwardly into the region of the engagement opening 200, and in an unblocked position (FIG. 4C) are retracted from the region of the engagement opening 200.

The adjustment part 21 of the first closure part 2 has an intermediate portion 210 by way of which the adjustment part 21 is guided along the activation direction B on the body 20 of the first closure part 2. On both sides of the intermediate portion 210, so as to be mutually spaced apart along the longitudinal direction L, the adjustment part 21 has in each case one flank portion 211 which extends beyond ends of the locking elements 23 that project along the longitudinal direction L and encompasses the locking elements 23 by way of a peripheral portion 212 that configures an activation element, as can be seen from FIGS. 1B and 4B, for example.

A magnetic installation 22 in the form of a permanent magnet having poles N, S is disposed on the intermediate portion 210 of the adjustment part 21.

An engagement portion 310 in the form of an inward-pointing clearance is molded on both sides on the engagement element 31 of the second closure part 3. Moreover, a magnetic installation 32 in the form of a permanent magnet having poles S, N is disposed on the engagement element 31, said magnetic installation 32 interacting in a magnetically attracting manner with the magnetic installation 22 on the adjustment part 21 of the first closure part 2 and on account thereof magnetically assisting a closing action of the closure device 1.

FIGS. 1A-D show the closure device 1 in an opened position before placing the closure parts 2, 3 against one another.

In order for the closure direction 1 to be closed, the closure parts 2, 3 are placed against one another along the closing direction X in such a manner that the engagement element 31 comes to engage with the engagement opening 200. The engagement element 31 when being introduced into the engagement opening 200 herein forces the locking elements 23 outward and thus aside in the receptacle openings 201 such that the closure parts 2, 3 make their way to the closing position illustrated in FIGS. 2A-D.

The magnetic installation 32 of the second closure part 3 interacts in a magnetically attracting manner with the locking element 23. This has the effect that the locking elements 23 in the closing position are pulled so as to engage with the engagement portions 310 on the engagement element 31 such that a positive locking mechanism is established between the closure parts 2, 3, as can be seen from FIGS. 2A-D.

When the closure parts 2, 3 are loaded toward one another, as is illustrated in FIGS. 3A-D, the locking elements 23 are thus wedged between ramps 311 on the engagement portions 310 and opposite ramps 205 on the body 20 in the region of the receptacle openings 201. The closure parts 2, 3 are thus held against one another in a locked manner and cannot be readily released from one another, at least not without releasing the locking mechanism (wherein a separation of the closure parts 2, 3 is optionally possible when a predetermined limit force is exceeded).

If the closure parts 2, 3 are to be released from one another, the adjustment part 21 can thus be activated in the activation direction B on the body 20 of the first closure part 2, as can be seen from FIGS. 4A-D. On account thereof, the adjustment part 21 by way of the peripheral portions 212 that are configured on the flank portions 211 and implement activation elements acts on the ends of the locking elements 23 that project from the body 20, and in this way adjusts the locking elements 23 in the receptacle openings 201 upward and, by virtue of the oblique extent of the receptacle openings 201, thus outward in the activation direction B in such a manner that the locking elements 23 come to disengage from the engagement portions 310 and the closure parts 2, 3 are thus unlocked from one another.

Because the magnetic installation 22 of the first closure part 2 is disposed on the intermediate portion 210 of the adjustment part 21, the magnetic attraction between the magnetic installations 22, 32 is also weakened when the adjustment part 21 is adjusted. The closure parts 2, 3 can thus be simply released from one another along the closing direction X, as is illustrated in FIGS. 5A-D. The force required for opening in this embodiment is predefined by the magnetic force which acts between the magnetic installation 22 and the magnetic installation 32. The adjustment part 21 is thus magnetically preloaded and cannot inadvertently be readily opened by minor release forces. This can be advantageous, for example, when a closure of this type is used on a dog leash.

The force which is required for displacing the adjustment part 21 increases under load herein.

The opening of the closure device 1 is simple and comfortable. In particular, a user for opening can simply grip the adjustment part 21 and pull the latter in the activation direction B on the adjustment part 21. Because the activation direction B is parallel to the closing direction X and oriented so as to be identical to a separation direction T (FIG. 5A), the locking mechanism can be released and the closure parts 2, 3 can be removed from one another in one motion cycle by gripping the adjustment part 21.

FIGS. 6 and 7 show an exemplary embodiment of the closure device 1 which in functional terms is largely identical to the exemplary embodiment according to FIGS. 1A-D to 5A-D but does not have an adjustment part 21, a magnetic installation 22 thus being disposed directly on the body 20 of the first closure part 2.

In particular, a first closure part 2 has a body 20 having locking elements 23 that are guided in receptacle openings 201. A second closure part 3 having an engagement element 31 can be plugged into an engagement opening 200 of the body 20 so as to close the closure device 1 and to lock the latter by way of the locking elements 23 engaging in engagement portions 310 molded on the engagement element 31.

Fastening portions 202, 300, for example for fastening a strap, are in each case disposed on the body 22 of the first closure part 2 and the base 30 of the second closure part 3.

FIGS. 8A-C and 9A-D visualize in which way the ramps 205, 311 on the receptacle openings 201 and the engagement portions 311 can be oriented in relation to one another.

In a first embodiment, the ramp 311 molded on each engagement portion 310 can be oriented so as to be parallel to the opposite ramp 205 of the assigned receptacle opening 201 (as is illustrated in FIG. 2C, for example). In this case, the locking elements 23 are wedged between the ramps 205, 311 when the closure parts 2, 3 are under load, wherein the closure parts 2, 3 have mutual play, as can be seen from FIGS. 3A-D, and under load are thus (slightly) removed from one another along the closing direction X, as becomes evident in particular from FIG. 3C.

In the embodiment illustrated in FIGS. 8A-C, the ramps 205, 311 in relation to one another have an angle $\alpha$ which is greater than zero, such that the ramps 205, 301 form a wedge shape which widens toward the outside. This has the effect that the locking elements 23 are pulled so as to further engage with the engagement portions 310 when the closure parts 2, 3 in the closing position are stressed by vibrations, this leading to the closure parts 2, 3 being brought to engage with one another without play and being held against one another without play, as can be seen from FIG. 8C.

This angular orientation of the ramps 205, 311 in relation to one another herein has the effect that, when closure parts 2, 3 are under a load toward one another along the closing direction X that exceeds a predetermined limit force, the closure parts 2, 3 can be released from one another in a self-acting manner while displacing the locking elements 23 in the receptacle openings 201. The connection of the closure parts 2, 3 in the closing position is not self-securing.

The activation force for opening under load in this exemplary embodiment can be the lowest in comparison to the other embodiments.

In the embodiment according to FIGS. 9A-D, the ramps 205, 311 in relation to one another form an angle $\beta$ which is smaller than zero in such a manner that the ramps 205, 311 configure a wedge shape that tapers toward the outside. In consequence, the locking elements 23, when the closure parts 2, 3 are under a load toward one another along the closing direction X, are wedged in a self-securing manner between the ramps 205, 311 and the connection of the closure parts 2, 3 in the closing direction is thus secured and cannot be released in a self-acting manner even by way of great force. The connection is thus self-securing. Releasing the closure parts 2, 3 from one another is possible only by unlocking the locking elements 23, for example by way of an adjustment part 21.

The activation force for opening under load in this exemplary embodiment can be the highest in comparison to the other embodiments.

The angular orientation of the ramps 205, 311 in the embodiment according to FIGS. 9A-D results in the closure parts 2, 3 under load having mutual play, as can be seen from FIG. 9D.

In the exemplary embodiment illustrated in FIGS. 1A-D to FIGS. 5A-D, the first closure part 2 has a magnetic installation 22 which is disposed on the adjustment part 21, and the second closure part 3 has a magnetic installation 32 which is disposed on the engagement element 31. In principle, the magnetic installations 22, 32 can be of dissimilar configurations, as is visualized in FIGS. 10-14.

Figure 10:
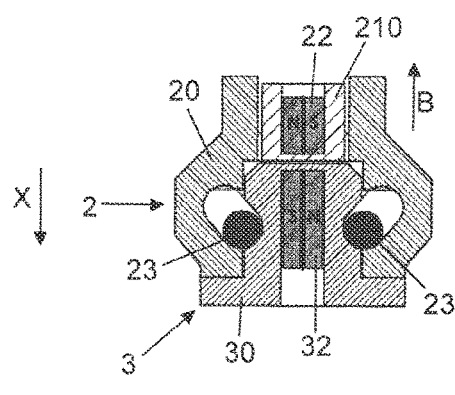
FIGS. 10-14 show views of exemplary embodiments of closure devices having different magnetic installations which are disposed on the closure parts.

In the exemplary embodiment according to FIG. 10, each magnetic installation 22, 32 is formed by a permanent magnet having poles N, S, wherein the permanent magnets have reversed polarities in relation to one another, and unlike poles on the closure parts 2, 3 are opposite one another in an attracting manner. The poles herein are disposed beside one another along the transverse direction Q.

Figure 11:
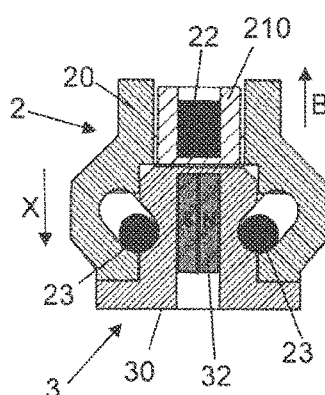

In the exemplary embodiment according to FIG. 11, the magnetic installation 22 of the first closure part 2 is embodied by a magnetic armature from a ferromagnetic material. In contrast, the magnetic installation 32 of the second closure part 3 is formed by a permanent magnet which in a magnetically attracting manner interacts with the magnetic armature of the magnetic installation 22.

Figure 12:
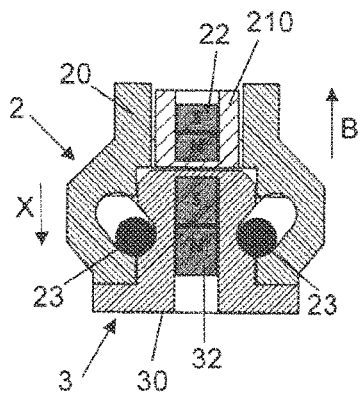

In the exemplary embodiment according to FIG. 12, each magnetic installation 22, 32 is formed by a permanent magnet, wherein the poles N, S of the permanent magnets are disposed beside one another along the closing direction X (activation direction B).

Figure 13:
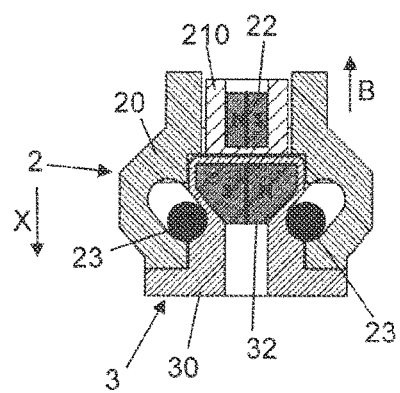

In the exemplary embodiment according to FIG. 13, the magnetic installation 32 of the second closure part 3 is formed by a trapezoidal permanent magnet element. This has the advantage that the spacing between the locking element 23 and the magnetic installation 32 can be very small and the magnetic force acting on the locking element 23 thus can be relatively strong.

Figure 14:
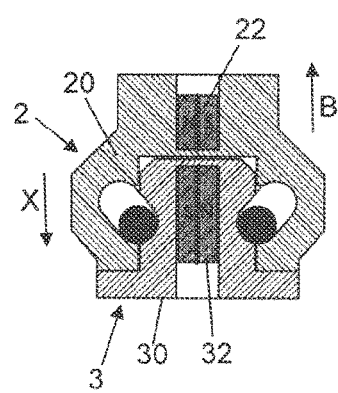

In the exemplary embodiment according to FIG. 14, the magnetic installation 22 of the first closure part 2 is not disposed on the adjustment part 21 but on the body 20 of the first closure part 2.

FIGS. 15A, 15B show a closure device 1 which in functional terms is identical to the exemplary embodiment according to FIGS. 1A-D to FIGS. 5A-D, such that reference is to be made entirely to the embodiments above. The closure device 1 according to FIGS. 15A, 15B herein is configured as a strap connector. Accordingly, a fastening portion 202 for fastening a strap is configured on the first closure part 2, and a fastening portion 300, likewise for fastening a strap, is configured on the second closure part 3.

FIGS. 16A, 16B show an exemplary embodiment of the closure device 1 in which two second closure parts 3 are to be placed against a first closure part 2, as is yet to be explained hereunder by means of FIGS. 19A-F and 20A-E. The closure direction 1 according to FIGS. 16A, 16B thus forms a multi-point connection, wherein a strap for a multi-point strap connection can be disposed on each closure part 2, 3, for example.

Figure 17A:
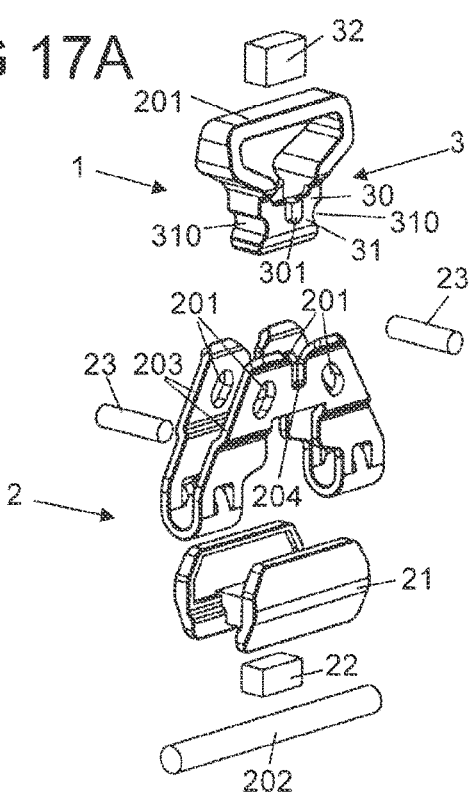
FIG. 17A shows an exploded view of yet another exemplary embodiment of a closure device.
Figure 17B:
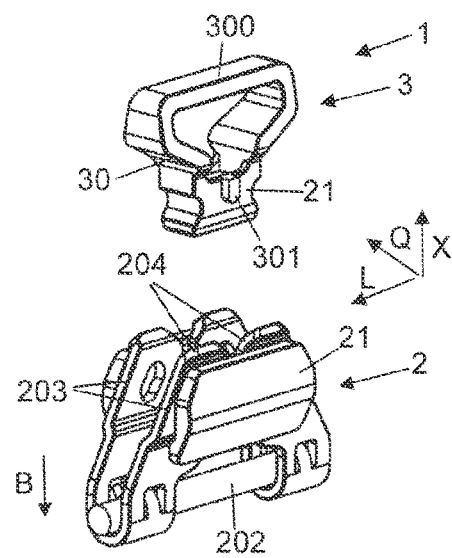
FIG. 17B shows an assembled view of the closure device.

FIGS. 17A, 17B show an exemplary embodiment of the closure device 1 which in functional terms is likewise largely identical to the exemplary embodiment according to FIGS. 1A-D to FIGS. 5A-D, such that in terms of functionality reference is to be made to the above embodiments.

In the exemplary embodiment according to FIGS. 17A, 17B, the first closure part 2 has legs 203, the engagement opening 200 being formed therebetween and the second closure part 3 by way of an engagement element 31 molded thereon being able to be inserted between said legs 203 so as to close the closure device 1. A guiding engagement 204 in which assigned guide pegs 301 on the engagement element 31 of the second closure part 3 engage when the closure parts 2, 3 are placed against one another is molded on the upper edges of the legs 203.

Receptacle openings 201 which receive the locking elements 23 such that the locking elements 23 extend between the legs 203 are molded on the legs 203 of the first closure part 2. As described above by means of FIGS. 1A-D to 5A-D, an adjustment part 21 serves for unlocking the locking elements 23.

A fastening portion 202 in the form of a bar which is received between the legs 203 and which serves as a strap fastening is disposed on the first closure part 2. The second closure part 3 likewise has a fastening portion 300 for fastening a strap.

Figure 18A:
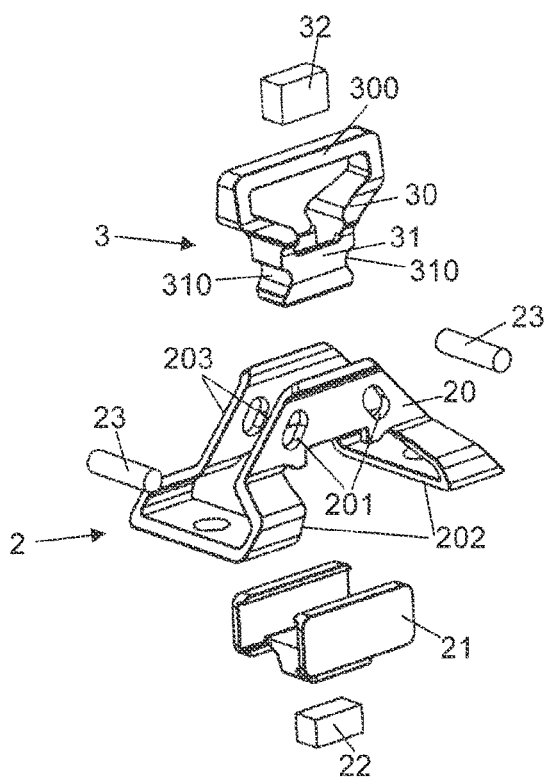
FIG. 18A shows an exploded view of yet another exemplary embodiment of a closure device.
Figure 18B:
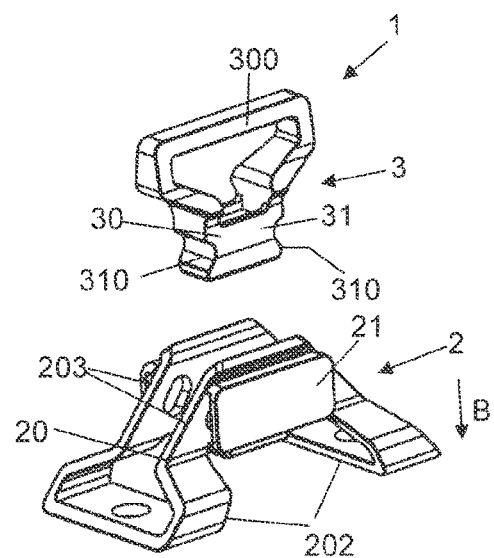
FIG. 18B shows an assembled view of the closure device.

An exemplary embodiment illustrated in FIGS. 18A, 18B is in functional terms largely identical to the exemplary embodiment according to FIGS. 17A, 17B. In the exemplary embodiment according to FIGS. 18A, 18B, the first closure part 2 is to be fixedly connected to a subordinate functional group, for example a housing portion or a wall portion of a subordinate functional group, by way of fastening portions 202.

The closure device 1 of the exemplary embodiment according to FIGS. 16A, 16B is configured as a multi-point connection, and has a first closure part 2 and two second closure parts 3A, 3B which are to be placed against the first closure part 2. The first closure part 2 herein, as can be seen from FIGS. 16A, 16B when viewed in combination with FIGS. 19A-F, has a body 20 in which an engagement opening 200 into which the second closure parts 3A, 3B can be inserted conjointly with the engagement elements 31 is molded, as can be seen from the transition from FIG. 19A to FIG. 19C.

In the exemplary embodiment illustrated, the second closure parts 3A, 3B can first be assembled and thereafter conjointly inserted into the engagement opening 200 of the first closure part 2, as is illustrated in FIGS. 19A-F. The second closure parts 3A, 3B have in each case a magnetic installation 32, for example in the form of a permanent magnet, said magnetic installations 32 interacting in a magnetically attracting manner such that the closure parts 3A, 3B when placed against one another assume a mutual orientation according to the intended use, as can be seen from FIG. 19B. The closure parts 3A, 3B in this assembled orientation can be placed against the closure part 2 and brought to engage with the engagement opening 200 such that the closure parts 3A, 3B by way of locking elements 23 on the closure part 2 lock in a closing position (FIG. 19C) in the engagement opening 200.

Figure 19A:
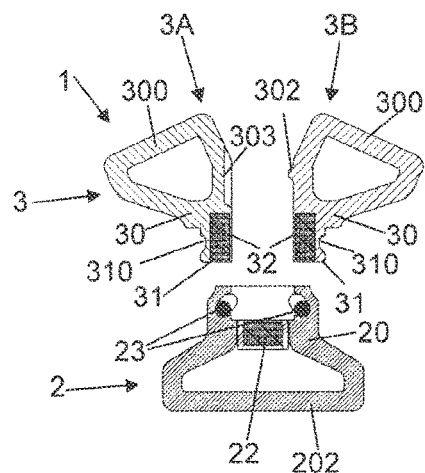
FIGS. 19A-F show views of a closure device having a first closure part and two second closure parts which for providing a three-point connection are to be placed against said first closure part.
Figure 19B:
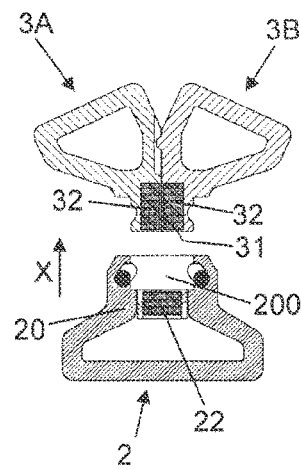
Figure 19C:
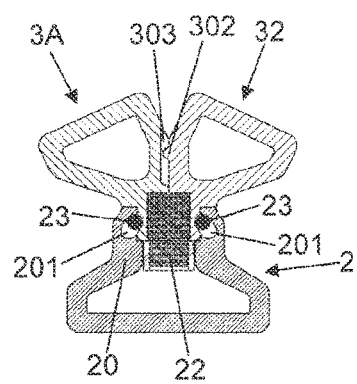
Figure 19D:
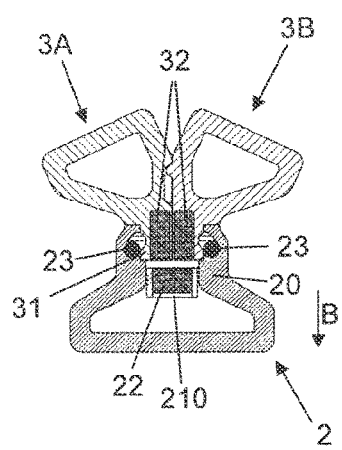
Figure 19E:
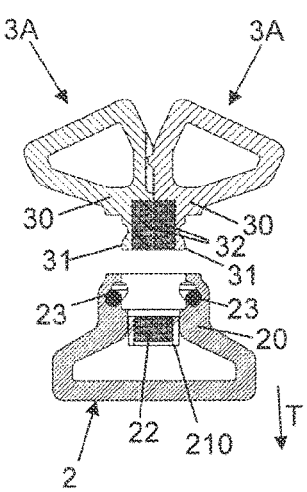
Figure 19F:
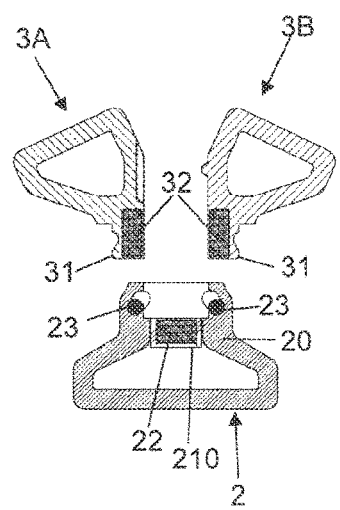
Figure 20A:
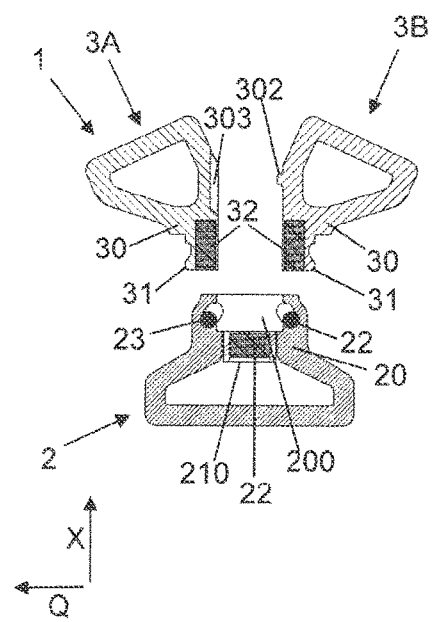
FIGS. 20A-E show other views of the closure device according to FIGS. 19A-F.
Figure 20B:
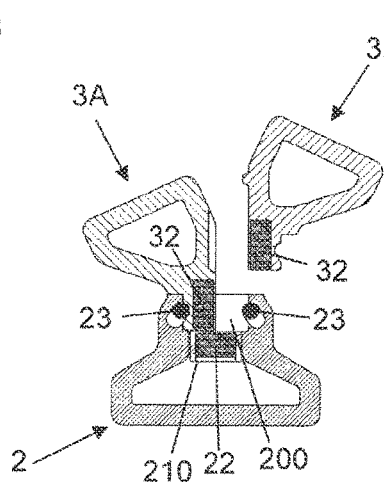
Figure 20C:
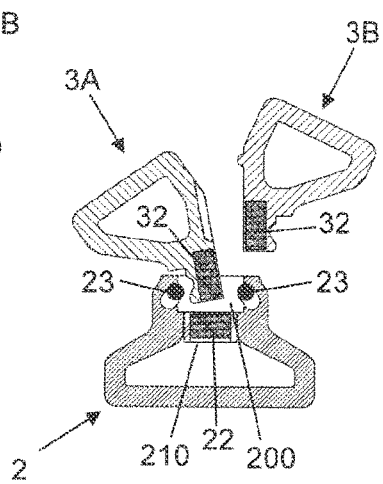
Figure 20D:
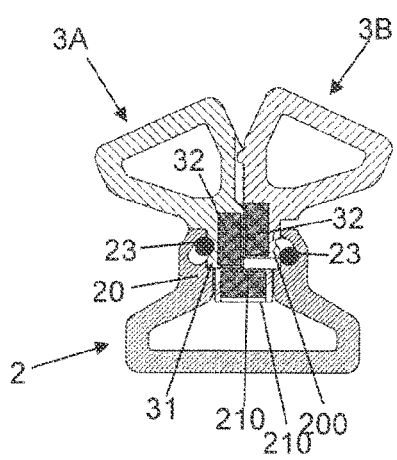
Figure 20E:
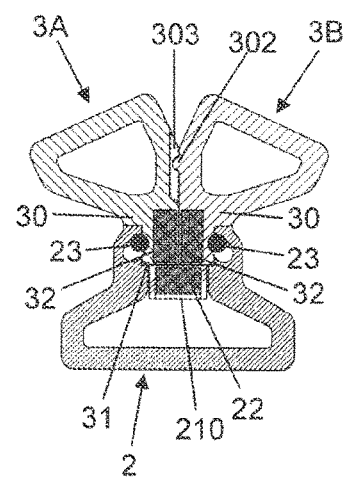

In order for the closure parts 2, 3A, 3B to be released from one another, the adjustment part 21 (FIGS. 16A, 16B) can be activated in an activation direction B such that the locking elements 23 are adjusted in the activation direction B and, by virtue of being guided in the receptacle openings 201, are relocated toward the outside, as can be seen from FIG. 19B. The locking mechanism is thus canceled such that the closure parts 3A, 3B can be retrieved from the closure part 2 and be separated from one another (FIGS. 19E, 19F).

An exemplary embodiment illustrated in FIGS. 18A, 18B is in functional terms largely identical to the exemplary embodiment according to FIGS. 17A, 17B. In the exemplary embodiment according to FIGS. 18A, 18B, the first closure part 2 is to be fixedly connected to a subordinate functional group, for example a housing portion or a wall portion of a subordinate functional group, by way of fastening portions 202.

The closure device 1 of the exemplary embodiment according to FIGS. 16A, 16B is configured as a multi-point connection, and has a first closure part 2 and two second closure parts 3A, 3B which are to be placed against the first closure part 2. The first closure part 2 herein, as can be seen from FIGS. 16A, 16B when viewed in combination with FIGS. 19A-F, has a body 20 in which an engagement opening 200 into which the second closure parts 3A, 3B can be inserted conjointly with the engagement elements 31 is molded, as can be seen from the transition from FIG. 19A to FIG. 19C.

In the exemplary embodiment illustrated, the second closure parts 3A, 3B can first be assembled and thereafter conjointly inserted into the engagement opening 200 of the first closure part 2, as is illustrated in FIGS. 19A-F. The second closure parts 3A, 3B have in each case a magnetic installation 32, for example in the form of a permanent magnet, said magnetic installations 32 interacting in a magnetically attracting manner such that the closure parts 3A, 3B when placed against one another assume a mutual orientation according to the intended use, as can be seen from FIG. 19B. The closure parts 3A, 3B in this assembled orientation can be placed against the closure part 2 and brought to engage with the engagement opening 200 such that the closure parts 3A, 3B by way of locking elements 23 on the closure part 2 lock in a closing position (FIG. 19C) in the engagement opening 200.

In order for the closure parts 2, 3A, 3B to be released from one another, the adjustment part 21 (FIGS. 16A, 16B) can be activated in an activation direction B such that the locking elements 23 are adjusted in the activation direction B and, by virtue of being guided in the receptacle openings 201, are relocated toward the outside, as can be seen from FIG. 19B. The locking mechanism is thus canceled such that the closure parts 3A, 3B can be retrieved from the closure part 2 and be separated from one another (FIGS. 19E, 19F).

An engagement groove 303 which, when placing the closure parts 3A, 3B against one another, engages in an engagement cam 302 on the closure part 302 such that the placing of the closure parts 3A, 3B against one another in the correct orientation is assisted when connecting to the closure part 2 is molded on an end side on the closure part 3A which faces the other closure part 3B.

FIGS. 21, 22, and 23A-D show a further exemplary embodiment of a closure device 1 in which the closure parts 2, 3 are to be placed against one another along a closing direction X.

While the locking elements 23 in the previously described exemplary embodiments are movable along an adjustment direction that is directed obliquely to the closing direction X and obliquely to the transverse direction Q in the assigned receptacle openings 201, locking elements 23 in the exemplary embodiment according to FIGS. 21-23 are pivotably mounted in receptacle openings 201 of a body 20 of the closure part 2. The locking elements 23 are magnetic and interact with magnetic installations 22, 32 of the closure parts 2, 3.

In order for the closure device 1 to be closed, the closure part 2 by way of an engagement element 31 molded on a base 30 can be plugged into an engagement opening 200 in the body 20 of the closure part 2, as can be seen in the transition from FIG. 23A to FIG. 23B. The locking elements 23 herein are forced aside, wherein the locking elements 23 upon reaching the closing position (FIG. 23C) by virtue of the magnetic interaction with the magnetic installation 32 of the closure part 3 are pulled so as to engage with engagement portions 310 on the engagement element 31 of the closure part 3 such that the closure parts 2, 3 are locked to one another.

The connection between the closure parts 2, 3 herein is (largely) without play, as is schematically shown in FIG. 23D. Each locking element 23 in relation to the body 20 is thus pivotable about a center M1. Each locking element 23 on a side that faces the engagement portion 310 herein has a curved contact face 232, the curvature thereof following a circle D2 about a center M2 which is eccentric in relation to the center M1. An assigned contact face 312 on the engagement portion 310 is also correspondingly molded.

A wedge shape which by virtue of the eccentricity tapers toward the inside results on the contact face 232 of the locking element 23, this being caused in that an outer edge moves along an outer circle D1a and an inner edge of the locking element 23 moves along an inner circle D1b when the locking element 23 is pivoted. For example in the case of stress by vibrations between the closure parts 2, 3, the wedge shape has the effect that the locking elements 23 are pulled so as to further engage with the engagement portions 310 and, on account thereof, establish the closure parts 2, 3 without play in relation to one another.

The connection is releasable in a self-acting manner when a limit force is exceeded, in that the locking elements 23 when exceeding the limit force are forced aside by virtue of the eccentricity of the contact faces 233, 312.

The contact faces 232, 312 can also be designed so as to be conversely eccentric (having a center M2 which in relation to the center M1 is offset toward the engagement portion 310). In this case, the engagement of the locking elements 23 in the engagement portions 310 is self-securing and is reinforced when the closure parts 2, 3 are under load.

In an exemplary embodiment illustrated in FIGS. 24, 25, and 26A-C, the locking elements 23 are configured as plates which are pivotably received on receptacle openings 201. The locking elements 23 are again magnetic and in the closing position (FIG. 26C) are pulled so as to engage with engagement portions 310 on the engagement element 31 of the closure part 3 such that the connection between the closure parts 2, 3 is locked.

The functional mode of the exemplary embodiment according to FIGS. 24, 25, and 26A-C is otherwise analogous to that explained above.

In an exemplary embodiment illustrated in FIGS. 27, 28, and 29A-C, only a unilateral locking mechanism is established between closure parts 2, 3 in that a locking element 23 in the form of a elongate pin that is received in a receptacle opening 201 is disposed only on one side of the engagement opening 201 molded on the body 20. In the closing position (FIG. 29C), the magnetic locking element 23 engages in the assigned engagement portion 310 on the engagement element 31 of the closure part 3 and, on account thereof, locks the closure parts 2, 3 to one another.

The functional mode of the exemplary embodiment according to FIGS. 27, 28, and 29A-C is otherwise identical to that explained above, in particular to the exemplary embodiment according to FIGS. 1A-D to FIGS. 5A-D.

In the exemplary embodiments described above, the at least one locking element 23 can be manually activated by acting directly on the locking element 23. Alternatively, an adjustment part 21 which for acting on the locking element 23 is activatable along an activation direction B so as to move the locking elements 23 from the locked position thereof and to thus be able to release the closure parts 2, 3 from one another can be provided on the first closure part 2.

In the exemplary embodiment according to FIGS. 1A-D to FIGS. 5A-D, the activation direction B herein is directed so as to be parallel to the closing direction X such that the locking elements 23 can be relocated and thus unlocked in the assigned receptacle openings 201 by activating the adjustment part 21.

In contrast, in an exemplary embodiment illustrated in FIGS. 30A-C to 33A-C, the locking elements 23 are able to be unlocked in that the adjustment part 21 is activatable in an activation direction B that is directed transversely to the closing direction X so as to slide the locking elements 23 along the activation direction B out of the region of the receptacle openings 201. To this end, the adjustment part 21 has an effective element 213 which by way of a connection portion 215 is connected to the intermediate portion 210 of the adjustment part 21 and by way of spring elements 214 is spring-preloaded in relation to the body 20 of the closure part 2.

The adjustment part 21 has a flank portion 211 on which the locking elements 23 are axially fastened such that the locking elements 23 can be pushed out of the region of the receptacle openings 201 by adjusting the flank portion 211 in the activation direction B.

Figure 31A:
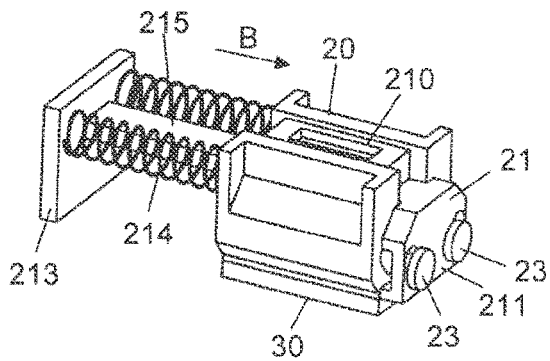
FIGS. 31A-C show views of the closure device in a closing position.
Figure 30B:
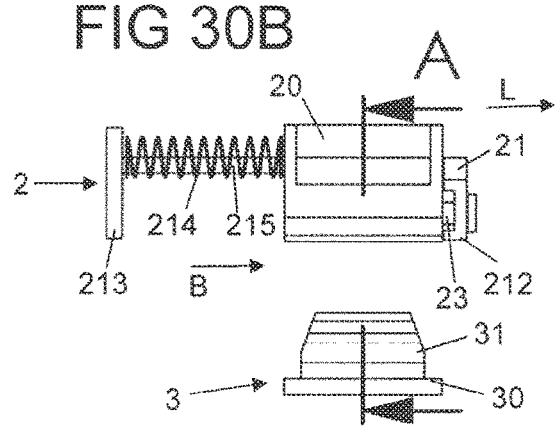
Figure 31B:
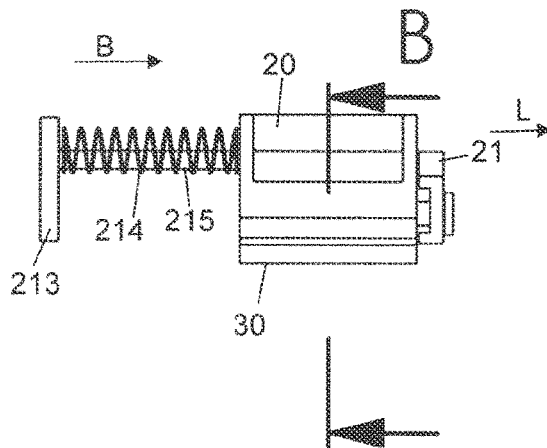
Figure 30C:
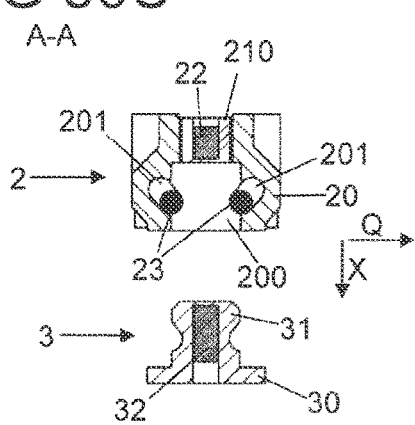
Figure 31C:
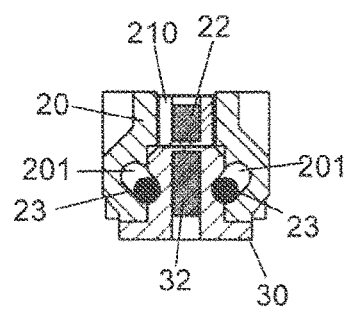

The closure parts 2, 3 in an initial position can be placed against one another in the direction in which the adjustment part 21 is preloaded by the spring elements 214, said closure parts 2, 3 locking to one another in the closing position (FIGS. 31A-C). In particular, the locking elements 23 received in the receptacle openings 201 in the body 20 engage in assigned engagement portions 310 on the engagement element 31 of the closure part 3, and in this way establish a connection between the closure parts 2, 3.

Figure 32A:
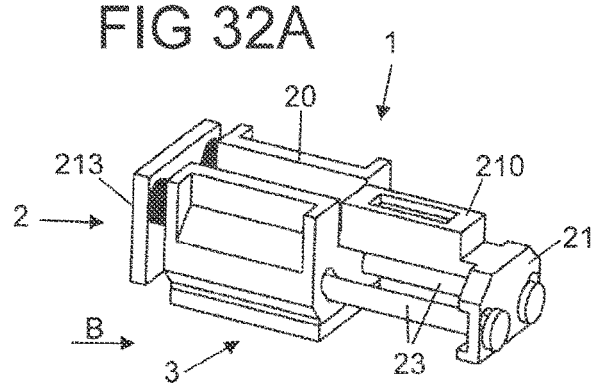
FIGS. 32A-C show views of the closure device when unlocking.
Figure 33A:
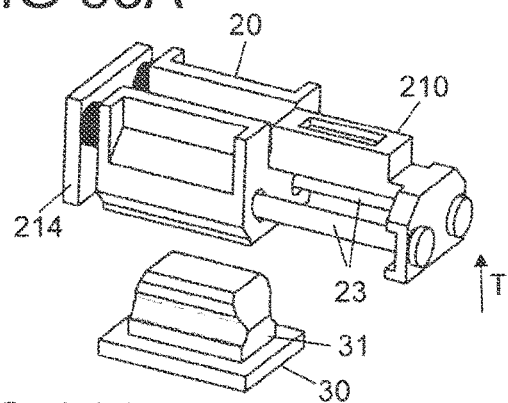
FIGS. 33A-C show views of the closure device upon opening.
Figure 32B:
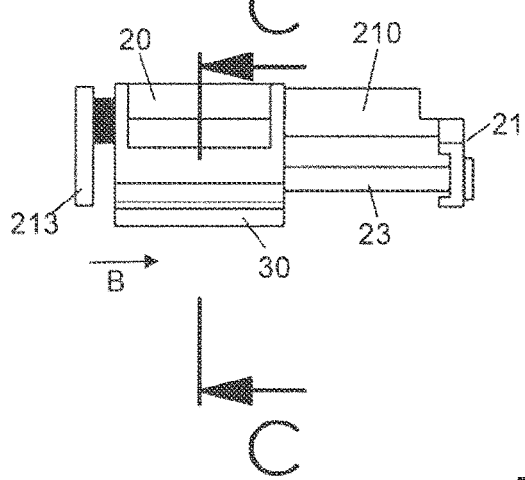
Figure 33B:
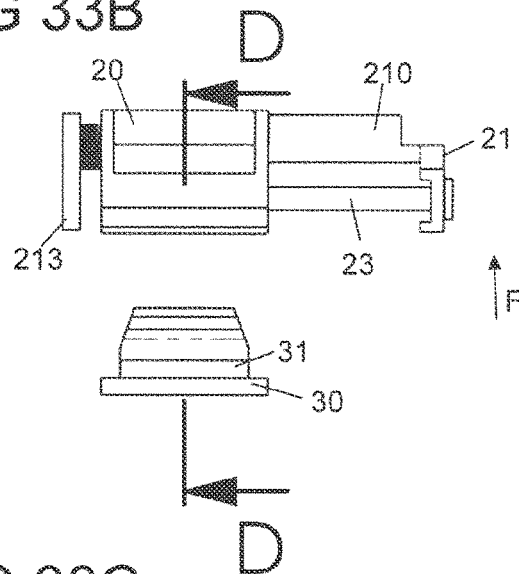
Figure 32C:
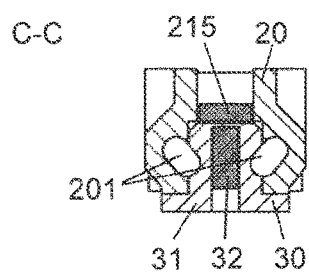
Figure 33C:
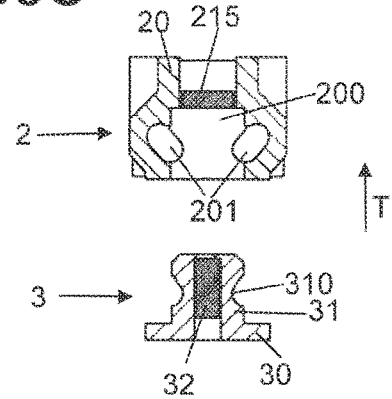
Figure 35A:
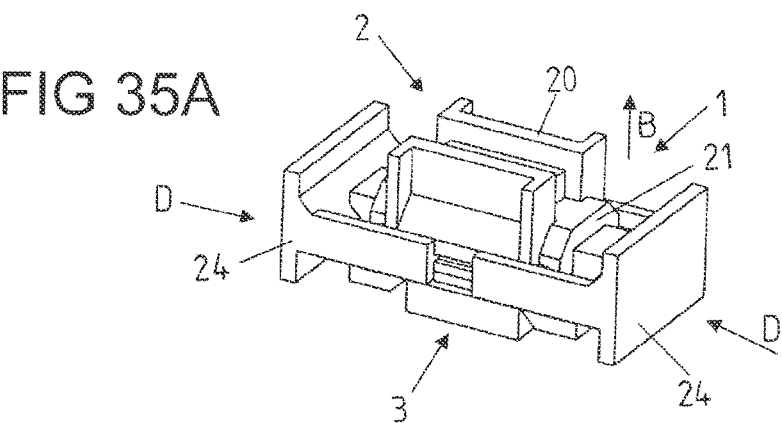
FIGS. 35A-E show views of the closure device in a closing position.
Figure 35B:
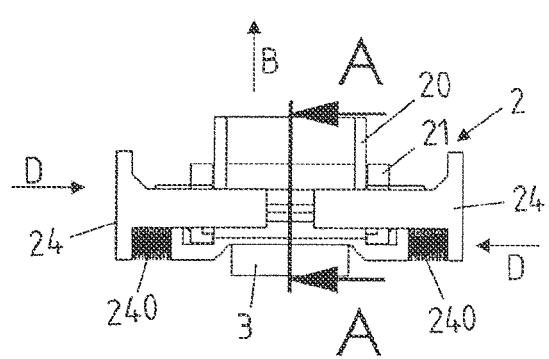
Figure 35C:
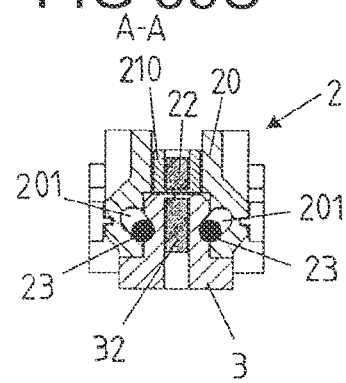
Figure 35D:
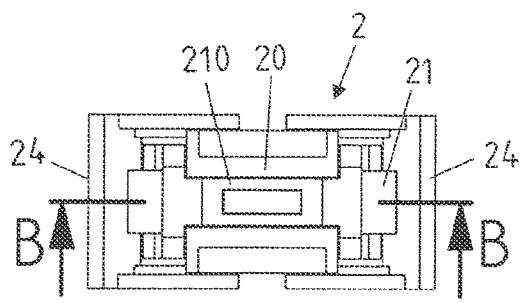
Figure 35E:
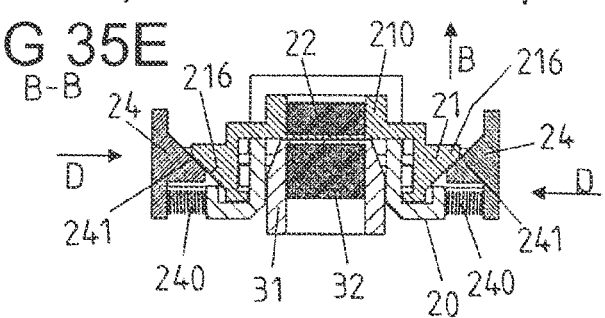

In order for the connection between the closure parts 2, 3 to be released, a user can act on the effective element 213 and displace the adjustment part 21 in the activation direction B in relation to the body 20, as can be seen from FIGS. 32A-C. On account thereof, the locking elements 23 are pushed transversely to the closing direction X out of the receptacle openings 201, such that the locking mechanism between the closure parts 2, 3 is canceled. The closure parts 2, 3 can thus be separated from one another along the separation direction T (FIGS. 33A-C).

In an exemplary embodiment illustrated in FIGS. 34A-E to 37A-E, the closure parts 2, 3, and in particular an adjustment part 21 disposed on the closure part 2, in functional terms are configured identical to the exemplary embodiment according to FIGS. 1A-D to 5A-D. Additionally however, one effective element 24 which is operatively connected to the adjustment part 21 and is adjustable along an effective direction D in relation to the body so as to, on account thereof, act on the adjustment part 21 and activate the adjustment part 21 in the activation direction B in relation to the body 20 in order for the closure parts 2, 3 to be released from one another is disposed on each of the two sides of the adjustment part 21.

Each effective element 24 has a deflection portion 241 in the form of an inclined plane which bears on an assigned deflection portion 216 in the form of an inclined plane on the adjustment part 21, as can be seen in particular from FIG. 34E. Each effective element 24 herein by way of a spring element 240 is spring-preloaded in relation to the body 20 of the closure part 2 and in an unstressed state is thus situated in the initial position illustrated in FIGS. 34A-E.

Figure 36A:
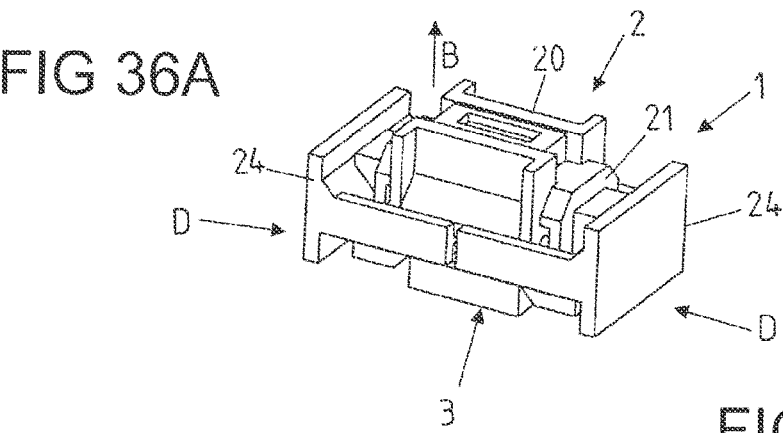
FIGS. 36A-E show views of the closure device when unlocking.
Figure 36B:
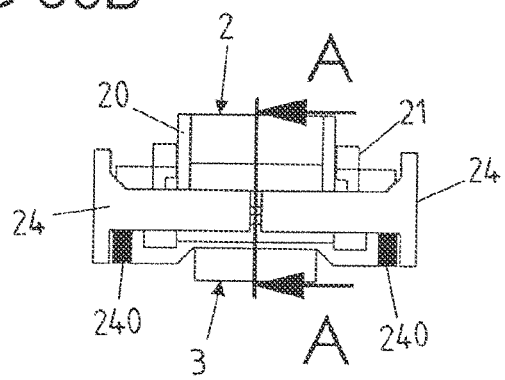
Figure 36C:
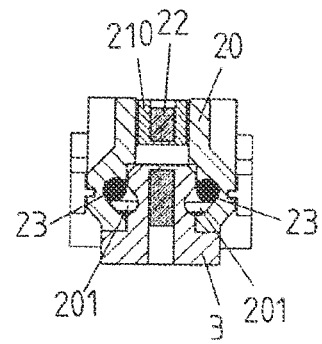
Figure 36D:
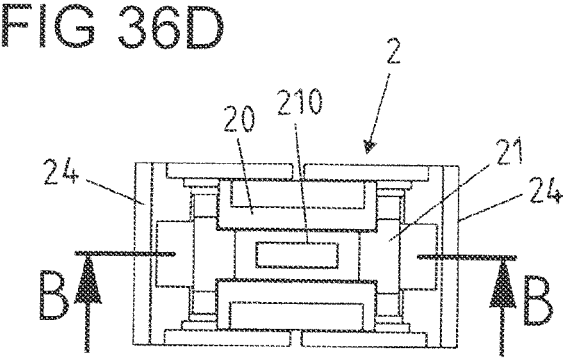
Figure 36E:
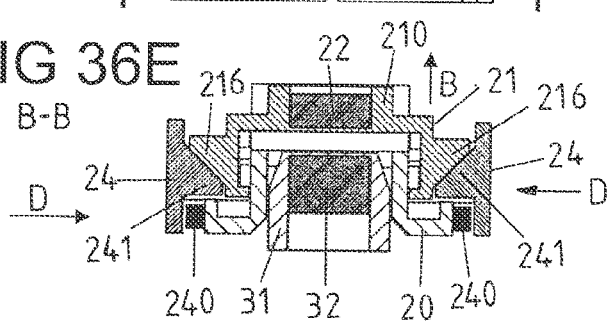
Figure 38A:
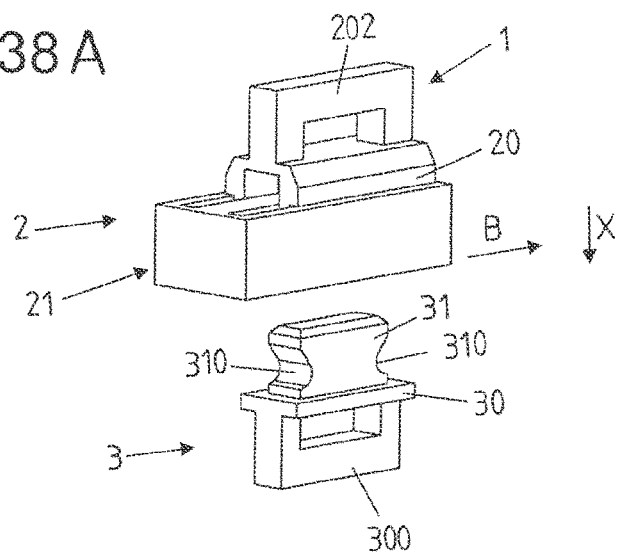
FIGS. 38A-D show views of yet another exemplary embodiment of a closure device in an opened position.
Figure 38B:
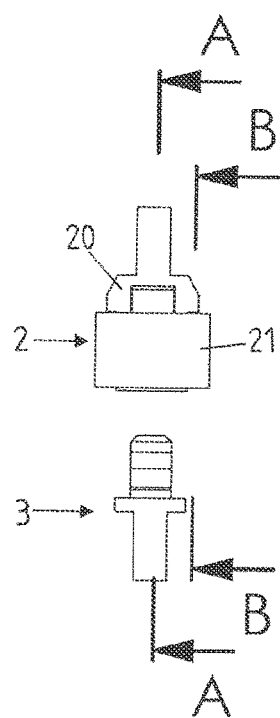
Figure 38C:
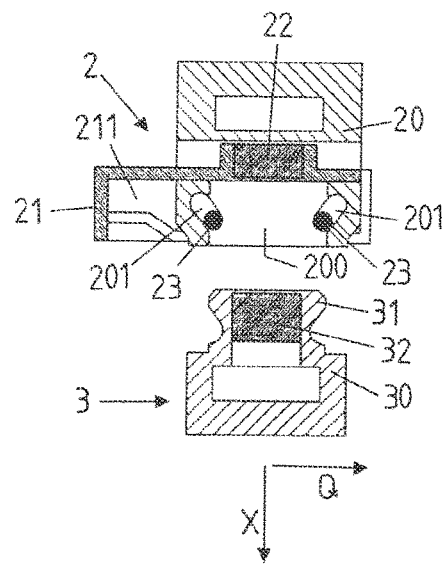
Figure 38D:
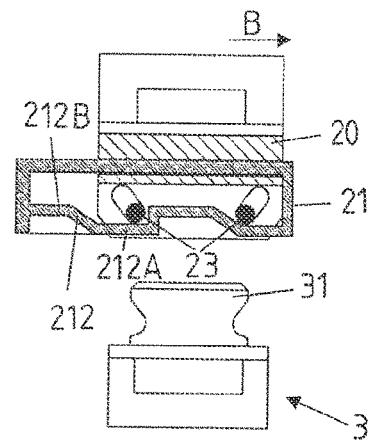
Figure 39A:
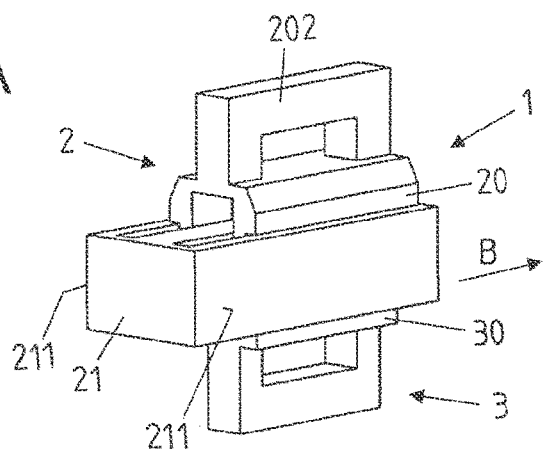
FIGS. 39A-D show views of the closure device in a closing position.
Figure 39B:
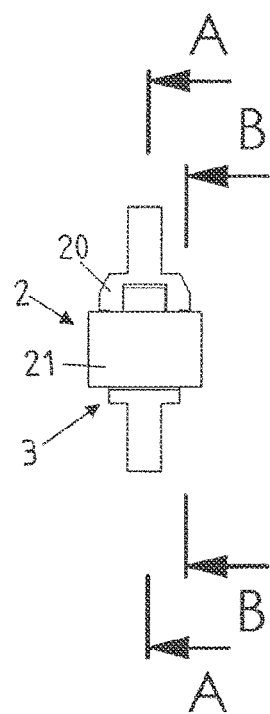
Figure 39C:
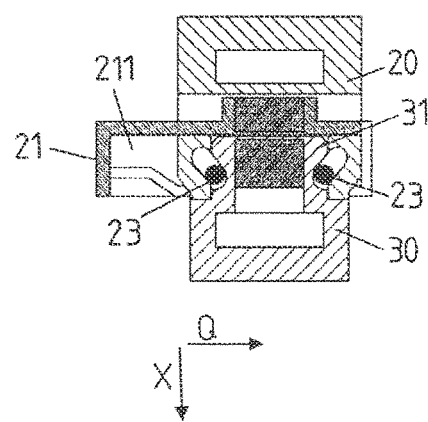
Figure 39D:
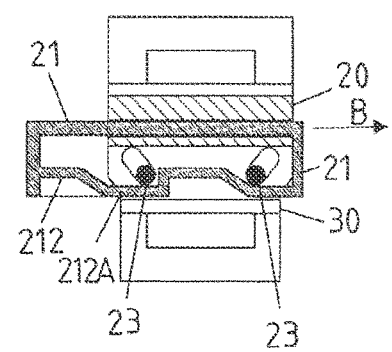
Figure 40A:
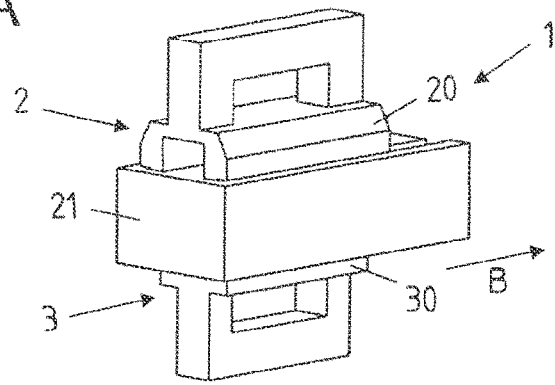
FIGS. 40A-D show views of the closure device when unlocking.
Figure 40B:
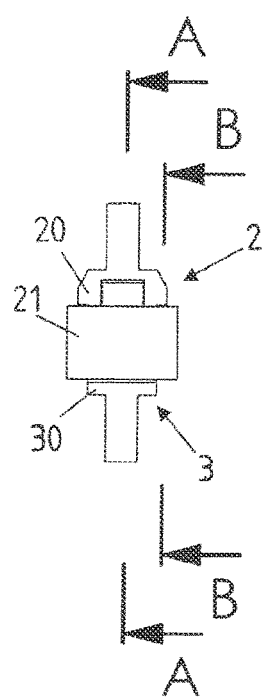
Figure 40C:
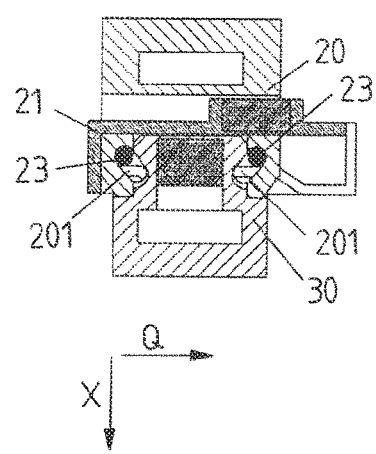
Figure 40D:
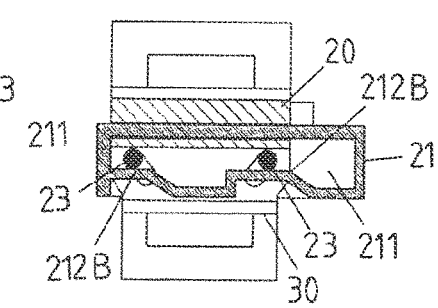
Figure 41A:
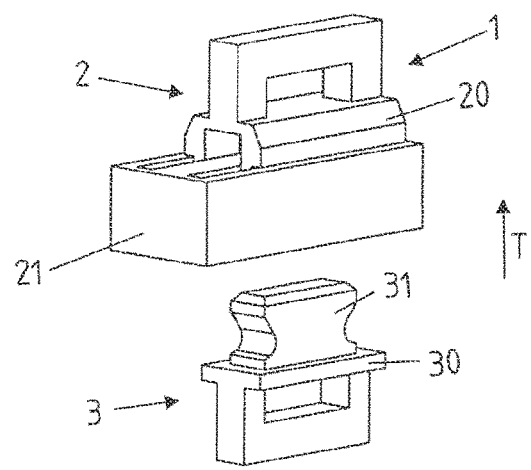
FIGS. 41A-D show views of the closure device upon opening.
Figure 41B:
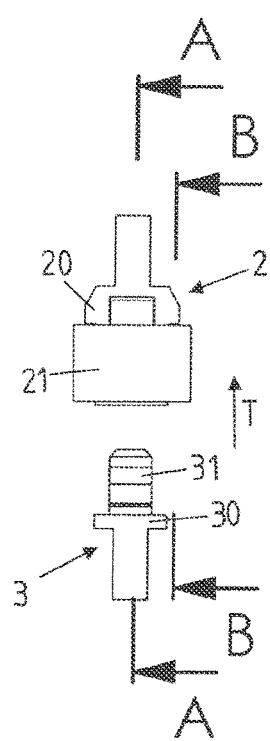
Figure 41C:
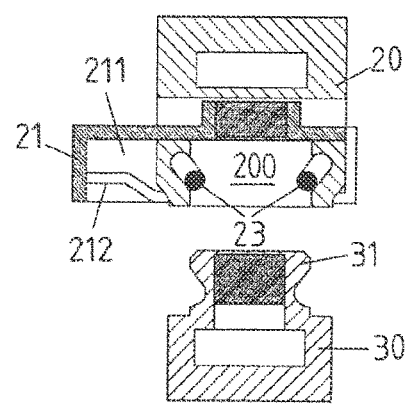
Figure 41D:
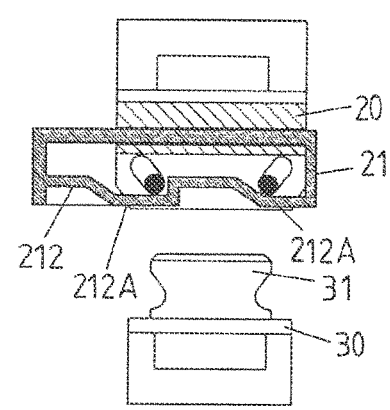

If the closure parts 2, 3 are to be released from one another from the closing position thereof (FIGS. 35A-D), a user can depress the effective elements 24 on both sides and push the latter, counter to the spring-preload of the spring elements 240, toward the body 20 and thus on to one another. On account thereof, the deflection portions 241 of the effective elements 24 slide on the deflection portions 216 of the adjustment part 21 and move the adjustment part 21 in the activation direction B in relation to the body 20 of the closure part 2 such that, on account thereof, the locking elements 23 are lifted and moved outward in the receptacle openings 201, as can be seen from FIG. 36C. The locking mechanism between the closure parts 2, 3 is thus canceled, and the closure parts 2, 3 can be separated from one another along the separation direction T (FIGS. 37A-E).

In an exemplary embodiment illustrated in FIGS. 38A-D to 41A-D, the adjustment part 21 is displaceable along a transverse direction Q on the body 20 of the closure part 2, and on flank portions 211 has activation elements 212 in the form of inward-pointing guide edges. The activation elements 212 on the internal sides of the flank portions 211 herein have different portions 212A, 212B which are mutually offset along the closing direction X and are connected to one another by way of an inclined plane.

In terms of the locking elements 23 and the locking mechanism between the closure parts 2, 3 in the closing position (FIGS. 39A-D), the exemplary embodiment according to FIGS. 38A-D to 41A-D is identical to the exemplary embodiment according to FIGS. 1A-D to 5A-D, but differs in terms of the adjustment part 21.

In order for the closure parts 2, 3 to be released from one another, the adjustment part 21 is thus displaced transversely to the closing direction X, in the activation direction B, in relation to the body 20 of the closure part 2, on account of which the locking elements 23 inside the flank portions 211 run onto the portions 212B of the activation elements 212, as can be seen in the transition from FIGS. 39A-D to FIGS. 41A-D. On account thereof, the locking elements 23 are lifted in the receptacle openings 201 and relocated toward the outside and thus brought to disengage from its locking engagement from the engagement portions 310 of the engagement element 31 of the closure part 3. The closure parts 2, 3 can thus be released from one another along the separation direction T (FIGS. 41A-D).

Figure 24:
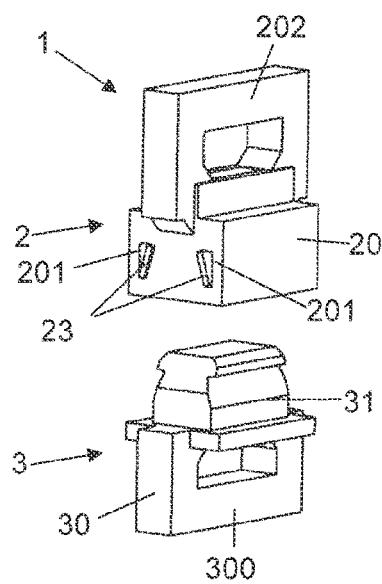
FIG. 24 shows a view of another exemplary embodiment of a closure device.
Figure 25:
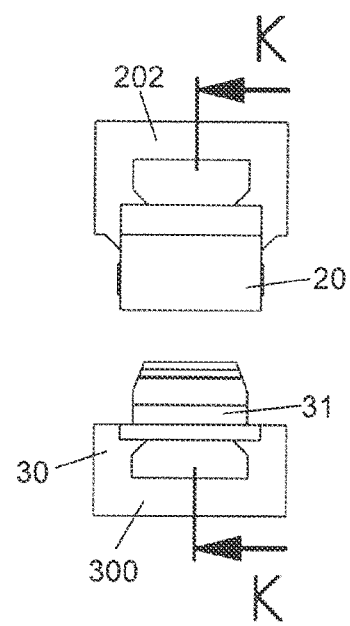
FIG. 25 shows a lateral view of the closure device according to FIG. 24.
Figure 26A:
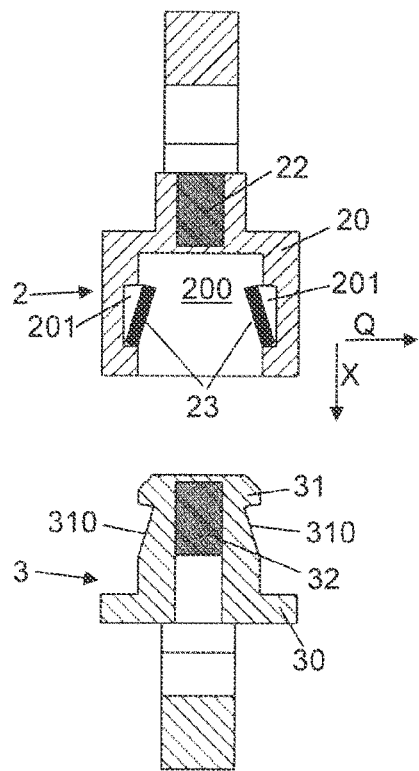
FIGS. 26A-C show a sectional view along the line K-K according to FIG. 25.
Figure 26B:
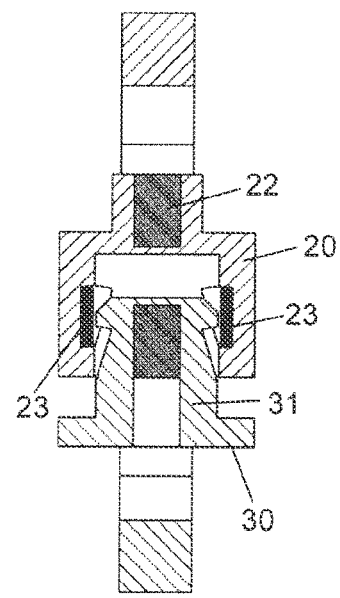
Figure 26C:
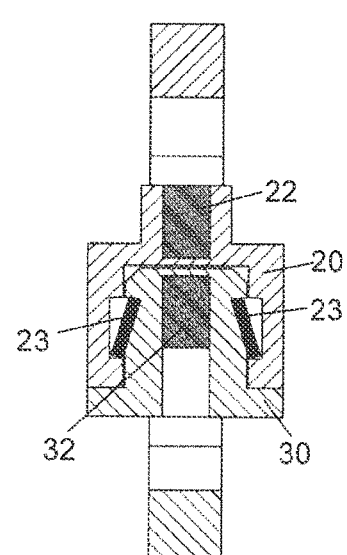
Figure 27:
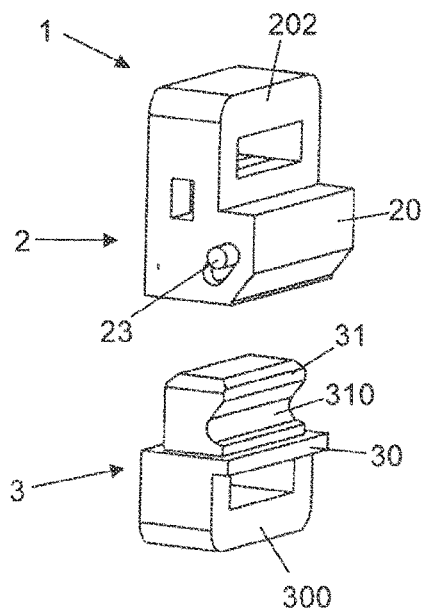
FIG. 27 shows a view of another exemplary embodiment of a closure device.
Figure 28:
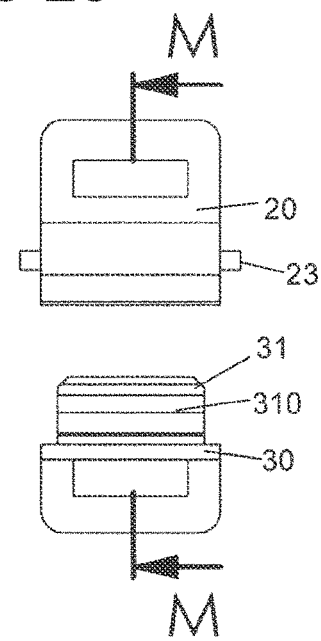
FIG. 28 shows a lateral view of the closure device according to FIG. 27.
Figure 29A:
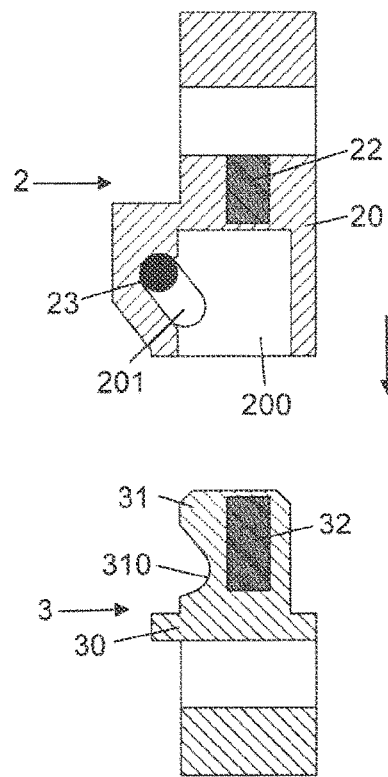
FIGS. 29A-C show sectional views along the line M-M according to FIG. 28.
Figure 29B:
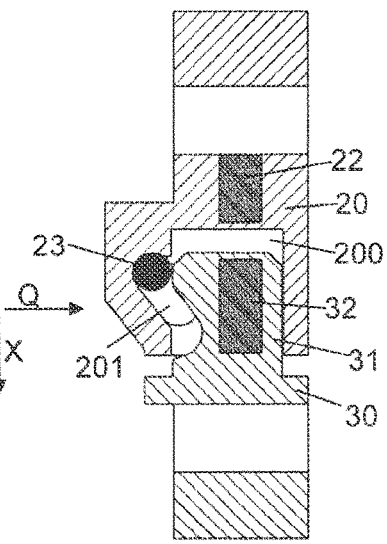
Figure 29C:
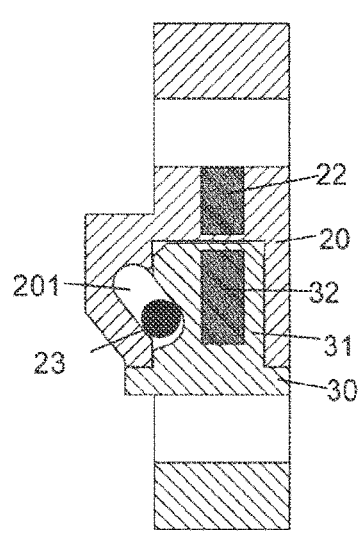
Figure 30A:
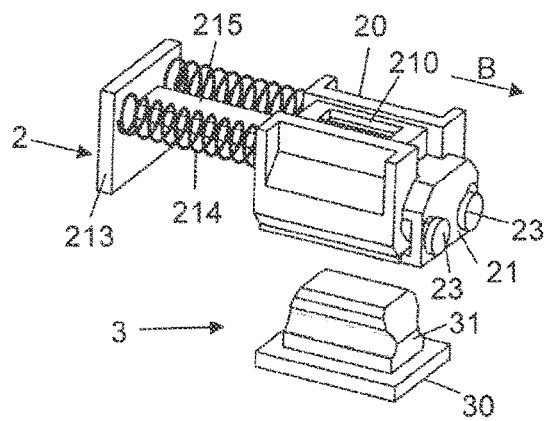
FIGS. 30A-C show views of yet another exemplary embodiment of a closure device in an opened position.

In the exemplary embodiments described above, the one locking element 23 or the plurality of locking elements 23 is/are in each case configured so as to be elongate along a longitudinal direction L, for example as cylindrical pins, as pivotable elements (FIGS. 21-23) or so as to be plate-shaped (FIGS. 24-26). In contrast, in an exemplary embodiment illustrated in FIGS. 42 to 46A-C, a locking element 23 which is designed as an opened ring and is received in an assigned receptacle opening 201 about an engagement opening 200 in the body 20 of the closure part 2 is provided.

The locking element 23 herein is radially expandable such that the locking element 23 is radially widened and thus can be brought to disengage from a locking engagement with an encircling engagement portion 310 on an engagement element 31 of the closure part 2 by adjusting said locking element 23 in the receptacle opening 201.

The locking element 23 is configured so as to be magnetic. When the closure parts 2, 3 are placed against one another, the locking element 23 by virtue of a magnetic interaction with the magnetic installation 32 on the closure part 3 comes to engage in a locking manner with the engagement portion 310 on the engagement element 31 of the closure part 3 (FIGS. 44A-C) such that the closure parts 2, 3 are fixedly connected to one another in a closing position.

The closure part 2 has an adjustment part 21 which is displaceable on the body 20 along an activation direction B that is directed so as to be parallel to the closing direction X and has an activation element 212 in the form of an inward-projecting periphery by way of which the adjustment part 21 when activated acts in the activation direction B on the locking element 23 and moves the latter in the receptacle opening 201 and, on account thereof, radially enlarges the latter (FIGS. 45A-C). The locking mechanism between the closure parts 2, 3 is canceled on account thereof, such that the closure parts 2, 3 can be separated from one another along a separation direction T (FIGS. 46A-C).

A plurality of activation elements 212 can advantageously also act on the locking element 23.

In an exemplary embodiment illustrated in FIGS. 47A-E to 50A-E, a plurality of closure devices 1 are combined so as to form a closure system. A plurality of first closure parts 2 of a plurality of closure devices 1 are thus connected to one another by way of connection portions 40 in a first functional group 4. In contrast, second closure parts 3 of closure devices 1 are connected to one another by way of connection portions 50 in a second functional group 5. The functional groups 4, 5 can be placed against one another along a closing direction X while connecting the closure parts 2, 3 to one another.

The closure parts 2, 3 of each closure device 1 are configured in a manner analogous to the exemplary embodiment according to FIGS. 30A-C to 33A-C. In particular, each first closure part 2 has an adjustment part 21 which by way of a flank portion 211 is connected to locking elements 23 of the closure part 2 such that the locking elements 23 can be pushed out of the receptacle openings 201 in the body 20 of the closure part 2 along an activation direction B that is directed transversely to the closing direction X, so as to unlock the closure parts 2, 3 from one another and separate the functional groups 4, 5 from one another.

The adjustment parts 21 of the first closure parts 2 herein are connected to one another by way of connection portions 215 in such a manner that the adjustment part 21 can be conjointly displaced in the activation direction B by way of a (single) effective element 213, so as to conjointly unlock the closure devices 1.

Figure 48A:
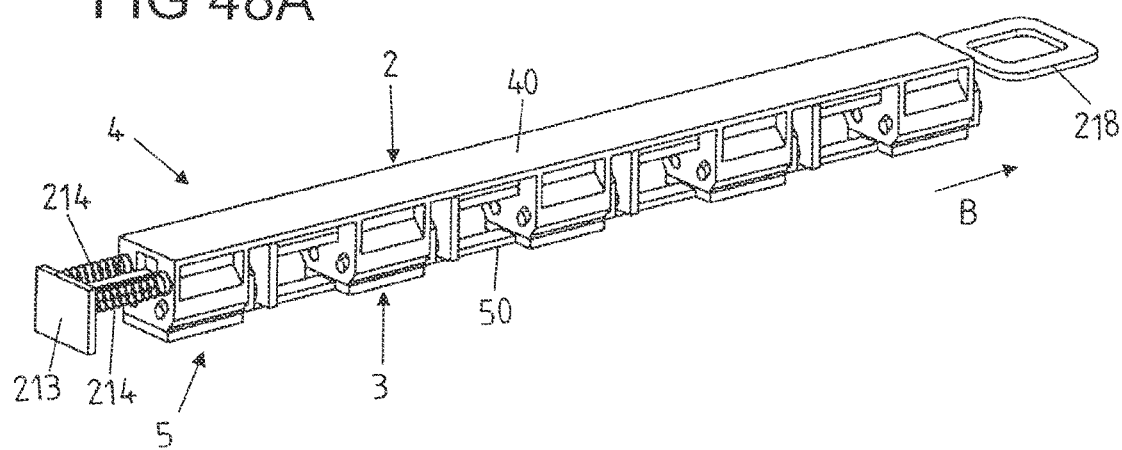
FIGS. 48A-E show views of the closure system in a closing position.
Figure 48E:
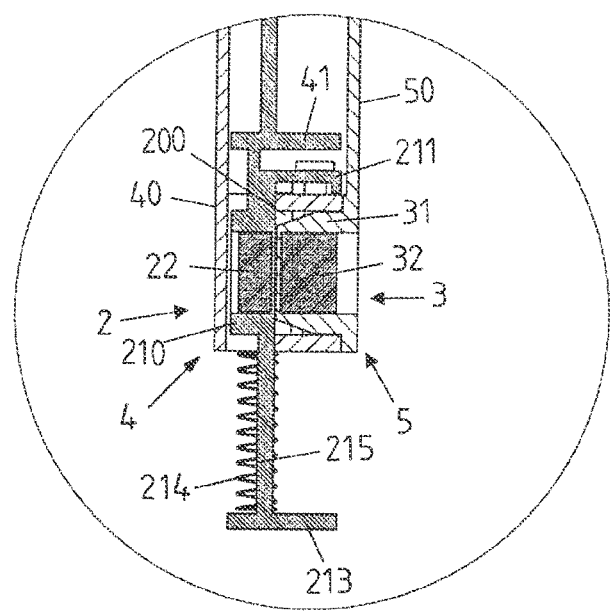
Figure 48B:
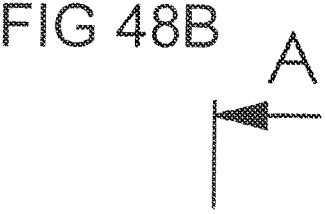
Figure 48C:
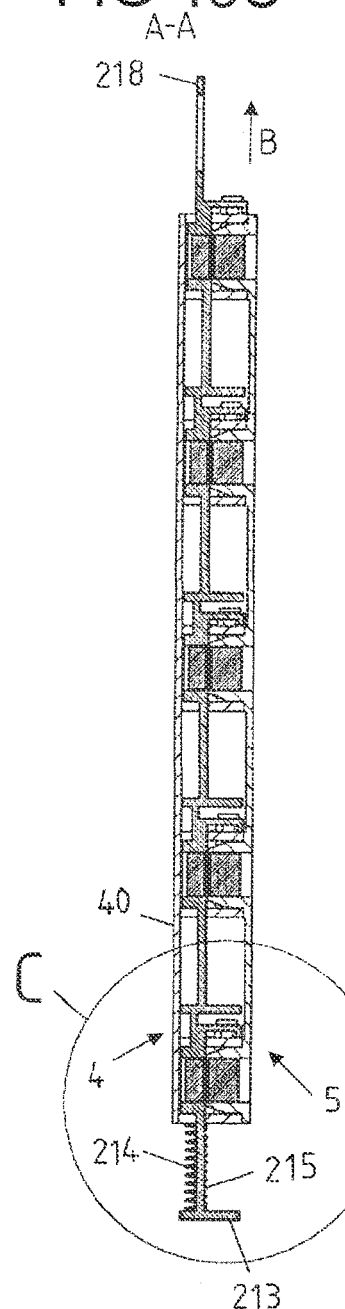
Figure 48D:
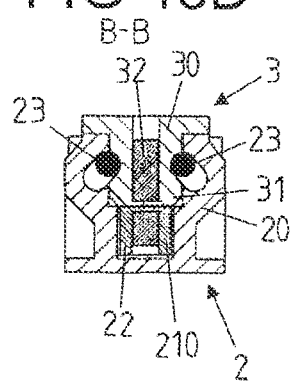
Figure 50A:
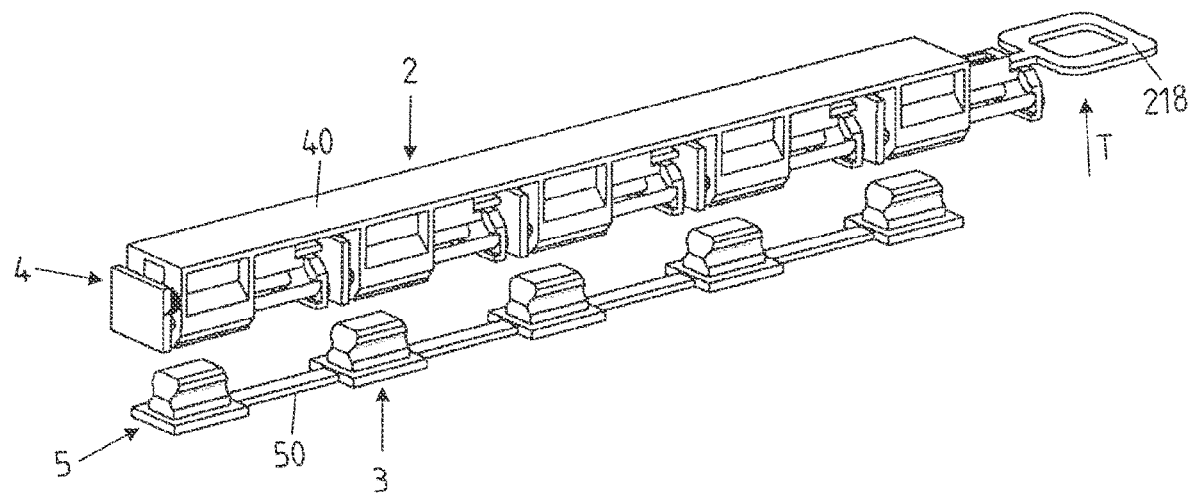
Figure 50E:
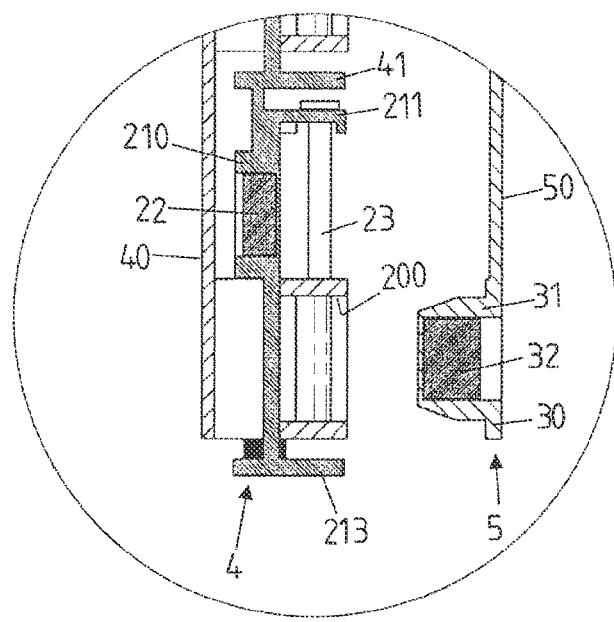
Figure 51A:
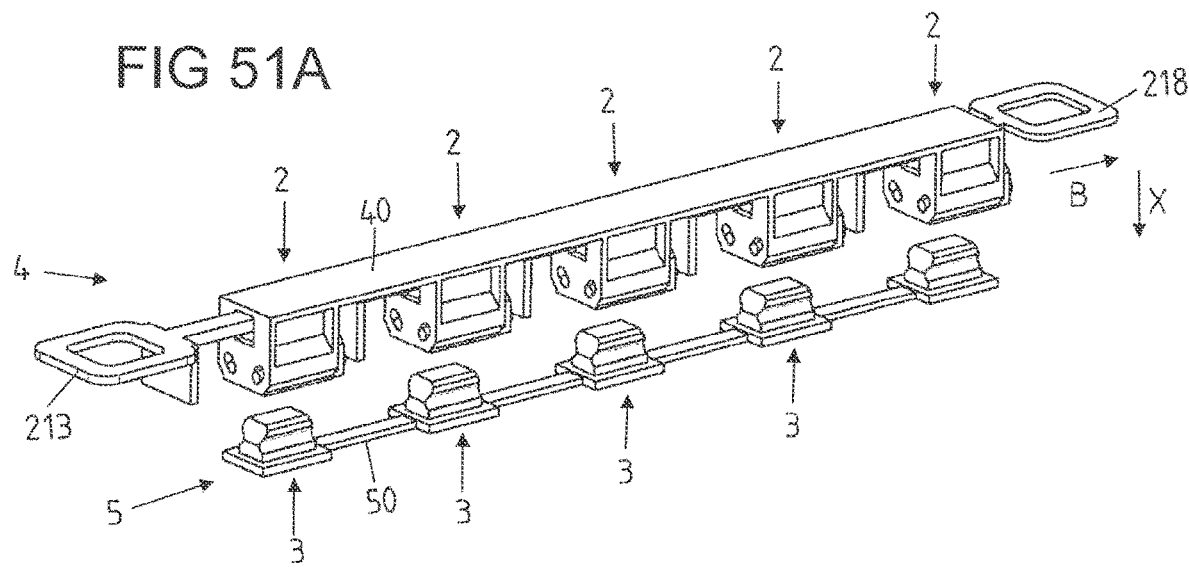
Figure 51E:
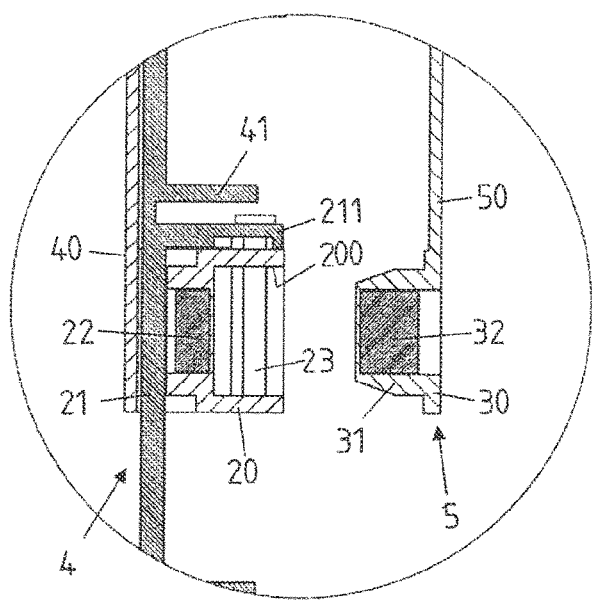
Figure 52A:
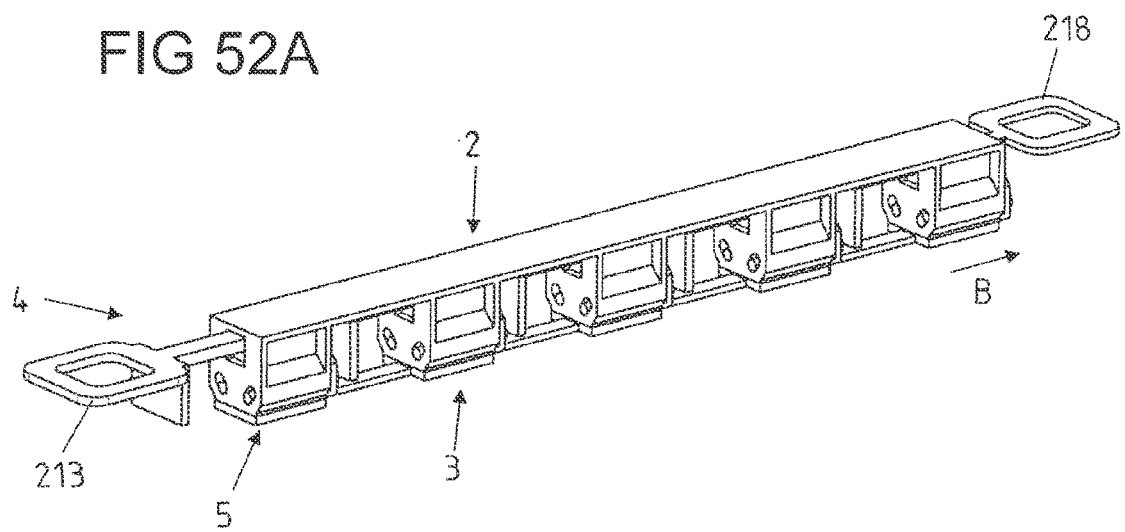
Figure 52E:
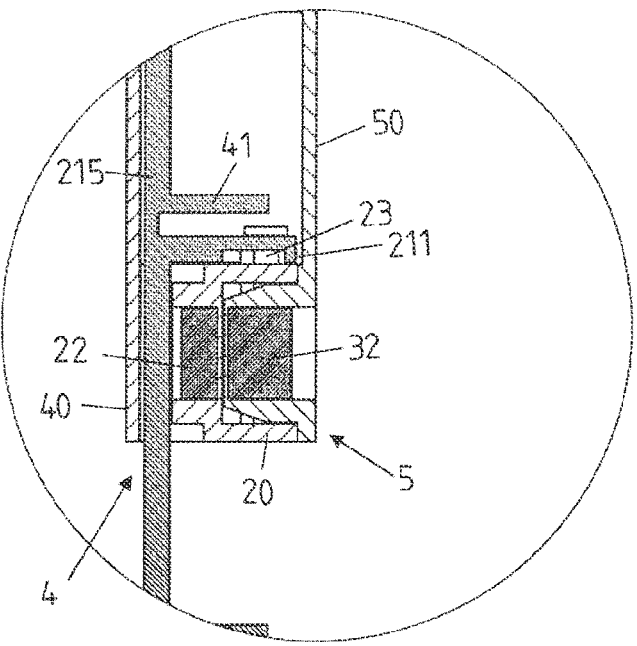
Figure 53A:
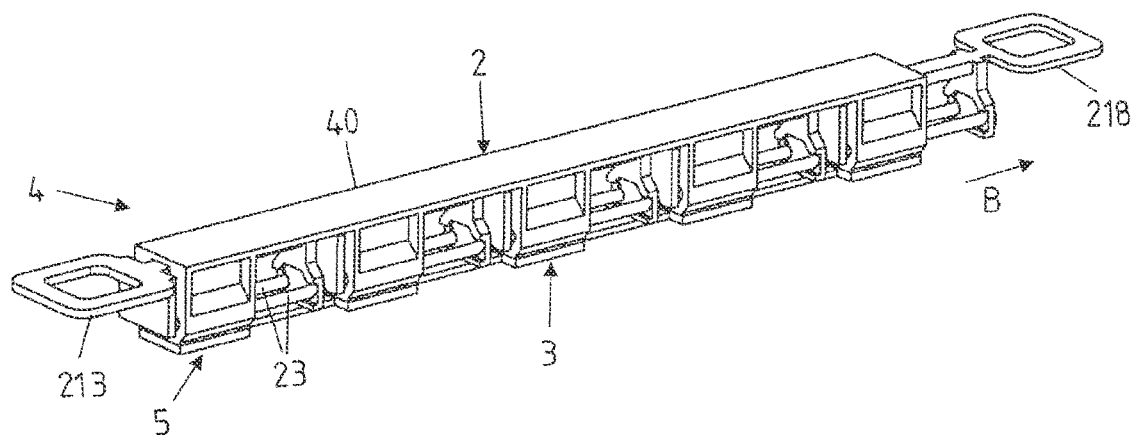
Figure 53E:
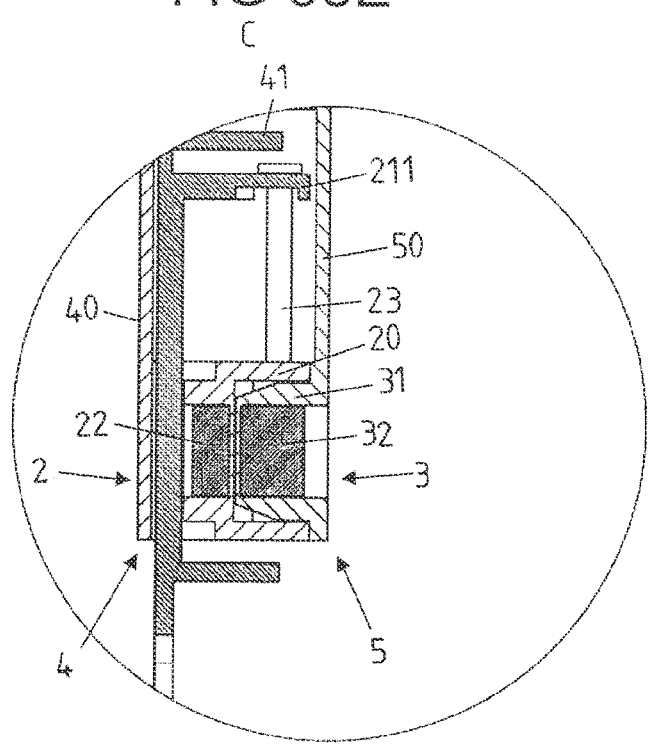
Figure 56A:
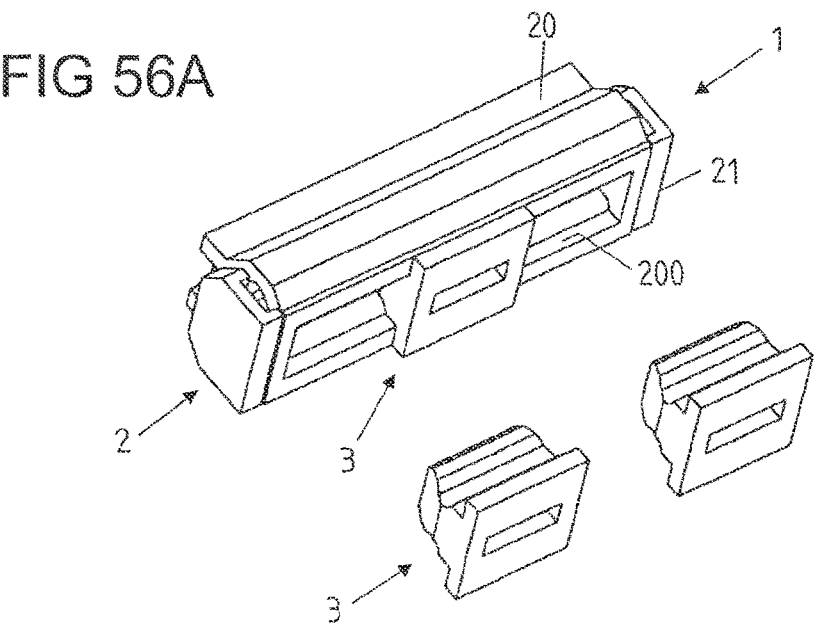
FIGS. 56A-D show views of the closure device in a state in which a second closure part is placed against the first closure part.
Figures 56B, 56C:
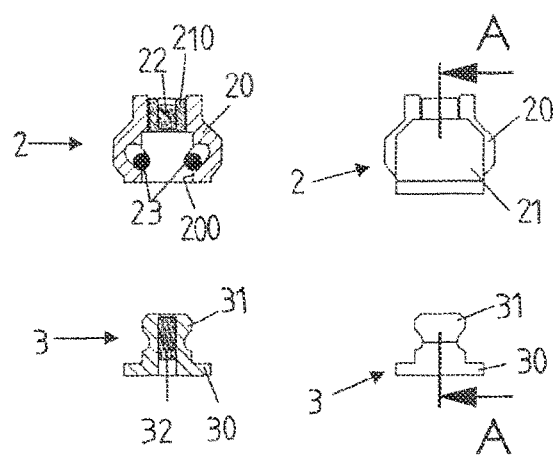
Figure 56D:
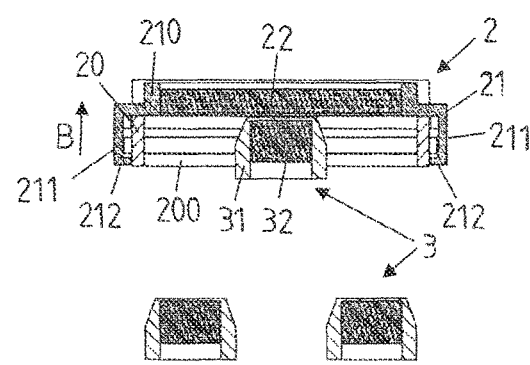
Figure 57A:
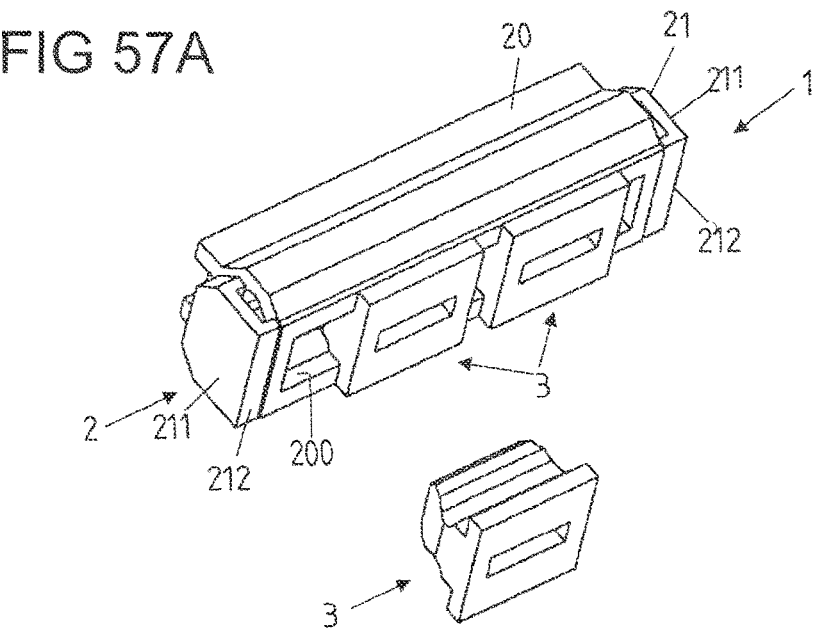
FIGS. 57A-D show views of the closure device in a state in which two second closure parts are placed against the first closure part.
Figures 57B, 57C:
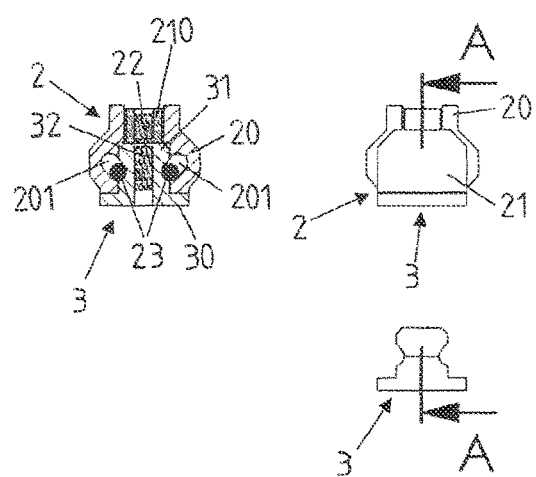
Figure 57D:
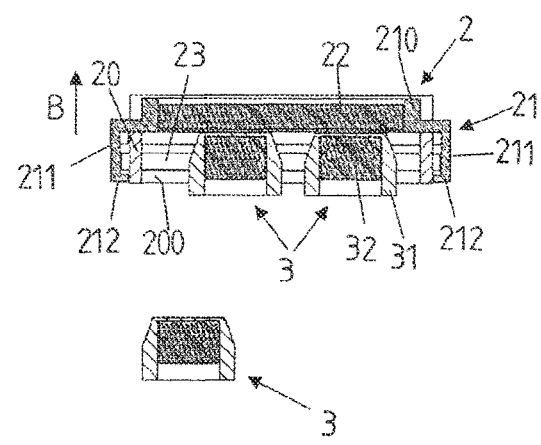
Figure 59A:
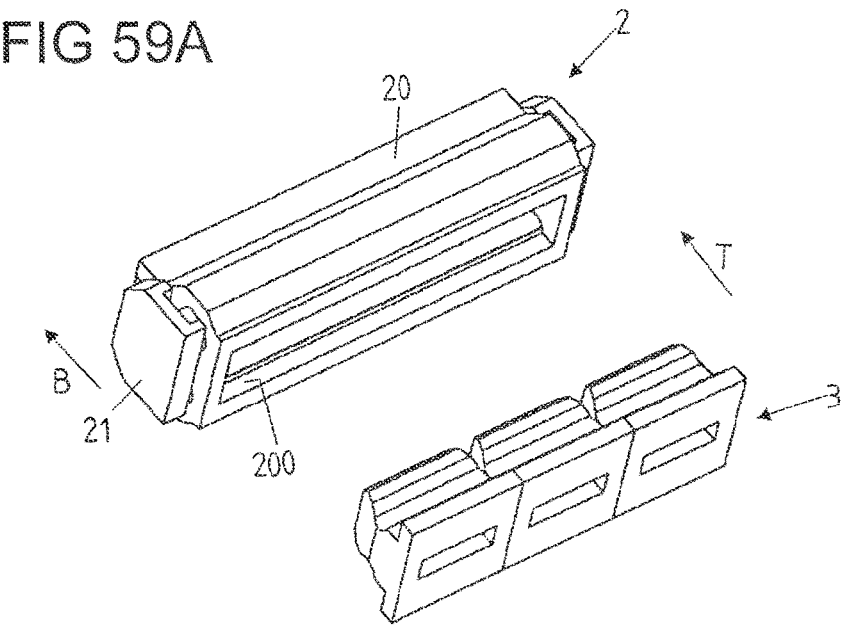
FIGS. 59A-D show views of the closure device upon opening.
Figure 59B:
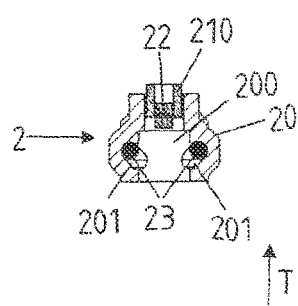
Figure 59C:
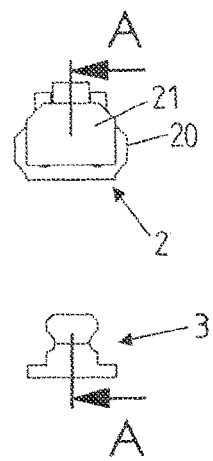
Figure 59D:
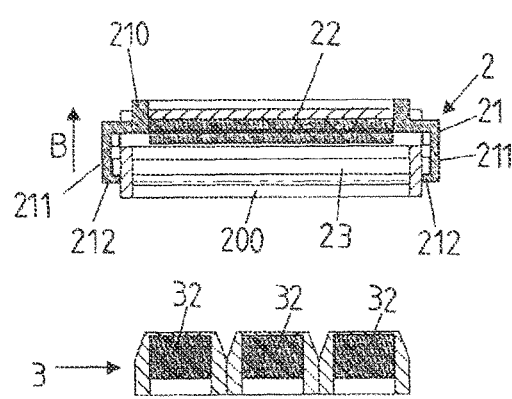
Figure 60A:
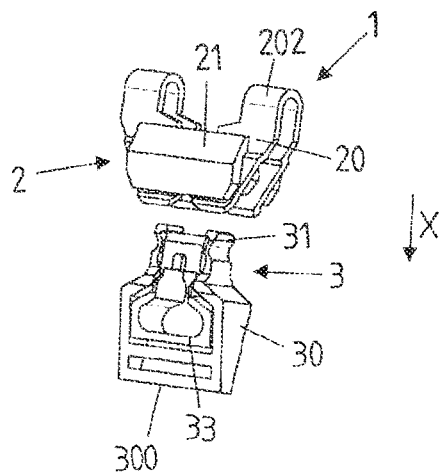
FIGS. 60A, 60B show views of another exemplary embodiment of a closure device, having a blocking piece which is disposed on the second closure part, in an opened position.
Figure 61A:
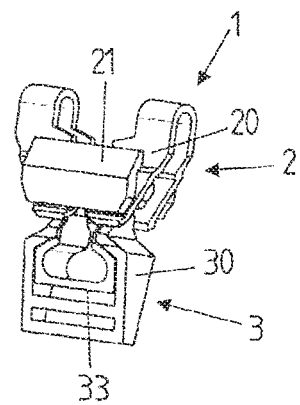
FIGS. 61A, 61B show views of the closure device when closing.
Figure 60B:
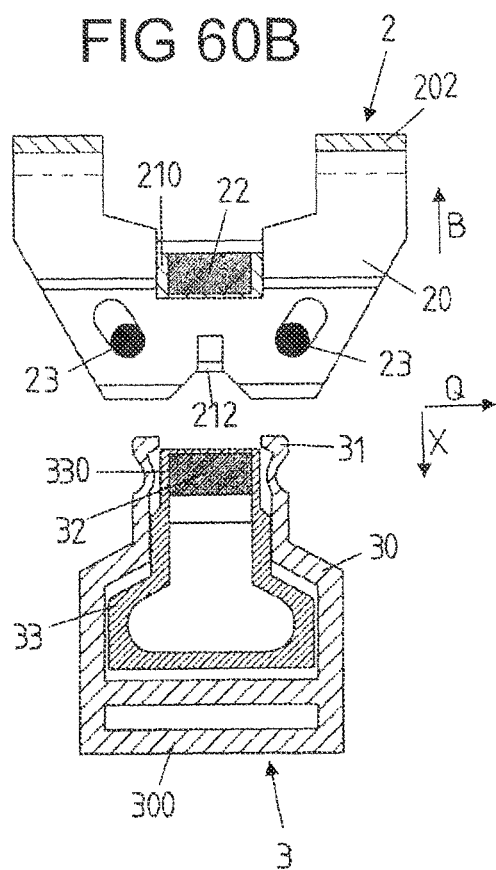
Figure 61B:
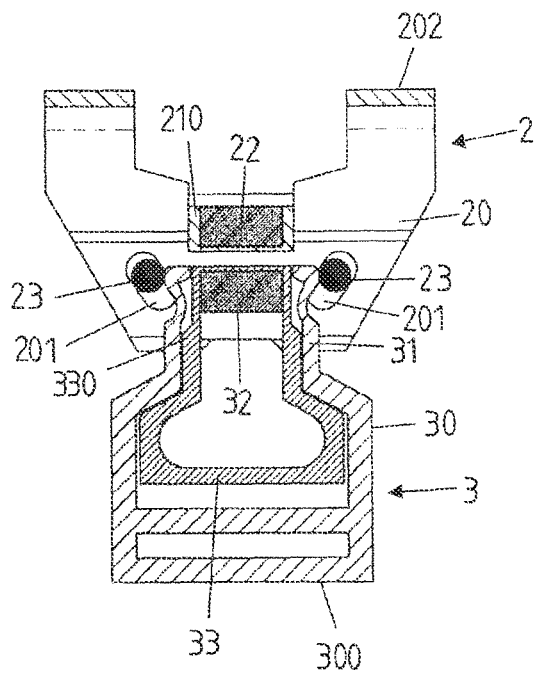
Figure 62A:
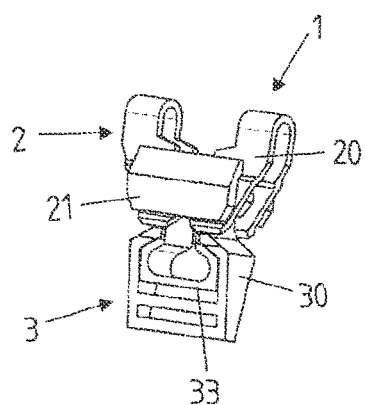
FIGS. 62A, 62B show views of the closure device in a closing position.
Figure 63A:
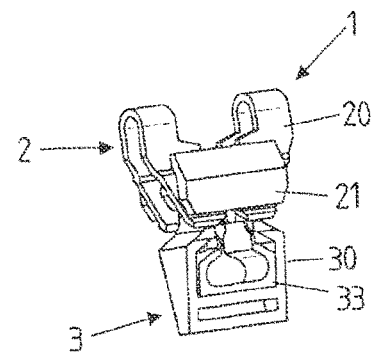
FIGS. 63A, 63B show views of the closure device when activating the blocking piece.
Figure 62B:
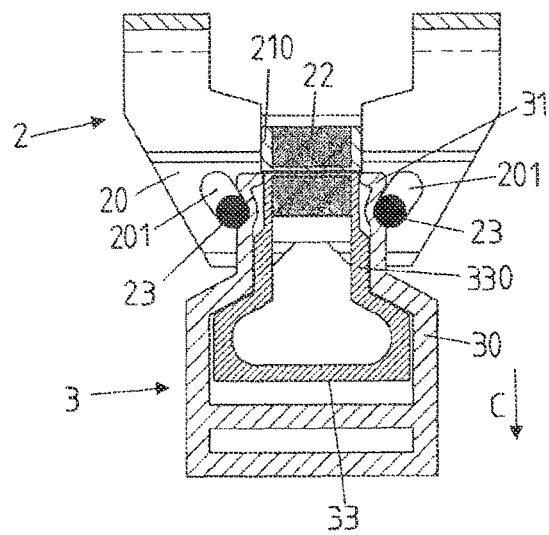
Figure 63B:
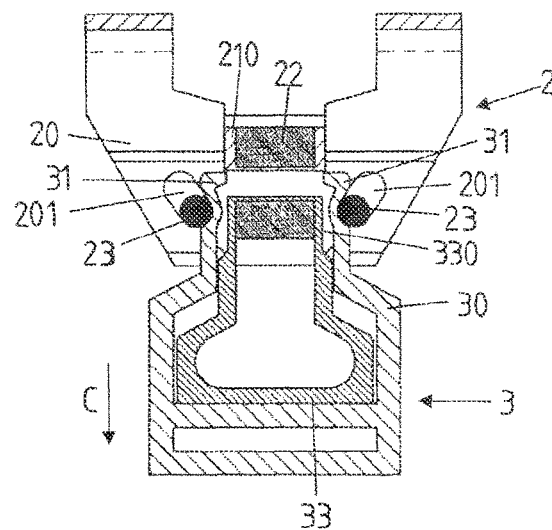

In the closing position (FIGS. 48A-E), all of the closure parts 2, 3 engage in one another and are locked to one another on account of the locking elements 23 engaging in assigned engagement portions 310 on the engagement elements 31 of the second closure part 3 (FIG. 48B). By conjointly activating the adjustment parts 21 (FIGS. 49A-E), the locking elements 23 of each first closure part 2 are lifted out of the region of the receptacle openings 201 such that the locking mechanism is canceled (FIG. 49D) and the functional groups 4, can thus be separated from one another along a separation direction T (FIGS. 50A-E).

Figure 47A:
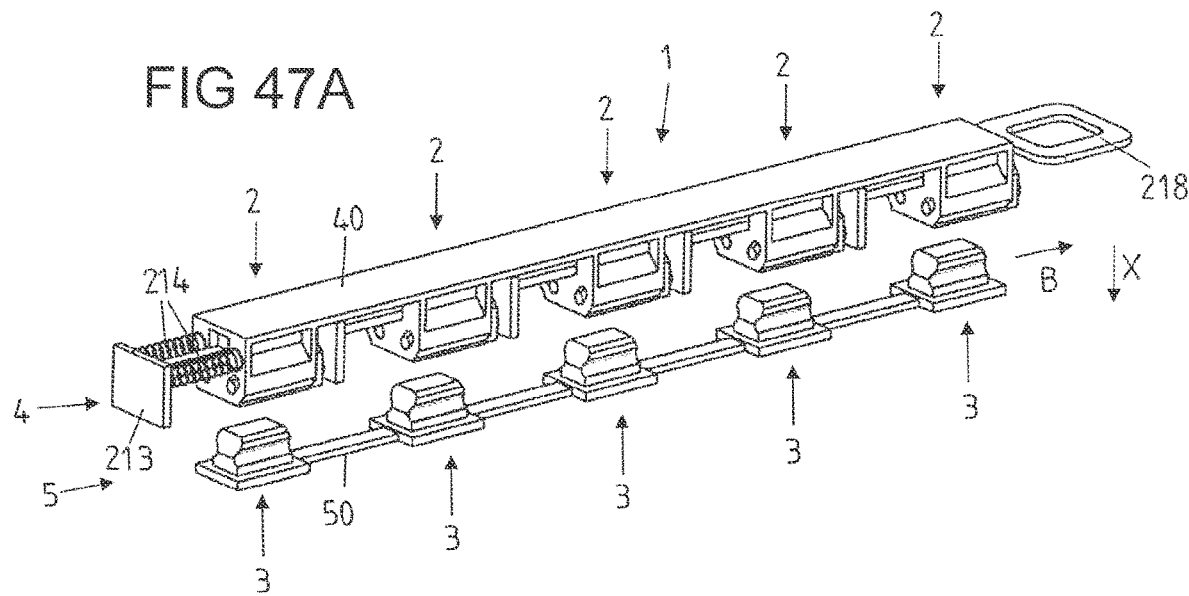
Figure 47E:
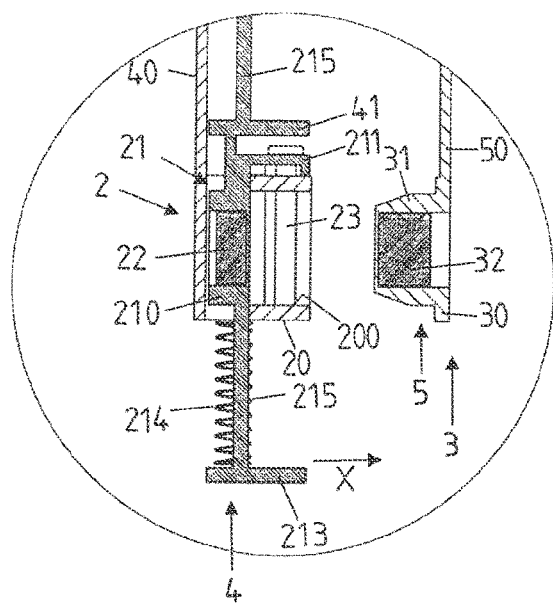

The effective element 213 herein by way of spring elements 214 is spring-preloaded in relation to a neighboring closure part 2 such that the adjustment parts 21 of the closure parts 2 in a self-acting manner make their way back to the initial position illustrated in FIG. 47A once an activation is completed.

An exemplary embodiment illustrated in FIGS. 51A-E to FIGS. 54A-E in functional terms is largely identical to the exemplary embodiment according to FIGS. 47A-E to FIGS. 50A-E. The exemplary embodiment according to FIGS. 51A-E to FIGS. 54A-E differs from the exemplary embodiment according to FIGS. 47A-E to FIGS. 50A-E only in that in the exemplary embodiment according to FIGS. 51A-E to FIGS. 54A-E effective elements 213, 218 in the form of pulling eyelets are disposed on both sides of the functional group 4, and the effective element 213 is not spring-preloaded in relation to the neighboring closure part 2. Once the activation has been completed, the effective element 213 and by way of the latter the adjustment part 21 of the closure parts 2, are thus to be manually retracted, counter to the activation direction B, to the initial position according to FIG. 51A.

In an exemplary embodiment illustrated in FIGS. 55A-D to 59A-D, a plurality (specifically three in the exemplary embodiment illustrated) of second closure part 3 can be placed against a first closure part 2, wherein the second closure parts 3 can be placed individually or conjointly against the first closure part 2.

The first closure part 2 in functional terms is configured so as to be identical to the exemplary embodiment according to FIGS. 1A-D to FIGS. 5A-D. The second closure parts 3 are in each case also configured so as to be identical to the exemplary embodiment according to FIGS. 1A-D to 5A-D, wherein the second closure parts 3 along the longitudinal direction L are however so short, and the engagement openings 200 in the body 20 of the first closure part 2 are so long, that a plurality of second closure parts 3 can be conjointly inserted into the engagement opening 200.

Each second closure part 3 herein can lock separately in the engagement opening 200 (cf. FIGS. 56A-D for an inserted second closure part 3, FIGS. 57A-D for two inserted second closure parts 3, and FIGS. 58A-D for three inserted second closure parts 3). The second closure parts 3 herein can be conjointly unlocked by activating the adjustment part 21 of the first closure part 2, and thus be conjointly retrieved from the second closure part 2 along the separation direction T (FIGS. 59A-D).

In an exemplary embodiment illustrated in FIGS. 60A, 60B to 64A, 64B, the first closure part 2 is configured so as to be identical to the exemplary embodiment according to FIGS. 17A, 17B. In comparison to the exemplary embodiment according to FIGS. 17A, 17B, the second closure part 3 in the exemplary embodiment according to FIGS. 60A, 60B to 64A, 64B however has a base 30 having elastically adjustable engagement portions 310 molded on the latter, as well as a blocking piece 33 which is adjustable in relation to the base 30.

The magnetic installation 32 of the closure part 3 in the exemplary embodiment illustrated is disposed on the blocking piece 33. When the closure parts 2, 3 are placed against one another, the engagement portions 310 come to engage in a locking manner with the locking element 32 of the closure part 2, wherein the blocking piece 33, by virtue of the magnetic interaction between the magnetic installations 22, 32 of the closure parts 2, 3, makes its way to a blocking position and by way of a blocking portion 330 comes to lie between the engagement portions 310 such that an elastic yielding movement of the engagement portions 310 toward the inside is prevented.

In the closure device 1 according to FIGS. 60A, 60B to 64A, 64B, unlocking is possible by activating the adjustment part 21, on the one hand, in a manner entirely analogous to that described above.

Figure 64A:
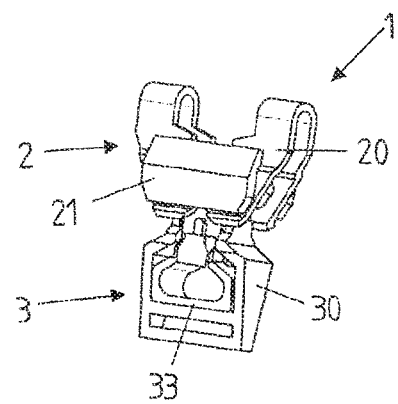
FIGS. 64A, 64B show views of the closure device when opening.
Figure 64B:
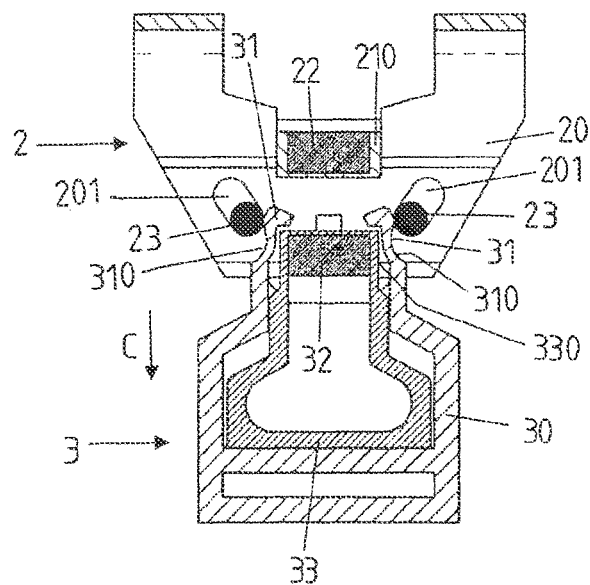
Figure 65A:
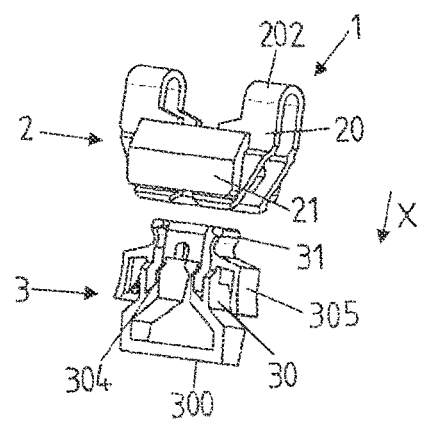
FIGS. 65A, 65B show views of yet another exemplary embodiment of a closure device in an opened position.
Figure 66A:
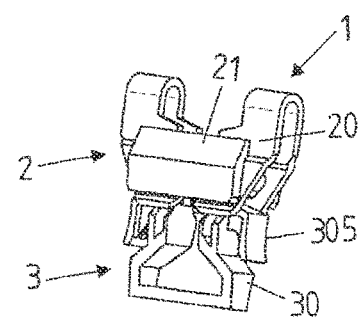
FIGS. 66A, 66B show views of the closure device when closing.
Figure 65B:
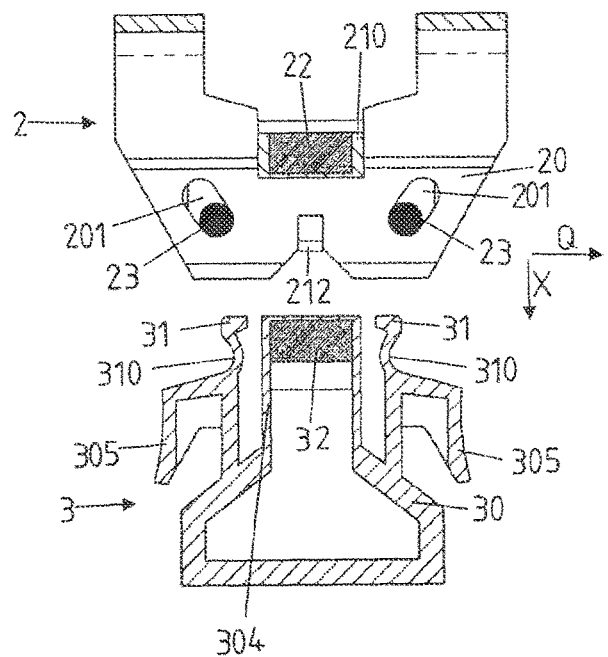
Figure 66B:
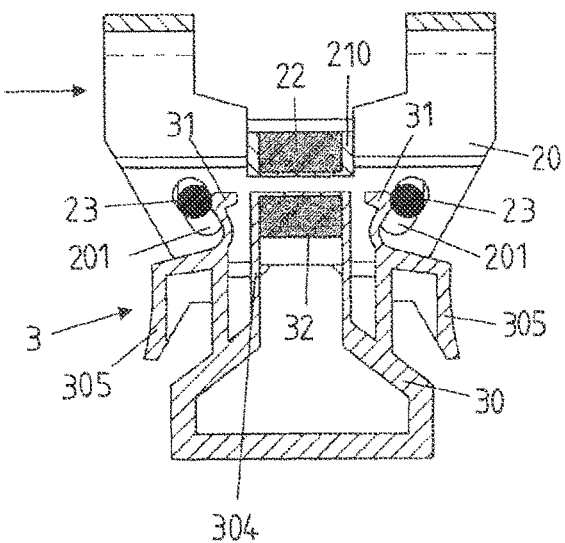
Figure 67A:
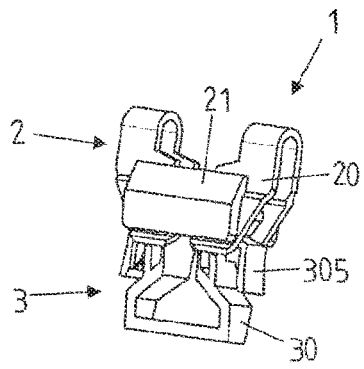
FIGS. 67A, 67B show views of the closure device in a closing position.
Figure 68A:
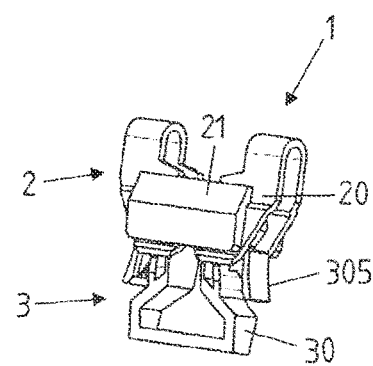
FIGS. 68A, 68B show views of the closure device when opening.
Figure 67B:
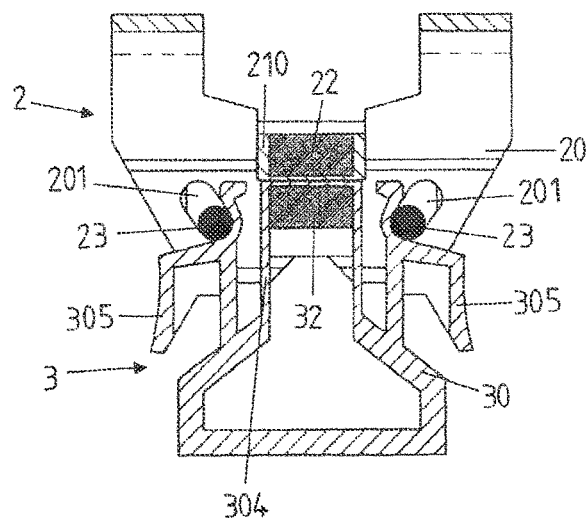
Figure 68B:
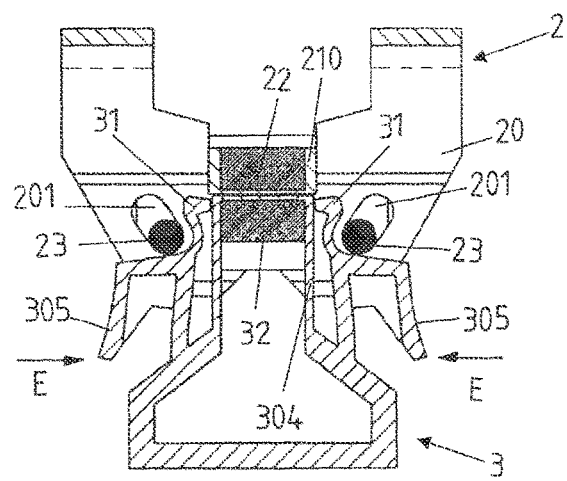

On the other hand, the blocking piece 33 can be activated along an activation direction C on the base 30 of the adjustment part 3, as is illustrated in the transition from FIGS. 62A, 62B to FIGS. 63A, 63B. On account thereof, the blocking portion 330 is retracted in relation to the engagement portions 310 such that the engagement portions 310 are no longer blocked and can elastically yield toward the inside. This enables the adjustment parts 2, 3 to be removed from one another while the engagement portions 310 are elastically deflected, as is illustrated in FIGS. 64A, 64B.

In the exemplary embodiment according to FIGS. 65A, 65B to 69A, 69B, engagement portions 310 are elastically molded on the base 30 of the adjustment part 3, wherein however no blocking piece is provided as in the previously described exemplary embodiment, but the engagement portions 310 by way of activation portions 305 can be manually deformed and thus unlocked. The closure part 3 herein is integrally molded and has a central support portion 304 on which the magnetic installation 32 is disposed.

Figure 69A:
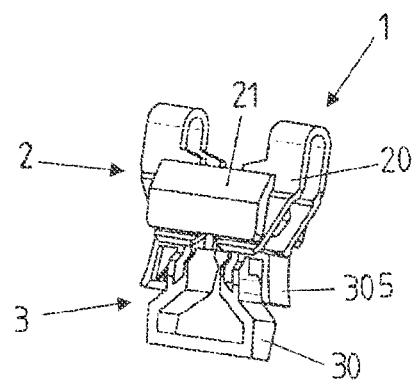
FIGS. 69A, 69B show views of the closure device when being further opened.
Figure 69B:
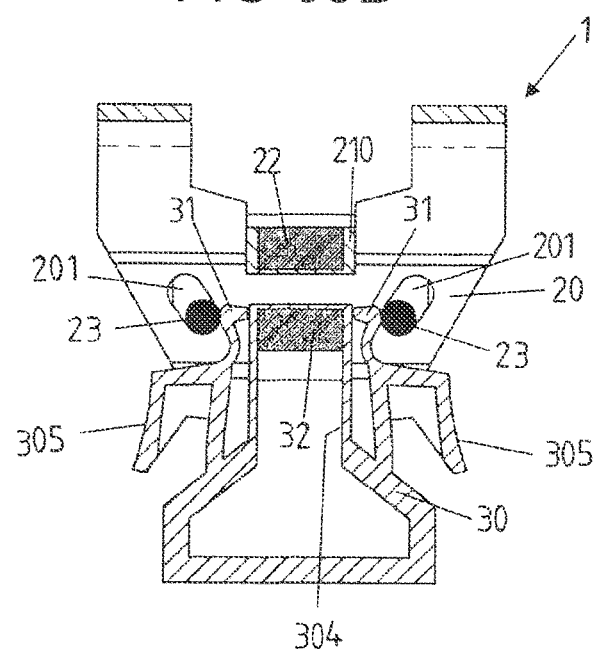
Figure 70A:
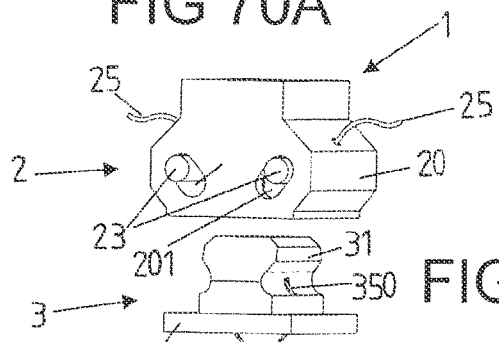
FIGS. 70A, 70B show views of an exemplary embodiment of the closure device having electrical connectors, in an opened position of the closure device.
Figure 70B:
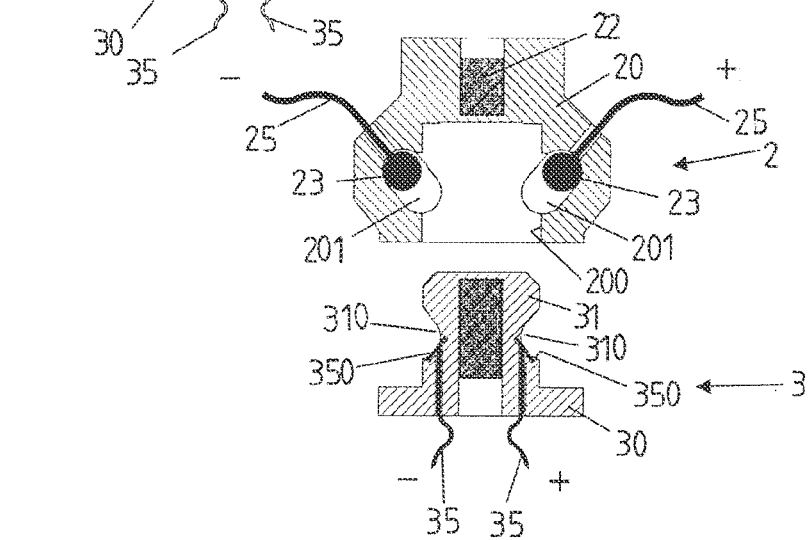
Figure 71A:
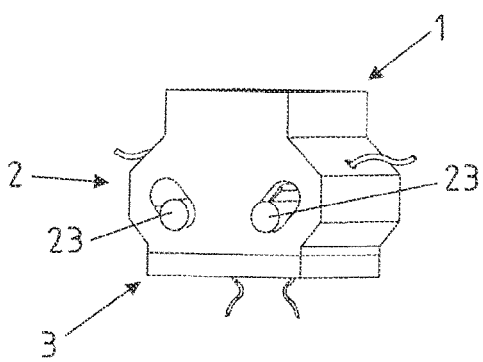
FIGS. 71A, 71B show views of the closure device according to FIGS. 70A, 70B in a closing position.
Figure 71B:
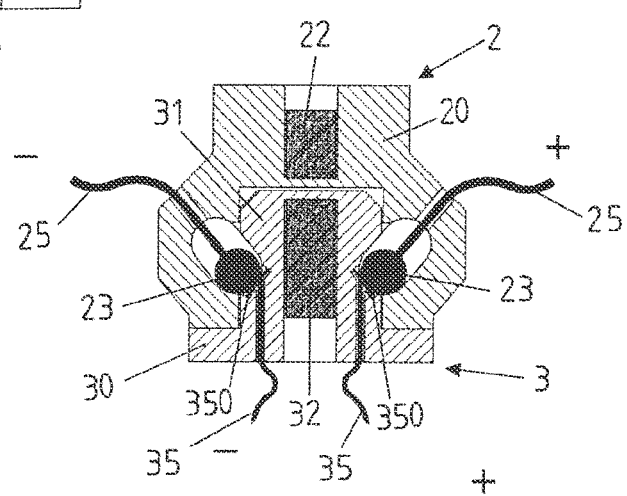

The first closure part 2 is configured so as to be identical to the exemplary embodiment according to FIGS. 17A, 17B. For closing, the second closure part 3 can be placed against the first closure part 2 along the closing direction X and in the closing position (FIGS. 67A, 67B) is locked by way of the locking elements 23 of the first closure part 2. In order for the closure parts 2, 3 to be separated from one another, a user can manually act on the activation portions 305 of the second closure part 3 and depress said activation portions 305 inward in an activation direction E such that the engagement portions 310 are relocated toward the inside and the locking mechanism is thus canceled. The closure parts 2, 3 can thus be separated from one another (FIGS. 69A, 69B).

This exemplary embodiment provides a closure which is triggered from a force that is determined by the resilient elasticity of the deformable engagement portions 310.

In an exemplary embodiment of the closure device 1 illustrated in FIGS. 70A, 70B and 71A, 71B, a first closure part 2 has a body 20 having an engagement opening 200 molded therein, and locking elements 23 which are received in receptacle openings 201, in a manner analogous to that described with the exemplary embodiment according to FIGS. 1A-D to FIGS. 5A-D, wherein in the exemplary embodiment according to FIGS. 70A, 70B, 71A, 71B the first closure part 2 does not have an adjustment part 21 and the magnetic installation 22 is disposed on the body 20. A second closure part 3 in terms of function is configured so as to be analogous to that in the exemplary embodiment according to FIGS. 1A-D to FIGS. 5A-D.

In the exemplary embodiment according to FIGS. 70A, 70B, 71A, 71B, electrical connectors 25 are connected to the locking elements 23. Electrical contact elements 350 which are connected to electrical connectors 35 are disposed in the region of the engagement portions 310 of the second closure part 3. The electrically conductive locking elements 23 in the closing position (FIGS. 71A, 71B) bear on the contact elements 350 such that the connectors 25, 35 are electrically connected to one another and an electrical connection is thus established in the closing position.

The electrical connection can be canceled by separating the closure parts 2, 3 from one another.

In an exemplary embodiment illustrated in FIGS. 72A, 72B, 73A, 73B, connectors 25 are not connected to the locking elements 23 but, as opposed to the exemplary embodiment according to FIGS. 70A, 70B and 71A, 71B, to contact elements 250 in the region of the receptacle openings 201. The contact elements 350 herein are disposed in such a manner that the electrically conductive locking elements 23 in the closing position of the closure device 1 (FIGS. 73A, 73B) bear on the contact elements 250 of the first closure part 2 and also on contact elements 350 of the second closure part 3 such that an electrical connection between the connectors 25, 35 is established by way of the locking elements 23, as can be seen from FIG. 73B.

In an exemplary embodiment illustrated in FIGS. 74A, 74B, 75A, 75B, electrical connectors 25, 35 are disposed exclusively on the first closure part 2, wherein an electrical connection in the closing position is established in interaction with the second closure part 3. Connectors 25 are thus connected to the locking elements 23. The locking elements 23 in the closing position (FIG. 75B) herein bear on contact elements 350 in the region of the inward-facing ends of the receptacle opening 201 such that an electrical connection between the connectors 25, 35 is established herewith.

Figure 74A:
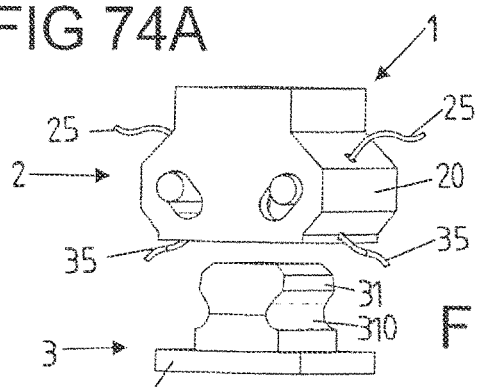
FIGS. 74A, 74B show views of another exemplary embodiment of a closure device having electrical connectors in an opened position.
Figure 74B:
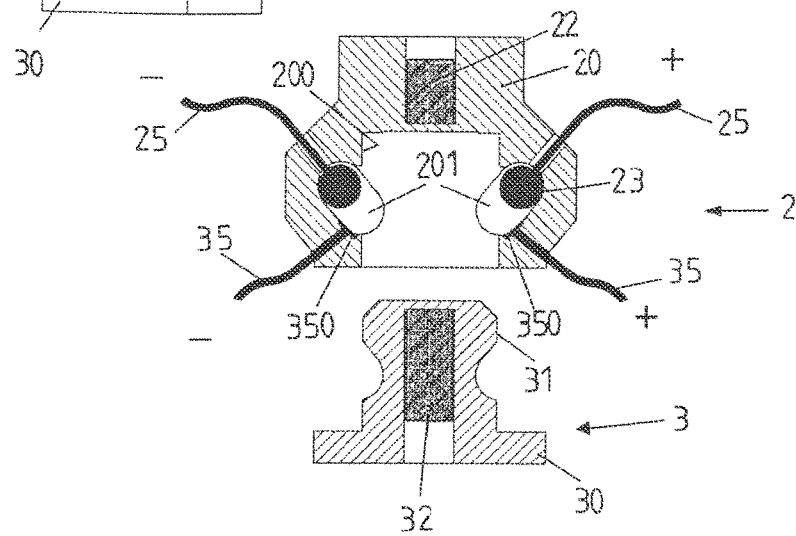
Figure 75A:
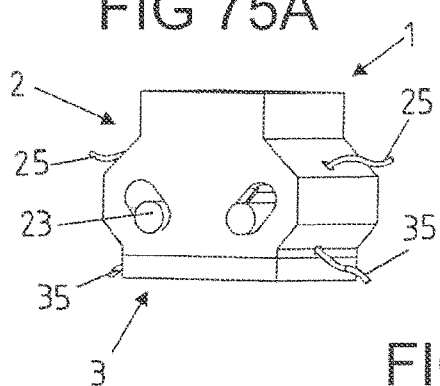
FIGS. 75A, 75B show views of the closure device according to FIGS. 74A, 74B in a closing position.
Figure 75B:
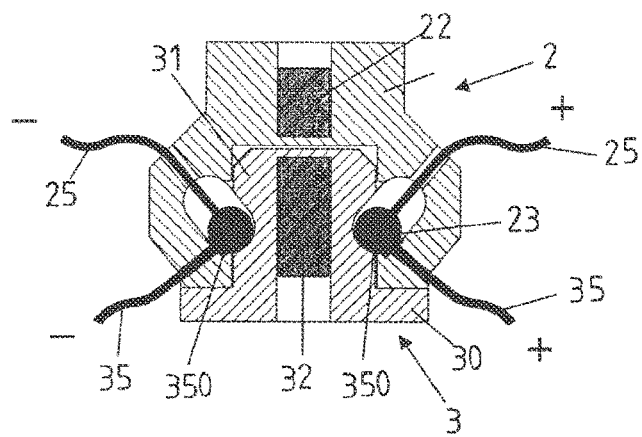
Figure 76A:
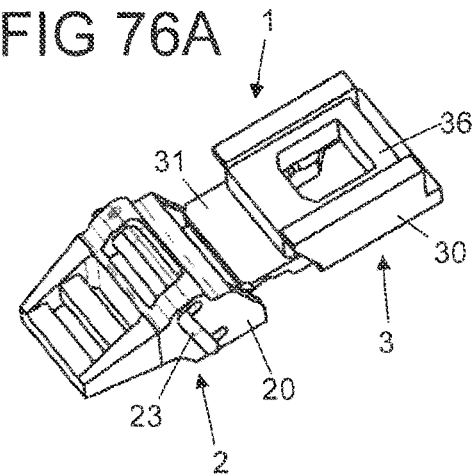
FIGS. 76A, 76B show views of yet another exemplary embodiment of a closure device in an opened position.
Figure 77A:
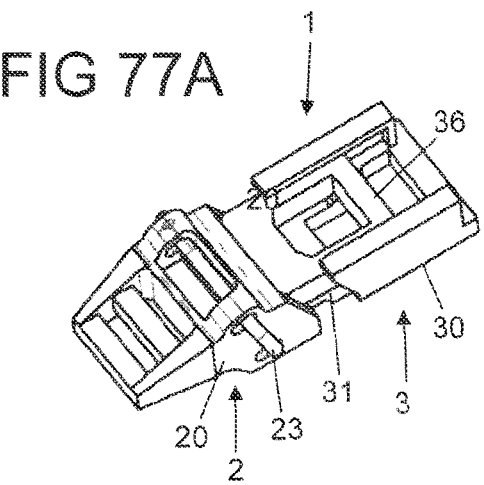
FIGS. 77A, 77B show views of the closure device when closing.
Figure 76B:
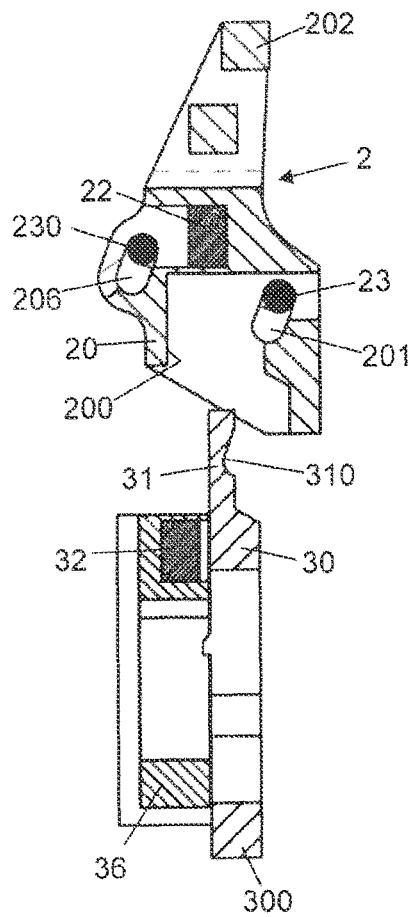
Figure 77B:
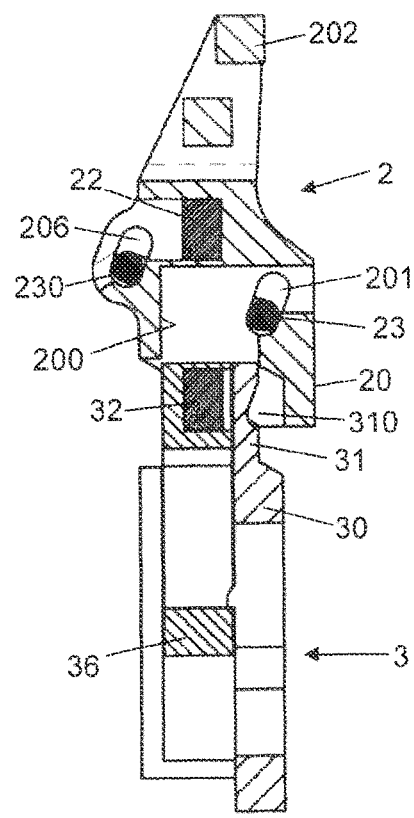
Figure 78A:
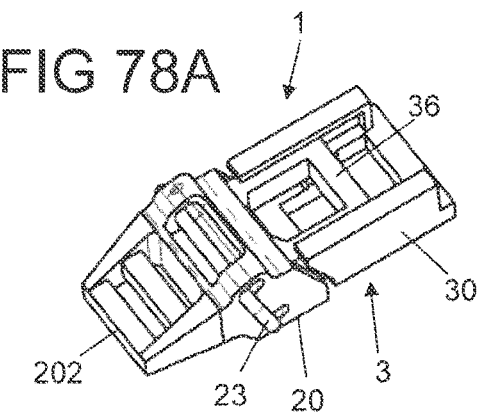
FIGS. 78A, 78B show views of the closure device when being further closed.
Figure 79A:
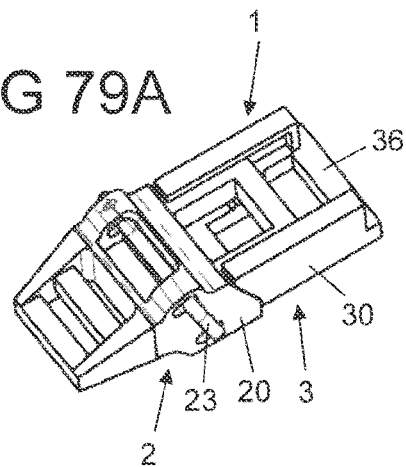
FIGS. 79A, 79B show views of the closure device in a closing position.
Figure 78B:
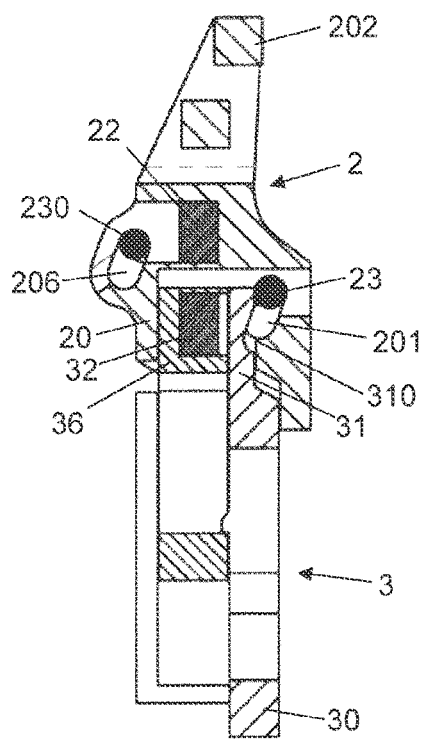
Figure 79B:
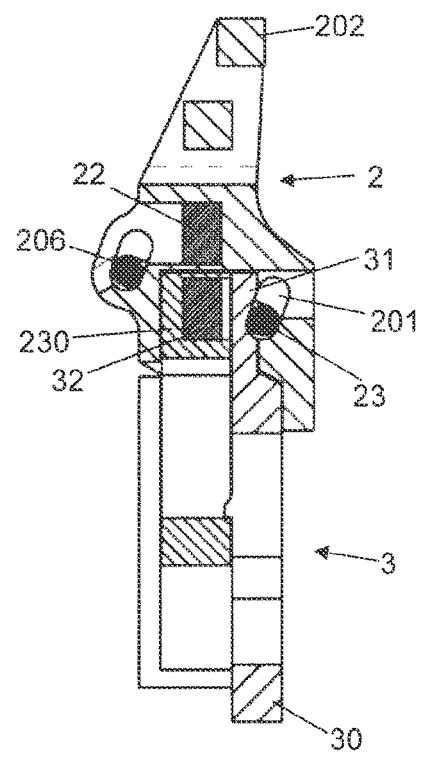
Figure 82A:
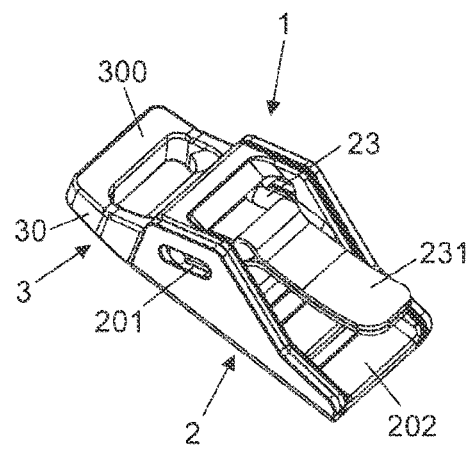
FIGS. 82A, 82B show views of yet another exemplary embodiment of the closure device in a closing position.
Figure 83A:
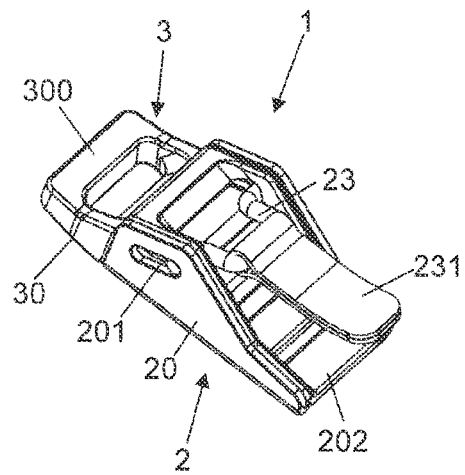
FIGS. 83A, 83B show views of the closure device when unlocking.
Figure 82B:
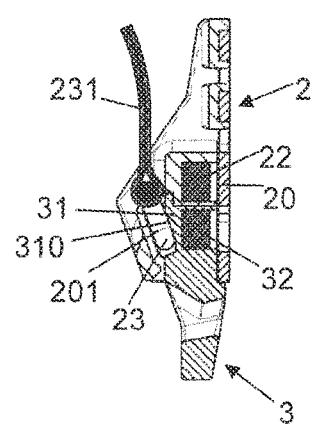
Figure 83B:
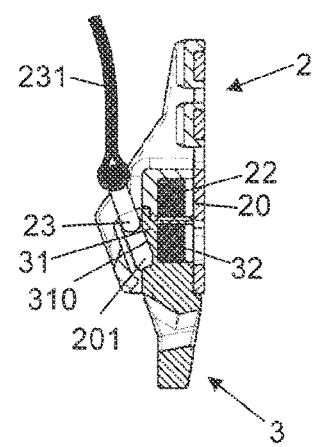
Figure 84A:
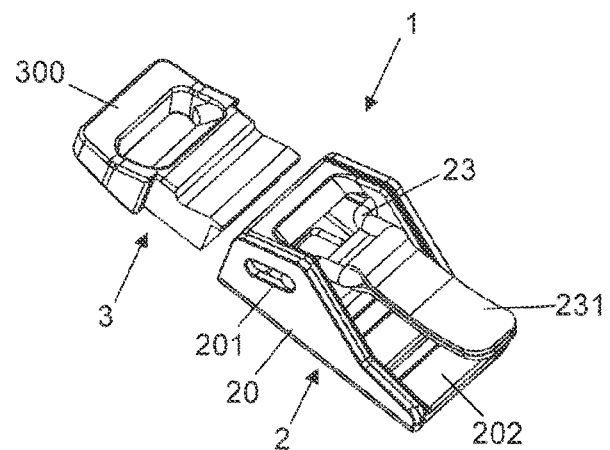
FIGS. 84A, 84B show views of the closure device upon opening.
Figure 84B:
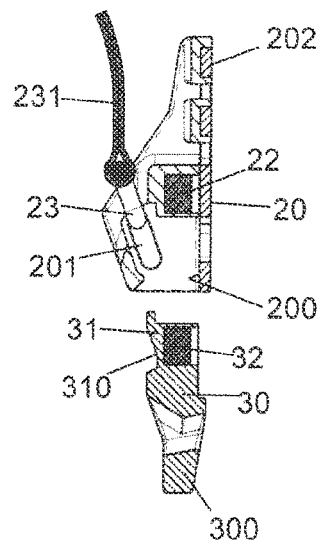

The locking elements 23 in a separated position, by virtue of the magnetic interaction with the magnetic installation 22 of the first closure part 2, are situated in the position illustrated in FIG. 74B. The electrical connection between the connectors 25, 35 is thus canceled in the separated position.

An embodiment with a reversed functionality is also possible. The contact elements 250 are disposed in the receptacle opening 201 such that said contact elements 250 in the open position of the locking elements 23 bear on the contact elements 250. The open position can thus be electrically detected.

An exemplary embodiment in which two contact elements are in each case disposed in each receptacle opening 201 such that one of the contact elements electrically detects the open position and the other detects the closing position is moreover possible.

In an exemplary embodiment illustrated in FIGS. 76A, 76B to 81A, 81B, a first closure part 2 has a body 20 having an engagement opening 200 molded therein, a second closure part 3 by way of an engagement element 31 molded on a base 30 being able to be brought to engage with said engagement opening 200.

The first closure part 2 has a locking element 23 which is configured as a ring element (for example as an opened C-ring or as a closed D-ring) and by way of a portion is guided in a receptacle opening 201 that extends obliquely to the closing direction X and moreover by way of a guide portion 231 which extends in parallel is guided on a guiding opening 206 on the body 20.

In order for the closure parts 2, 3 to be connected to one another, the closure parts 2, 3 are placed against one another such that the engagement element 31 of the second closure part 3 comes to engage with the engagement opening 200 of the first closure part 2, and the closure parts 2, 3 are locked to one another on account of the locking element 23 engaging in the engagement portion 310 molded on the engagement element 31, as can be seen from the transition from FIGS. 76A, 76B to FIGS. 79A, 79B.

The first closure part 2 has a magnetic installation 22 on the body 20. In contrast, an adjustment part 36 which is displaceable along an activation direction B on the base 30 of the adjustment part 3 and supports a magnetic installation 32 is disposed on the second closure part 3. By virtue of the magnetic interaction, the closure parts 2, 3 when being placed against one another are pulled so as to engage with one another, wherein the locking element 23, by virtue of the magnetic attraction force of the magnetic installation 32, is moved to the locked position according to FIG. 79B and is held therein. The closure parts 2, 3 are thus locked to one another in the closing position.

The locking mechanism between the closure parts 2, 3 in the exemplary embodiment illustrated can thereby be released in that the adjustment part 36 is displaced in the activation direction B in relation to the base 30 of the closure part 3, as is illustrated in FIGS. 80A, 80B. On account thereof the closure can be unlocked by a plurality of potential actions. Either the locking element 23, by removing the magnetic installation 32 from the locking element 23, is magnetically attracted by the magnetic installation 22 of the closure part 2 such that the locking element 23 makes its way to the unlocked position illustrated in FIGS. 81A, 81B, the closure parts 2, 3 thus being unlocked. Additionally or alternatively, a disengagement of the engagement portion 310 from the locking element 23 is enabled by removing the adjustment part 36 from the engagement opening 200. The closure parts 2, 3 can thus be separated from one another as is illustrated in FIGS. 81A, 81B.

In an exemplary embodiment illustrated in FIGS. 82A, 82B to 84A, 84B, a first closure part 2 has a body 20 having an engagement opening 201 molded therein and a magnetic installation 22 disposed on the body 20. A receptacle opening 201 in which a bent locking element 23 is displaceably received is molded on the body 20. A second closure part 3 has a base 30 and an engagement element 31 which is rigidly molded on the latter and can be brought to engage with the engagement opening 200 of the first closure part 2 in order for the closure parts 2, 3 to be connected to one another.

In a closing position (FIGS. 82A, 82B), the engagement element 31 of the second closure part 3 lies in the engagement opening 200 of the first closure part 2, and the closure parts 2, 3 are locked to one another on account of the locking element 23 engaging in the assigned engagement portion 310 on the engagement element 31. The locking element 23 herein is pulled so as to engage with the engagement portion 13 by the magnetic installation 32 of the closure part 3 and is held in a locking manner in said engagement portion 13.

The locking element 23 is connected to a tab 231 which can be pulled by a user so as to unlock the locking element 23, as can be seen in the transition from FIGS. 82A, 82B to FIGS. 83A, 83B. The closure parts 2, 3 upon unlocking can be separated from one another, as can be seen from FIGS. 84A, 84B.

Figure 85A:
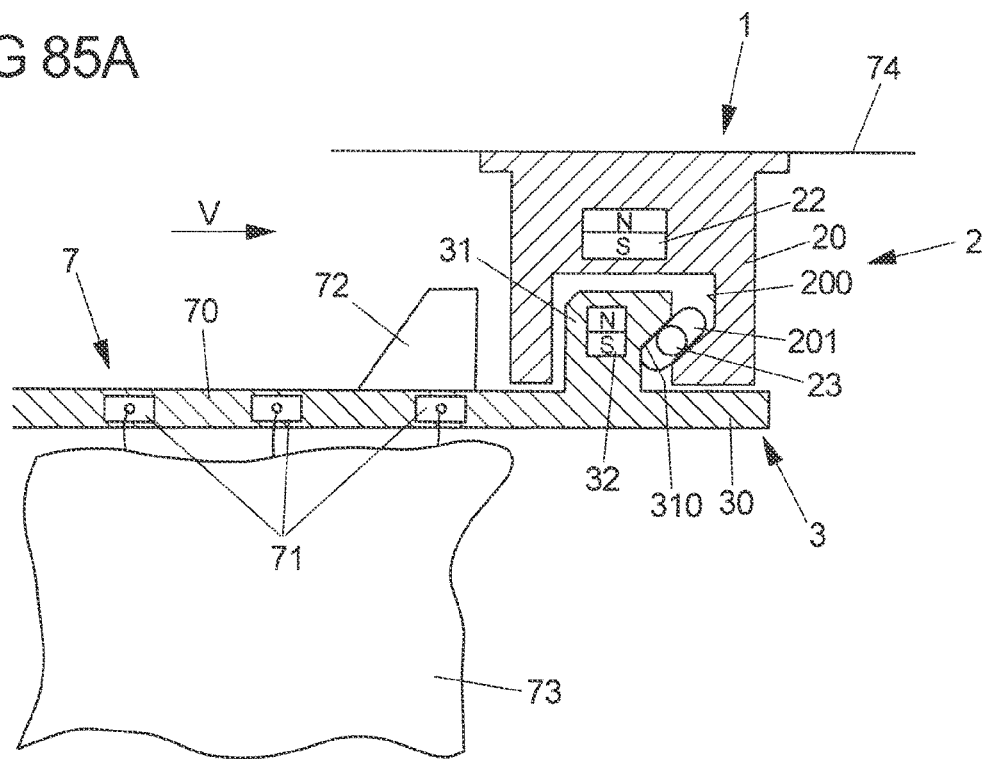
FIG. 85A shows a schematic view of a further exemplary embodiment of the closure device in a closing position.
Figure 85B:
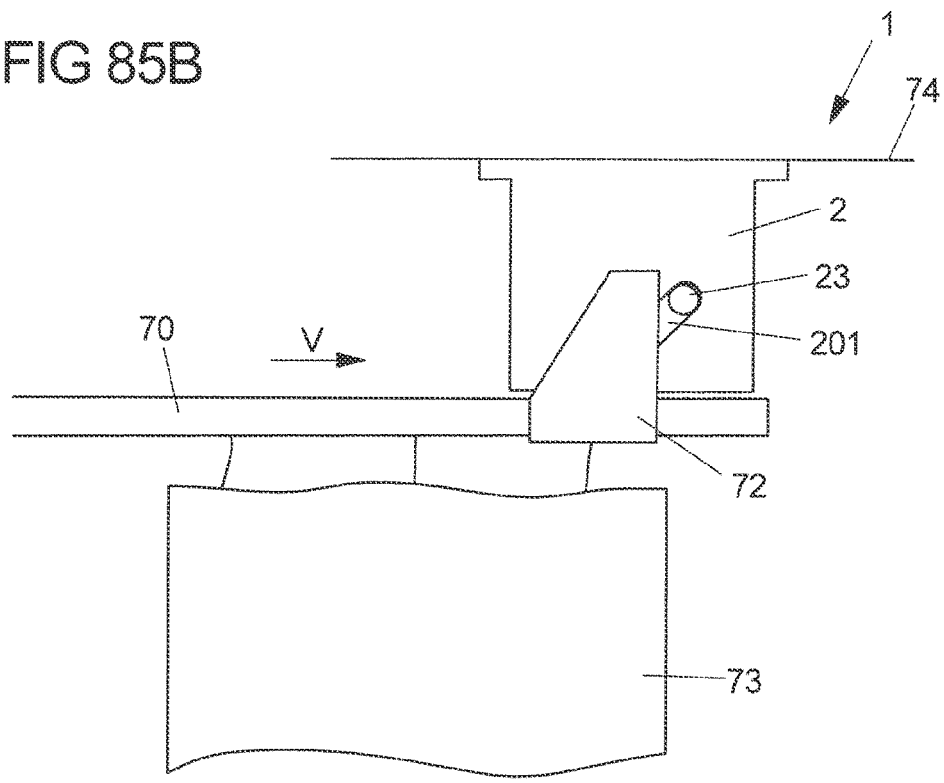
FIG. 85B shows a view of the closure device in an unlocked position.

FIGS. 85A and 85B show schematic views of a further exemplary embodiment of the closure device 1 which in this exemplary embodiment serves for connecting a connecting functional group 7 to a superordinate functional group, in this case a wall 74.

The connecting functional group 7 can be configured as a shower curtain, for example, or as any other curtain (net curtain), and has a rod element 70 which by way of the closure device 1 is to be connected to an assigned wall 74. The connecting functional group 7 has a drape 73 which by way of slides 71 is guided so as to be adjustable along an adjustment direction V on the rod element 70 and can thus be opened and closed.

In the exemplary embodiment illustrated, the closure device 1 has a first closure part 2 having a body 20 and an engagement opening 200 molded therein, an engagement element 31 of the second closure part 3 that is molded on a base 30 engaging in said engagement opening 200 in a closing position. The base 30 herein is formed by an end of the rod element 70 of the connecting functional group 7.

In a manner analogous to that described above for various exemplary embodiments, a receptacle opening 201 in which a locking element 23 in the form of a pin-shaped rod is received is molded on the body 20. In a closing position (FIG. 85A), the locking element 23 engages in a locking manner with an engagement portion 310 on the engagement element 31 of the second closure part 3 such that the second closure part 3 is held on the first closure part 2 and the rod element 70 of the connecting functional group 7 by way of the closure device 1 is fixedly connected to the wall 74 herewith.

The closure parts 2, 3 have in each case a magnetic installation 22, 32 which interact in a magnetically attracting manner and thus magnetically assist in placing the closure parts 2, 3 against one another, in a manner analogous to that described above. The magnetic installation 32 moreover interacts with the locking element 23 and pulls the locking element 23 so as to engage in a locking manner with the engagement portion 310 such that the locking element 23 is herewith held also in the locking position of the latter.

In the exemplary embodiment illustrated, an activation piece 72 which, when closing the drape 73, is moved close to the closure device 1 in the adjustment direction V and can be adjusted in relation to the closure device such that the activation piece 72 on the first closure part 2 acts on the locking element 23 and adjusts the locking element 23 in the receptacle opening 201 such that the closure device 1 is unlocked, as is illustrated in FIG. 85B, is disposed on the last slide 71, facing the closure device 1, of the connecting functional group 7. In this position of the activation piece 72, the locking mechanism between the closure parts 2, 3 is thus released, wherein the closure parts 2, 3 are initially still held magnetically to one another by the magnetic installations 22, 32, but can be pulled so as to disengage by a user.

The unlocking action in this exemplary embodiment thus takes place by an activation piece 72 which implements an adjustment part which can be moved independently of the closure parts 2, 3 but for unlocking can act on the locking element 23, as can be seen from FIG. 85B.

Figure 86:
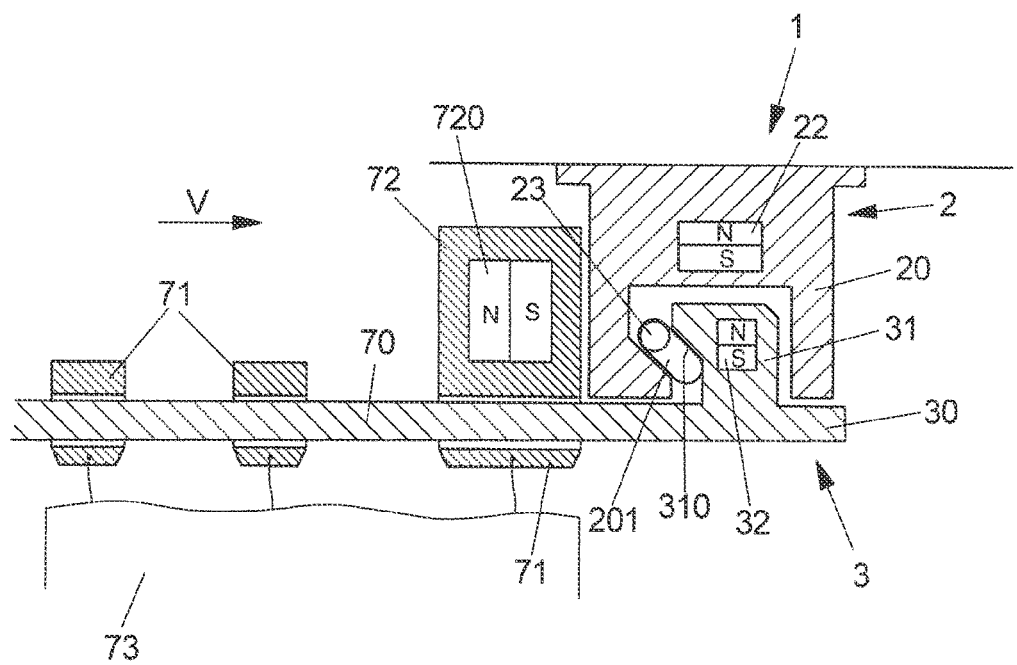
FIG. 86 shows a view of yet another exemplary embodiment of a closure device.
Figure 89A:
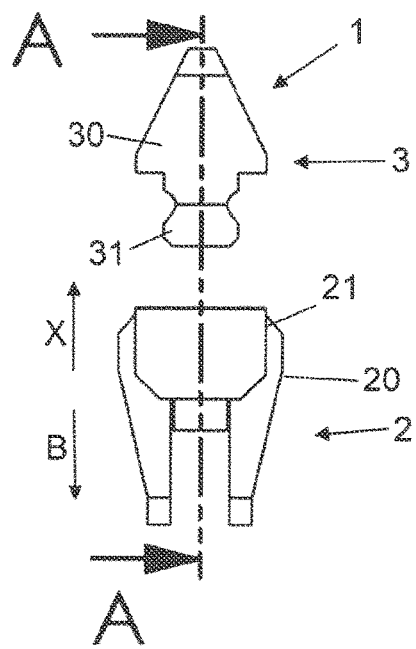
FIG. 89A shows a lateral view of an end side of the closure device in an opened position.
Figure 89B:
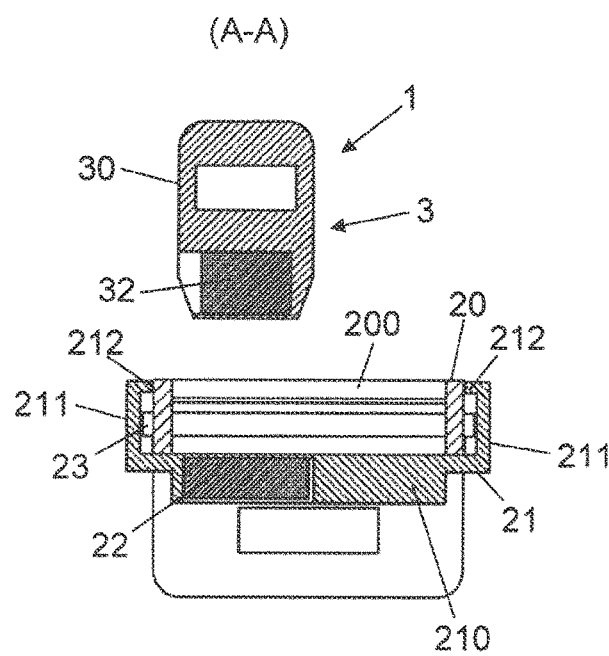
FIG. 89B shows a sectional view along the line A-A according to FIG. 89A.
Figure 89D:
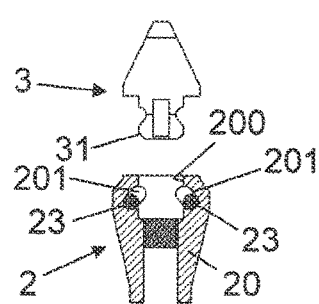
FIG. 89D shows a sectional view along the line C-C according to FIG. 89C.
Figure 89C:
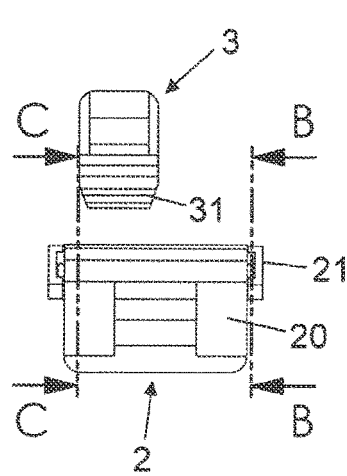
FIG. 89C shows a view of the longitudinal side of the closure device in the opened position.
Figure 89E:
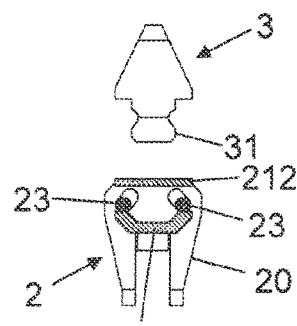
FIG. 89E shows a sectional view along the line B-B according to FIG. 89C.
Figure 90A:
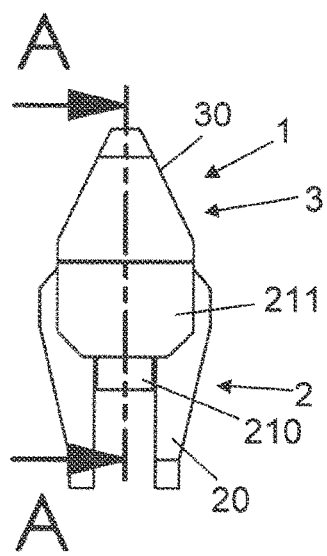
FIG. 90A shows a lateral view of an end side of the closure device in a closed position.
Figure 90B:
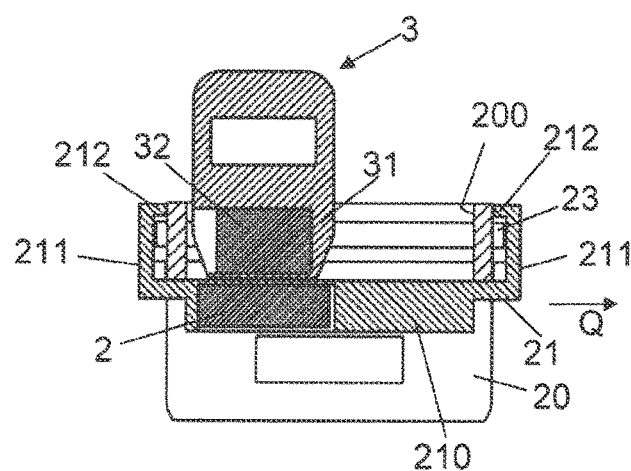
FIG. 90B shows a sectional view along the line A-A according to FIG. 90A.
Figure 90D:
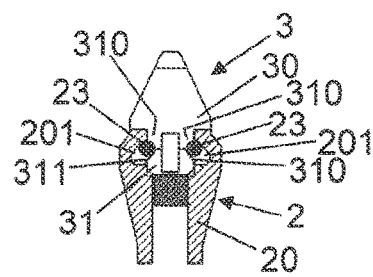
FIG. 90D shows a sectional view along the line C-C according to FIG. 90C.
Figure 90C:
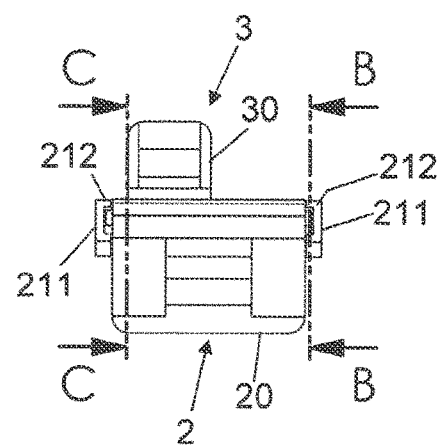
FIG. 90C shows a view of the longitudinal side of the closure device in the closed position.
Figure 90E:
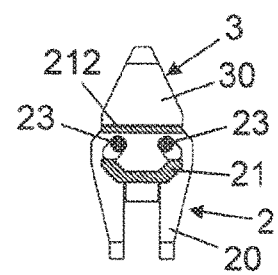
FIG. 90E shows a sectional view along the line B-B according to FIG. 90C.

In an exemplary embodiment schematically illustrated in FIG. 86, as a modification of the exemplary embodiment according to FIGS. 85A, 85B, an activation piece 72 which has a magnetic installation 720 in the form of a permanent magnet is disposed on the last slide 71, facing the closure direction 1. In this exemplary embodiment, the activation piece 72 magnetically interacts with the locking element 23 in such a manner that the magnetic forces of the magnetic installation 720 of the activation part 72 exceed the magnetic forces in particular of the magnetic installation 32 of the second closure part 3 when said activation piece 72 is moved close to the closure direction 1, the locking element 23 being pulled out of the locking engagement with the engagement portion 310 of the second closure part 3 when the activation part 72 is moved close to the closure device 1, as can be seen from FIG. 86. In the exemplary embodiment according to FIG. 86, the closure device 1 can thus be magnetically unlocked by way of the activation piece 72.

The exemplary embodiment according to FIG. 86 is otherwise comparable to the exemplary embodiment according to FIGS. 85A and 85B such that reference to this end is also to be made to the preceding embodiments.

In another embodiment, the activation piece 72 can have a magnetic installation 720 which is configured as a ferromagnetic armature and is attracted by the magnetic installations 22, 32 of the closure device 1. Unlocking in this case can take place mechanically, for example, as in the exemplary embodiment according to FIGS. 85A, 85B.

In an exemplary embodiment illustrated in FIGS. 87 to 93A-93E, a first closure part 2 has a body 20 on which an adjustment part 21 is disposed so as to be adjustable along an activation direction B. The body 20 forms an engagement opening 200 by way of which the closure part 2 along a closing direction X can be brought to engage with the second closure part 3 such that the closure parts 2, 3 are held in a locking manner to one another in a closing position (FIGS. 90A to 90E).

Two bar-shaped locking elements 23 are disposed on the closure part 2 and to this end received in the receptacle openings 201 on end sides on both sides of the body 20. The receptacle openings 201 are set so as to be oblique to the closing direction X and herein configured as slots such that the locking elements 23 are adjustable in a plane that is directed so as to be perpendicular to the direction of the longitudinal extent of the locking elements 23.

The locking elements 23 by way of the ends thereof protrude beyond the body 20 on both sides. The adjustment part 21 has flanked portions 211 which are connected to one another by way of an intermediate portion 210 and on which activation elements 212 in the form of inward-projecting edges are formed, the adjustment part 21 by way of the latter engaging with the ends of the locking elements 23. The locking elements 23 can be adjusted in the receptacle openings 201, in particular so as to move the locking elements 23 along the receptacle openings 201 toward the outside, by activating the adjustment part 21 relative to the body 20 of the closure part 2 in the activation direction B.

In order for the closure device 1 to be closed, the closure parts 2, 3 can be placed against one another along the closing direction X, as can be seen from FIGS. 89A to 89E. In the closing position illustrated in FIGS. 90A to 90E, the closure part 3 by way of an engagement element 31 molded thereon engages in the engagement opening 200 of the body 20 of the closure part 2, wherein the locking elements 23 engage in engagement portions 310 in the form of depressions on both sides of the engagement element 31, as can be seen from FIGS. 90D and 90E.

The closure parts 2, 3 have in each case a magnetic element 22, 32 which interact in a magnetically attracting manner such that the closing of the closure device 1 can take place under magnetic attraction and thus in a self-acting manner.

Moreover, the locking elements 23 are also magnetic and when closing the closure direction 1, by virtue of the interaction with the magnetic element 32 of the closure part 3, are under load when engaging with the engagement portions 310 on the engagement element 31 of the closure part 3.

In the exemplary embodiment illustrated, the engagement opening 200 on the body 20 of the closure part 2 along a transverse direction Q is elongated in such a manner that the closure part 3 can be moved along the transverse direction Q in the engagement opening 200. The closure device 1 herein can be opened by moving along the transverse direction Q.

Figure 91A:
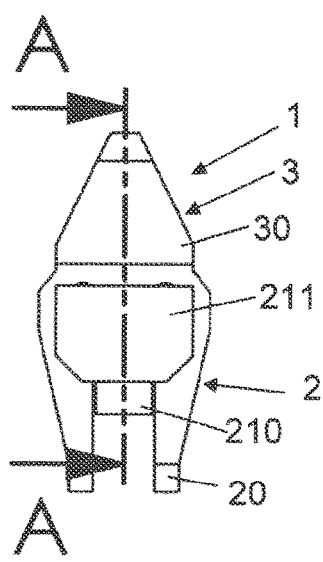
FIG. 91A shows a lateral view of an end side of the closure device in an opening movement with the closure device not under any load.
Figure 91B:
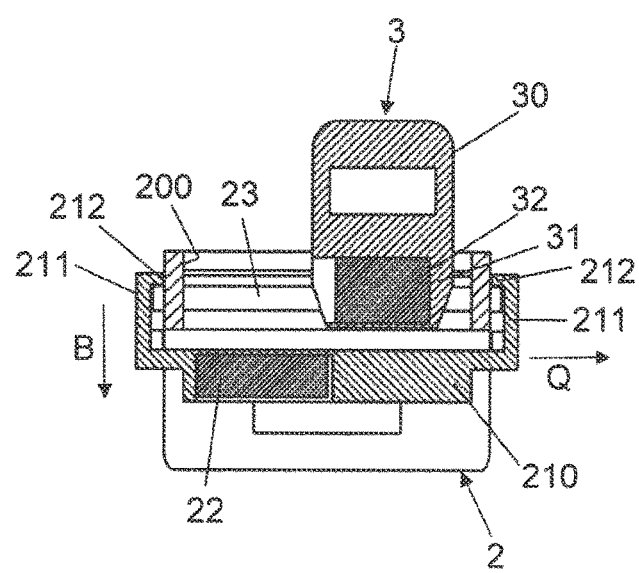
FIG. 91B shows a sectional view along the line A-A according to FIG. 91A.
Figure 91D:
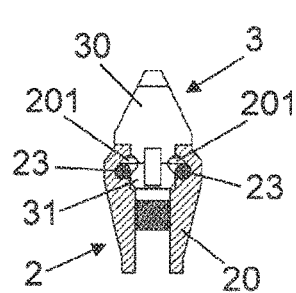
FIG. 91D shows a sectional view along the line C-C according to FIG. 91C.
Figure 91C:
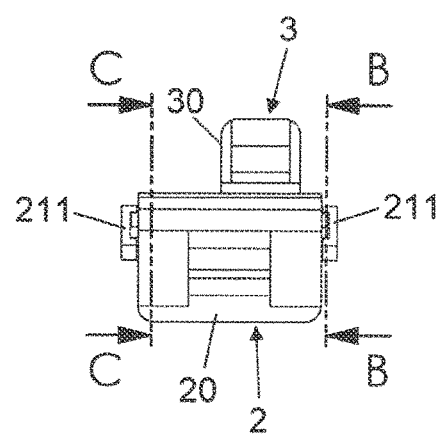
FIG. 91C shows a view of the longitudinal side of the closure device in the opening movement.
Figure 91E:
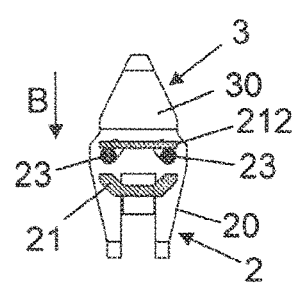
FIG. 91E shows a sectional view along the line B-B according to FIG. 91C.
Figure 92A:
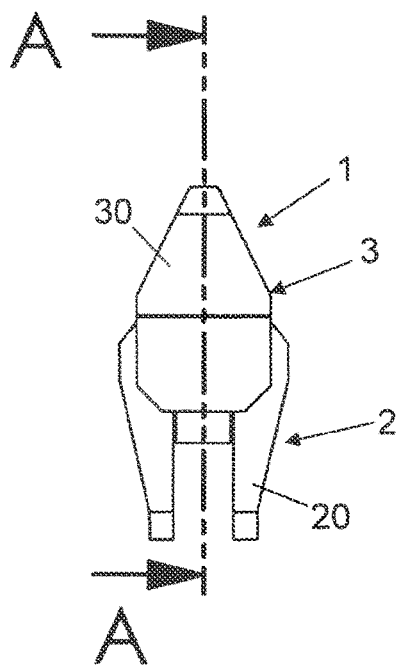
FIG. 92A shows a lateral view of an end side of the closure device in an opening movement with the closure device not being under any load.
Figure 92B:
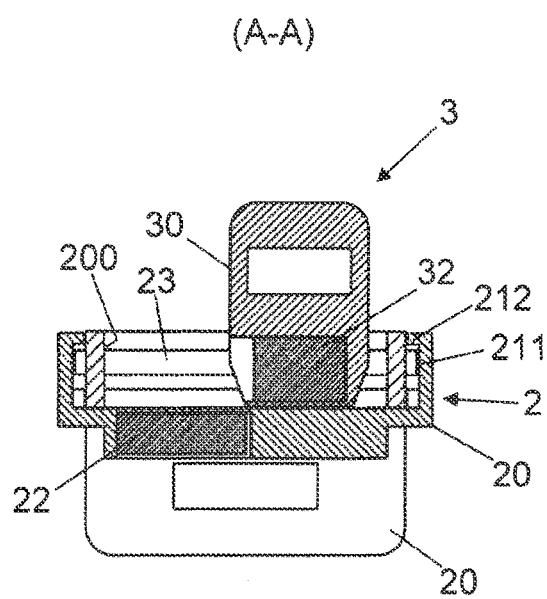
FIG. 92B shows a sectional view along the line A-A according to FIG. 92A.
Figure 92D:
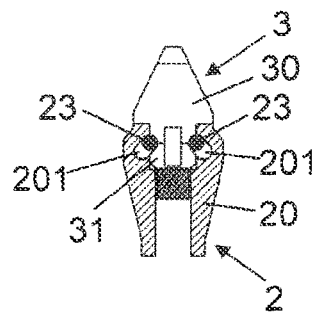
FIG. 92D shows a sectional view along the line C-C according to FIG. 92C.
Figure 92C:
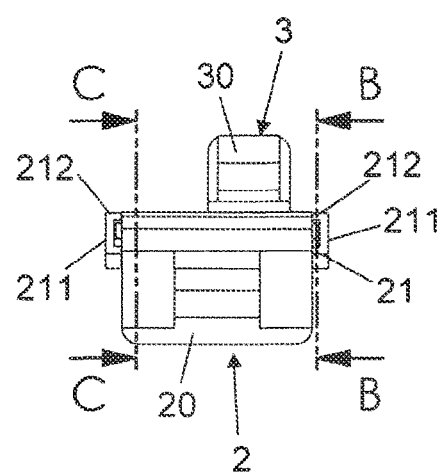
FIG. 92C shows a view of the longitudinal side of the closure device in the opening movement.
Figure 92E:
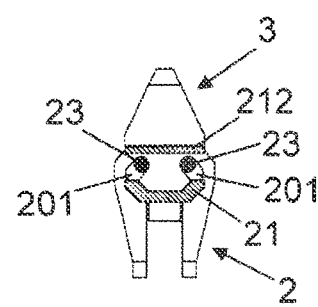
FIG. 92E shows a sectional view along the line B-B according to FIG. 92C.
Figure 93A:
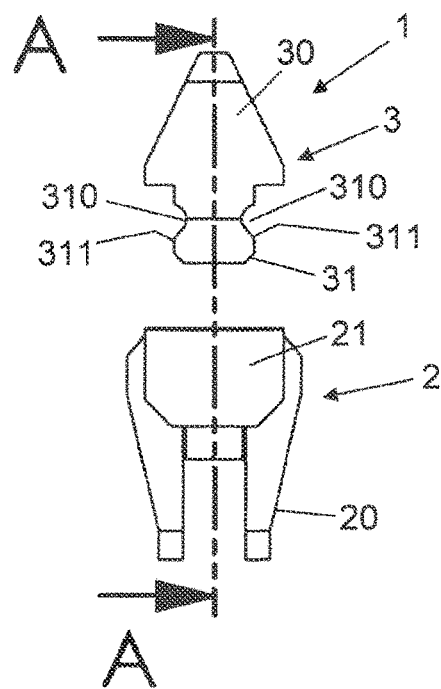
FIG. 93A shows a lateral view of an end side of the closure device in an opened position.
Figure 93B:
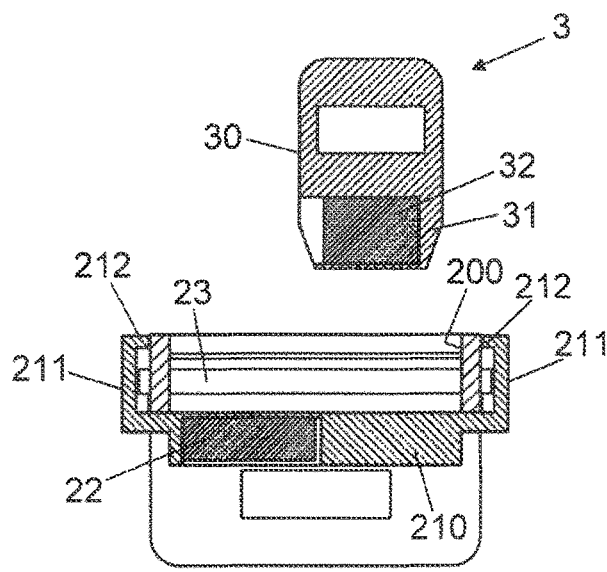
FIG. 93B shows a sectional view along the line A-A according to FIG. 93A.
Figure 93D:
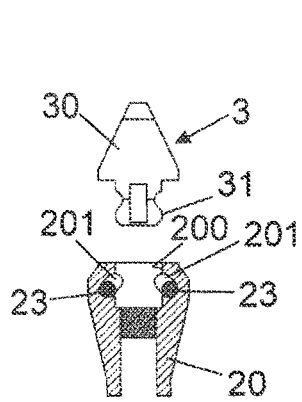
FIG. 93D shows a sectional view along the line C-C according to FIG. 93C.
Figure 93C:
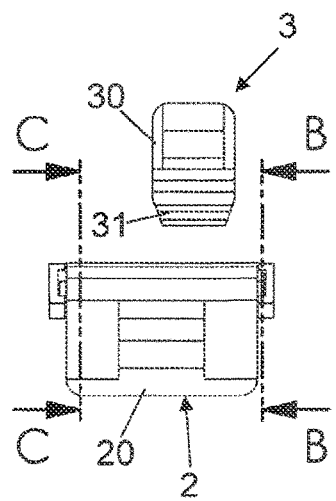
FIG. 93C shows a view of the longitudinal side of the closure device in the opened position.
Figure 93E:
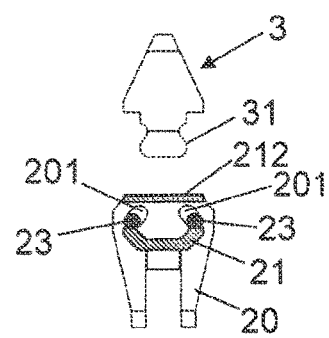
FIG. 93E shows a sectional view along the line B-B according to FIG. 93C.
Figure 96A:
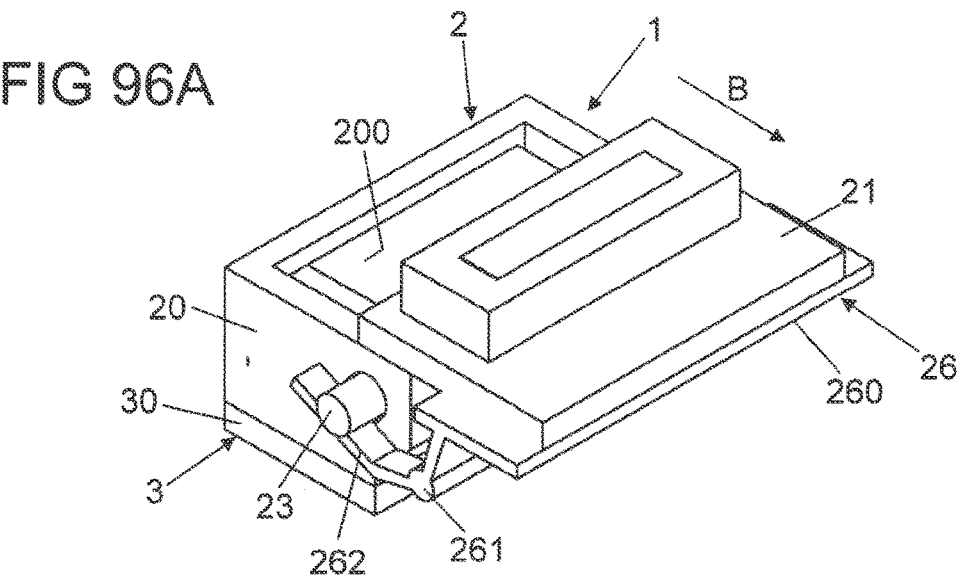
Figure 96B:
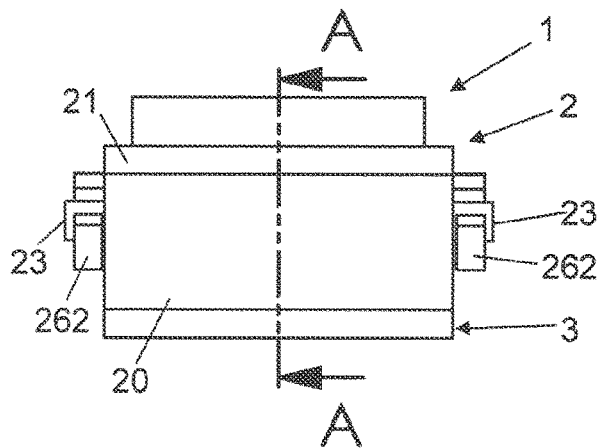
Figure 96C:
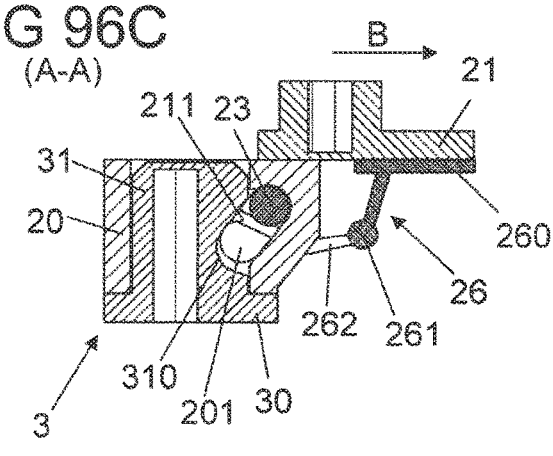
Figure 96D:
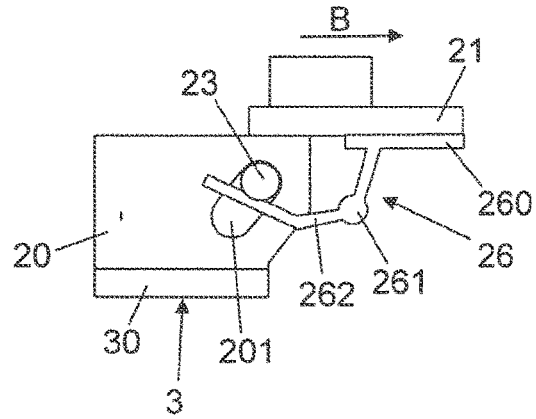

When the closure device 1 is not under load, thus in the absence of loading forces between the closure parts 2, 3, opening thus takes place as is illustrated in FIGS. 91A to 91E. In a transverse movement of the closure part 3 in the engagement opening 200, the magnetic elements 22, 32, configured by the permanent magnets, are moved transversely in relation to one another and thus sheared off from one another. A reversal of the magnetic effect by virtue of the so-called edge effect arises herein, the latter arising when the magnetic elements 22, 32 have been moved out of congruence by a certain distance. By virtue of the magnetic effect being reversed from attraction to repulsion, the adjustment part 21 is moved in the activation direction B in relation to the body 20 of the closure part 2, such that the locking elements 23 are adjusted in the receptacle openings 201 and adjusted toward the outside, as can be seen in FIGS. 91D and 91E. The locking mechanism is thus canceled, and the closure parts 2, 3 can be removed from one another, as can be seen from FIGS. 93A to 93E.

If the opening takes place under load, as is illustrated in FIGS. 92A to 92E, the locking elements 23 by virtue of the interaction with the closure parts 2, 3 are locked in a non-positive manner in the receptacle openings 201 and cannot be readily adjusted in the receptacle openings 201 by virtue of a frictional effect between the ramps 205, 311 which are molded on the body 20 of the closure part 2, on the one hand, and the engagement portions 310, on the other hand. The closure direction 1 makes its way into the state according to FIGS. 91A to 91E only once the closure device 1 is de-stressed, such that the adjustment part 21 by virtue of the reversal of the magnetic effect is adjusted in a self-acting manner and the locking mechanism is thus released such that the closure parts 2, 3 can be removed from one another.

In an exemplary embodiment of a closure device 1 illustrated in FIGS. 94A, 94B to 99A-99D, closure parts 2, 3 are to be disposed against one another along a closing direction X. An engagement opening 200 is molded on a body 20 of the one closure part 2, into which engagement opening 200 the other closure part 3 can be plugged by way of an engagement element 31 so as to connect the closure parts 2, 3 to one another.

In the exemplary embodiment according to FIGS. 94A, 94B to 99A to 99D a (single) locking element 23 is received in receptacle openings 201 on walls at the end sides of the body 20 of the closure part 2 and adjustable in the obliquely set receptacle openings 201 that are configured as slots. In a closing position, with closure parts 2, 3 connected to one another, the locking element 23 engages in an engagement portion 310 in the form of a depression on the engagement element 31 of the closure part 3 such that the closure parts 2, 3 are locked to one another on account thereof.

A magnetic element 22, 32 in the form of a permanent magnet is in each case disposed on the closure parts 2, 3. Moreover, the locking element 23 is configured so as to be magnetic and, when the closure part 3 is plugged in, is loaded by the magnetic element 32 of the closure part 32 such that the locking element 23 is pulled so as to engage with the engagement portion 310.

In the exemplary embodiment illustrated, an adjustment part 21 is disposed on the body 20 of the closure part 2 so as to be displaceable along an activation direction B that is directed transversely to the closing direction X. Moreover, a rocker element 26 is mounted so as to be pivotable relative to the body 20 about a pivot axle 261, wherein the rocker element 26 in relation to the adjustment part 21 is disposed such that the rocker element 26 is activated when the adjustment part 21 is displaced.

This is illustrated in the transition from FIGS. 95A-95D to FIGS. 96A-96D. In a closing position (FIGS. 95A-95D), the closure parts 2, 3 engage with one another and are locked to one another by way of the locking element 23. The rocker element 26 is pivoted about the pivot axle 261 thereof by activating the adjustment part 21 (FIGS. 96A-96D), in that the adjustment part 21 acts on a lever portion 260 of the rocker element 26.

Activation portions 262 project from the pivot axle 261 of the rocker element 26, said activation portions 262 being configured for acting on ends of the locking element 23 that project relative to the body 20. When pivoting the rocker element 26, the locking element 23, as can be seen from FIGS. 96A-D, is correspondingly adjusted in the receptacle openings 201 of the body 20 and, on account thereof, relocated toward the outside such that the engagement between the locking element 23 and the engagement portion 310 of the locking element 31 is canceled and the closure parts 2, 3 are thus unlocked from one another.

The closure parts 2, 3 can thus be separated from one another, as can be seen from FIGS. 97A-97D. Because the magnetic attraction force between the magnetic elements 22, 32 is also weakened by adjusting the adjustment part 21 on which the magnetic element 22 of the closure part 2 is disposed, this results in very easy opening of the closure device 1.

If the adjustment part 21 is reset, as can be seen from FIGS. 98A-98D, the rocker element 26 can also be reset. The locking element 23 herein can also be adjusted in the receptacle openings 201 by virtue of a magnetic attraction to the magnetic element 22 on the adjustment part 21.

The adjustment part 21 and the rocker element 26 can be spring-preloaded in the direction of a reset, such that the resetting according to FIGS. 98A-98D takes place in a self-acting manner.

After the adjustment part 21 and the rocker element 26 have been reset, the closure parts 2, 3 can be connected to one another again, as can be seen from FIGS. 99A-99D.

When the closure parts 2, 3 are placed against one another, the locking element 23 herein is initially deflected in the receptacle openings 201 on both sides of the body 20 of the closure part 2, as can be seen from FIGS. 99C and 99D, until the locking element 23 can engage with the engagement portion 310 of the locking element 31 of the closure part 3, and a locking mechanism between the closure parts 2, 3 is thus established.

In an exemplary embodiment illustrated in FIGS. 100A, 100B to 105A-105D, the adjustment part 21, as opposed to the exemplary embodiment according to FIGS. 94A, 94B to 99A-99D is configured so as to be integral to and in one piece with the rocker element 26. The adjustment part 21 is thus able to be moved along a curved activation direction B, so as to be pivotable about the pivot axle 261 of the rocker element 26, in relation to the body 20 of the closure part 2, as this can be seen in the transition from FIGS. 101A-101D and FIGS. 102A-102D.

The exemplary embodiment in functional terms is otherwise identical to the exemplary embodiment according to FIGS. 94A, 94B to 99A-99D, such that reference is also to be made to the preceding embodiments.

As has been explained above, for example by means of FIGS. 8A-8C and FIGS. 9A-9C, the locking mechanism between the closure parts 2, 3 in the exemplary embodiments discussed above can be influenced by an angular position of ramps 205, 311 on the body of the closure part 2, on the one hand, and on the engagement portion 310 of the locking element 31 of the closure part 3, on the other hand.

As has been explained above, a connection which is substantially without play (FIGS. 8A-8C) or a self-reinforcing connection which is secure even under load (FIGS. 9A-9D) can be achieved, depending on the angle between the ramps 205, 311.

The above can also be combined, as is visualized in FIG. 106 and FIGS. 107A, 107B to 109A, 109B.

Portions 205A-205C can thus be molded on the ramp 205 on the body 20 of the closure part 2, said portions 205A-205C differing from the ramp 311 of the locking element 31 of the closure part 3 in terms of the angular orientation.

In the example illustrated in FIG. 106 as well as FIGS. 107A, 107B to 109A, 109B, a portion 205C is molded on the ramp 205 on an internal end, said portion 205C in relation to the ramp 311 on the locking element 31 of the closure part 3 being directed at an angle γ1 greater than zero, thus conjointly with the ramp 311 defining a wedge shape which widens towards the outside. In the closing position of the closure parts 2, 3, the locking element 23 lies between the portion 205C of the ramp 205 and the ramp 311, as can be seen from FIG. 106 in combination with FIGS. 107A, 107B, such that the closure parts 2, 3 are held on one another substantially without play.

In contrast, a portion 205B that adjoins the portion 205C is directed so as to be parallel to the ramp 311, and a portion 205A that adjoins the portion 205B has an angle γ2 which is smaller than zero in relation to the ramp 311. The portion 205A conjointly with the ramp 311 thus forms a wedge shape which tapers toward the outside, as can be seen from FIG. 106.

With a load between the closure parts 2, 3 in the closing position, the closure parts 2, 3 are loaded toward one another in the direction of converging of the ramps 205, 311. By virtue of the angle γ1 between the portion 205C and the ramp 311, an outwardly directed force thus acts on the locking element 23 such that the locking element 23 in the receptacle openings 201 under higher load is relocated toward the outside, as can be seen in the transition from FIGS. 108A, 108B to FIGS. 109A, 109B. The locking element 23 thus passes the portion 205B of the ramp 205 and makes its way into the region of the portion 205A in which, by virtue of the angle γ2 between the portion 205A and the ramp 311, a self-reinforcement of the connection arises such that the closure parts 2, 3 cannot be released from one another even under high load.

On account of the different portions 205A-205C being provided, a connection without play between the closure parts 2, 3 is thus achieved on the one hand, as can be seen from FIGS. 106 and 107A, 107B. Under high load, the connection moreover acts in a self-reinforcing manner in that the locking element 23 is jammed so as to be wedged between the portion 205A and the ramp 311.

Additionally or alternatively, portions of different orientations can also be molded on the ramp 311 on the closure part 3.

The concept on which the proposed solution is based is not limited to the exemplary embodiments discussed above but can also be implemented in other ways.

A closure device of the type described can be used in a very diverse manner.

A closure device can thus be used for connecting straps in order to provide a two-point connection or else a multi-point connection (for connecting more than two straps).

A closure device of the type described can moreover be used for connecting an electronic apparatus to a superordinate functional group, for example in or on a vehicle, for example a motor vehicle or bicycle. For example, a mobile phone can be (releasably) established on a dashboard of a motor vehicle or on a handlebar of a bicycle by way of such a device.

The closure device can however also be used for connecting other items to one another, for example as a closure for a helmet, in particular a sports helmet, for a bag, or for an item of clothing.

LIST OF REFERENCE SIGNS

1 Closure device
2 Closure part
20 Body
200 Engagement opening
201 Receptacle opening
202 Fastening portion
203 Leg
204 Guiding engagement
205 Ramp
206 Guiding opening
21 Adjustment part
210 Intermediate portion
211 Flank portion
212 Activation element
212A, 212B Portion
213 Effective element
214 Spring element
215 Connection portion
216 Deflection portion
217 Lateral wall
218 Handle element
22 Magnetic installation
23 Locking element
230 Portion
231 Tab
232 Contact face
24 Effective element
240 Spring element 241 Deflection portion
25 Electrical connector
250 Contact element
26 Rocker element
260 Lever portion
261 Pivot axle
262 Activation portion
3 Closure part
30 Base
300 Fastening portion
301 Guiding pin
302 Engagement cam
303 Engagement groove
304 Support portion
305 Activation portion
31 Engagement element
310 Engagement portion
311 Ramp
312 Contact face
32 Magnetic installation
33 Blocking piece
330 Blocking portion
35 Electrical connector
350 Contact element
36 Adjustment part
4 First functional group
40 Connection portion
41 Detent element
5 Second functional group
50 Connection portion
6 Electronic apparatus
7 Connecting functional group (shower curtain)
70 Rod element
71 Slide
72 Activation piece
720 Magnetic installation
73 Drape
74 Wall
α, β, γ1, γ2 Angle
B Activation direction
C Activation direction
D Effective direction
D1a, D1b, D2 Circle of rotation
E Activation direction
L Longitudinal direction
M1, M2 Center
Transverse direction
T Separating direction
X Closing direction
V Adjustment direction

The invention claimed is:

1. A closure device having:
a first closure part comprising a body, and a second closure part, said closure parts for closing the closure device are placeable against one another along a closing direction and in a closing position being connected to one another;
at least one locking element which is disposed so as to be movable on the body of the first closure part, and at least one engagement portion which is molded on the second closure part, wherein the at least one locking element and the at least one engagement portion in a closing position are mutually engaged in such a manner that the first closure part and the second closure part are locked to one another; and
an adjustment part which is actuatable in an actuation direction so as to move the at least one locking element to disengage from the at least one engagement portion in order to release the first closure part and the second closure part from one another,
wherein the first closure part has a first magnetic installation and the second closure part has a second magnetic installation, wherein the first magnetic installation and the second magnetic installation when placing the first closure part and the second closure part against one another mutually interact in a magnetically attracting manner, and the at least one locking element is magnetically configured in such a manner that the at least one locking element in the closing position by way of the first magnetic installation and/or the second magnetic installation is loaded in the direction of engaging with the at least one engagement portion,
wherein the first magnetic installation is disposed on the adjustment part and is movable conjointly with the adjustment part so as to switch, by moving the adjustment part, a magnet attraction between the first closure part and the second closure part into a magnetic repulsion.

2. The closure device as claimed in claim 1, wherein one of the first closure part or the second closure part has an engagement opening, while the respective other of the first closure part or the second closure part has an engagement element which in the closing position of the closure device engages in the engagement opening.

3. The closure device as claimed in claim 1, wherein the at least one locking element is disposed on the first closure part so as to be movable in a linear manner or pivotable in a plane defined by the closing direction and a transverse direction extending transversely to the closing direction.

4. The closure device as claimed in claim 3, wherein the at least one locking element is received so as to be movable in a receptacle opening of the first closure part.

5. The closure device as claimed in claim 4, wherein the receptacle opening in relation to the closing direction and in relation to the transverse direction extends obliquely in such a manner that the at least one locking element in the receptacle opening is movable along an adjustment direction which extends obliquely in relation to the closing direction and obliquely in relation to the transverse direction.

6. The closure device as claimed in claim 4, wherein the engagement portion has a first ramp which extends obliquely in relation to the closing direction, extends in a rectilinear manner, or is curved, and the first closure part in the region of the receptacle opening has a second ramp which extends obliquely in relation to the closing direction, extends in a linear manner, or is curved, wherein the at least one locking element in the closing position is disposed between the first ramp and the second ramp.

7. The closure device as claimed in claim 6, wherein at least one of:
the first ramp and the second ramp in the plane defined by the closing direction and the transverse direction are disposed so as to be parallel to each other or at an angle of greater than zero or smaller than zero, and
one of the ramps has a first portion which at an angle of greater than zero in relation to the respective other ramp is disposed in the plane defined by the closing direction and the transverse direction, and a second portion which at an angle of smaller than zero in relation to the respective other ramp is disposed in the plane defined by the closing direction and the transverse direction.

8. The closure device as claimed in claim 3, wherein the at least one locking element in longitudinal terms extends perpendicularly to the plane defined by the closing direction and the transverse direction, or at least in portions extends circumferentially about the closing direction.

9. The closure device as claimed in claim 1, wherein at least one of:
   the actuation direction is directed so as to be transverse to the closing direction or along the closing direction, and
   the adjustment part is spring-preloaded counter to the actuation direction and toward a portion of the first closure part.

10. The closure device as claimed in claim 9, wherein the first closure part has at least one effective element which in relation to the adjustment part is movable along an effective direction, different from the actuation direction and is operatively connected to the adjustment part in such a manner that adjusting the effective element in the effective direction causes the adjustment part to be activated in the actuation direction.

11. The closure device as claimed in claim 10, wherein the first closure part has a rocker element which in relation to the body of the first closure part is pivotable about a pivot axle, and is moveable by the adjustment part so as to adjust the at least one locking element.

12. The closure device as claimed in 10, wherein the second closure part is moveable transversely to the closing direction on the first closure part, and the adjustment part by moving the second closure part relative to the first closure part is activatable so as to bring the at least one locking element to disengage from the at least one engagement portion in order to release the first closure part and the second closure part from one another.

13. The closure device as claimed in claim 1, wherein the second closure part is moveable transversely to the closing direction on the first closure part, and the at least one locking element is moveable from the closing position by moving the second closure part relative to the first closure part.

14. The closure device as claimed in claim 1, wherein the second closure part has a base on which the at least one engagement portion is disposed.

15. The closure device as claimed in claim 14, wherein the second closure part has a blocking piece which is movable relative to the base, wherein the blocking piece in a blocking position blocks any movement of the at least one engagement portion in the direction of disengaging of the at least one locking element, and is movable from the blocking position so as to release the at least one engagement portion for an elastic movement.

16. The closure device as claimed in claim 1, wherein the first closure part has at least a first electrical connector, and the first closure part and/or the second closure part have/has at least a second electrical connector, wherein the first electrical connector and the second electrical connector in the closing position are electrically connected to one another, but are electrically isolated from one another when the closure parts are separated.

17. The closure device as claimed in claim 1, further comprising at least two second closure parts which have in each case at least one engagement portion and a second magnetic installation, and are conjointly placeable against the first closure part.

18. A functional group having an electronic apparatus and a closure device as claimed in claim 1, wherein the first closure part or the second closure part of the closure device is connected to the electronic apparatus.

19. A closure system which has a plurality of closure devices as claimed in claim 1, wherein the first closure parts of the closure devices in a first functional group and the second closure parts of the closure devices in a second functional group are connected to one another.

20. The closure system as claimed in claim 19, wherein the first closure parts have in each case one adjustment part which is activatable so as to bring the at least one locking element of the respectively assigned first closure part to disengage from the at least one engagement portion of the assigned second closure part in order to release the first closure part and an assigned second closure part from one another, wherein the adjustment parts of the first closure parts are operatively connected to one another in such a manner that the adjustment parts are conjointly activatable.

* * * * *